(12) United States Patent
Pollack et al.

(10) Patent No.: US 12,446,915 B2
(45) Date of Patent: Oct. 21, 2025

(54) VESSEL BLOCKAGE PASSING

(71) Applicant: VeinWay Ltd., Or-Yehuda (IL)

(72) Inventors: Jordan Pollack, Tel-Aviv (IL); Gal Atarot, Kfar Saba (IL); Tanhum Feld, Kfar Yehezkel (IL); Ben Adam Friesem, Tel Aviv (IL)

(73) Assignee: VeinWay Ltd., Or-Yehuda (IL)

( * ) Notice: Subject to any disclaimer, the term of this patent is extended or adjusted under 35 U.S.C. 154(b) by 0 days.

(21) Appl. No.: 18/659,039

(22) Filed: May 9, 2024

(65) Prior Publication Data

US 2024/0285306 A1  Aug. 29, 2024

Related U.S. Application Data

(63) Continuation of application No. 18/572,204, filed as application No. PCT/IL2022/050716 on Jul. 5, 2022.
(Continued)

(51) Int. Cl.
*A61B 17/3207* (2006.01)
*A61B 17/00* (2006.01)
(Continued)

(52) U.S. Cl.
CPC ......... *A61B 17/3207* (2013.01); *A61M 25/04* (2013.01); *A61B 2017/00309* (2013.01);
(Continued)

(58) Field of Classification Search
CPC .......... A61B 17/00234; A61B 17/3207; A61B 17/3478; A61B 2017/003; A61B 2017/00309; A61B 2017/00331; A61B 2017/22065; A61B 2017/22071; A61B 17/3417; A61B 2017/00305; A61B 2017/22094; A61M 2025/1004; A61M 25/0133; A61M 25/0136; A61M 25/0138; A61M 25/0141; A61M 25/0144; A61M 25/0147; A61M 25/0152; A61M 25/0155; A61M 25/1002; A61M 2025/015;
(Continued)

(56) References Cited

U.S. PATENT DOCUMENTS 7,776,062 B2  8/2010  Besselink et al.
8,070,762 B2  12/2011  Escudero et al.
(Continued)

OTHER PUBLICATIONS

Restriction Official Action Dated Sep. 6, 2024 From the US Patent and Trademark Office Re. U.S. Appl. No. 17/878,088. (6 Pages).
(Continued)

*Primary Examiner* — Kankindi Rwego

(57) ABSTRACT

Apparatus for passing a blocked vein, including:
(a) an intravascular catheter body defining at least one lumen;
(b) a radially expandable anchor at a distal end of said catheter; and
(c) a penetration tool sized and shaped to be delivered by the lumen to a point distal of the expandable anchor, the penetration tool including a tip and configured for being pushed through venous blockage more than one week old and present with a young's modulus greater than 1 MPa. Optionally, the penetration tool tip comprises a sharpened tip. Optionally or additionally, the penetration tool tip is controllably bendable.

21 Claims, 50 Drawing Sheets

Related U.S. Application Data

(60) Provisional application No. 63/218,421, filed on Jul. 5, 2021.

(51) Int. Cl.
  *A61B 17/22*    (2006.01)
  *A61B 90/00*    (2016.01)
  *A61M 25/04*    (2006.01)
  *A61M 25/10*    (2013.01)

(52) U.S. Cl.
  CPC ............ *A61B 2017/00331* (2013.01); *A61B 2017/22044* (2013.01); *A61B 2017/22071* (2013.01); *A61B 2017/22094* (2013.01); *A61B 2090/3966* (2016.02); *A61M 25/1002* (2013.01); *A61M 25/1011* (2013.01); *A61M 25/10184* (2013.11)

(58) Field of Classification Search
  CPC .. A61M 2025/0161; A61M 2025/1015; A61M 25/06
  USPC ........................................................ 606/159
  See application file for complete search history.

(56) References Cited

U.S. PATENT DOCUMENTS

| | | | |
|---|---|---|---|
| 9,737,333 | B2 | 8/2017 | Morrison et al. |
| 10,039,896 | B2 | 8/2018 | Kornowski |
| 10,130,385 | B2 | 11/2018 | Farhangnia |
| 10,524,824 | B2 | 1/2020 | Rottenberg et al. |
| 10,744,304 | B2 | 8/2020 | Waisman |
| 2004/0039371 | A1* | 2/2004 | Tockman .......... A61M 25/0152 604/528 |
| 2009/0024085 | A1* | 1/2009 | To ................ A61B 17/320758 604/95.01 |
| 2009/0234378 | A1 | 9/2009 | Liscudero et al. |
| 2009/0292296 | A1 | 11/2009 | Pansky et al. |
| 2009/0292307 | A1 | 11/2009 | Razack |
| 2010/0030251 | A1 | 2/2010 | Sandhu et al. |
| 2010/0056862 | A1 | 3/2010 | Bakos |
| 2010/0125253 | A1 | 5/2010 | Olson et al. |
| 2013/0060269 | A1 | 3/2013 | Roorda et al. |
| 2015/0032095 | A1 | 1/2015 | Heuser |
| 2015/0051625 | A1 | 2/2015 | Petrucci et al. |
| 2016/0022313 | A1* | 1/2016 | Yoshida ............ A61B 17/3478 606/185 |
| 2016/0235429 | A1 | 8/2016 | Farhangnia et al. |
| 2016/0346513 | A1* | 12/2016 | Swaney ............ A61M 25/0138 |
| 2017/0367728 | A1 | 12/2017 | Qu et al. |
| 2020/0015839 | A1* | 1/2020 | Eastwood ...... A61B 17/320016 |
| 2020/0269014 | A1 | 8/2020 | Rottenberg et al. |
| 2020/0390454 | A1 | 12/2020 | Kramer et al. |
| 2023/0000515 | A1* | 1/2023 | Pollack ............. A61B 17/3478 |
| 2024/0285305 | A1* | 8/2024 | Pollack ............. A61M 25/0147 |

OTHER PUBLICATIONS

Official Action Dated Nov. 4, 2024 From the US Patent and Trademark Office Re. U.S. Appl. No. 17/878,088. (51 Pages).

Official Action Dated Feb. 26, 2025 from the US Patent and Trademark Office Re. U.S. Appl. No. 18/572,204. (35 pages).

Supplementary European Search Report and the European Search Opinion Dated Apr. 30, 2025 From the European Patent Office Re. Application No. 22837170.4. (7 Pages).

International Preliminary Report on Patentability Dated Jan. 18, 2024 From the International Bureau of WIPO Re. Application No. PCT/IL2022/050716 (11 Pages).

International Search Report and Written Opinion Dated Nov. 10, 2022 From the International Searching Authority Re. Application No. PCT/IL2022/050716. (23 Pages).

Invitation to Pay Additional Fees and Communication Relating to the Results of the Partial International Search Dated Oct. 3, 2022 From the International Searching Authority Re. Application No. PCT/IL2022/050716. (9 Pages).

Khaja et al. " Fluoroscopic Targeting of Wallstents and Amplatzer Vascular Plugs in Sharp Recanalization of Chronic Venous Occlusion". Cardio Vascular and Interventional Radiology, 40(11), 1777-1783, Jun. 13, 2017.

Van De Berg et al. " Endpoint Accuracy in Manual Control of a Stecrable Needle", Journal of Vascular and Interventional Radiology, 28(2): 267-283, Feb. 2017.

* cited by examiner

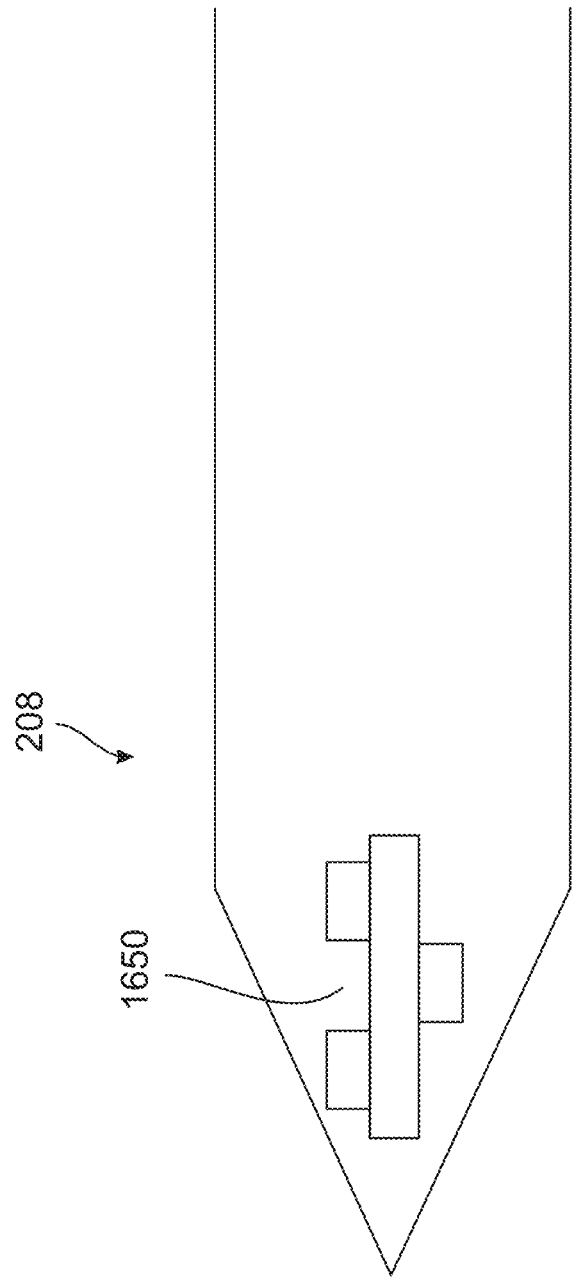

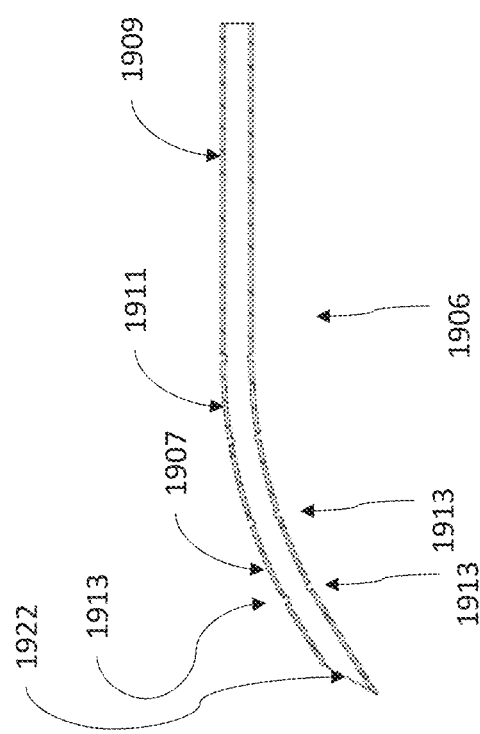

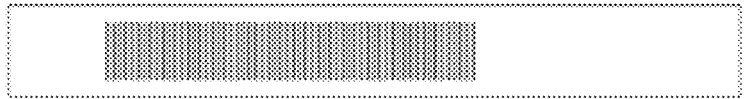
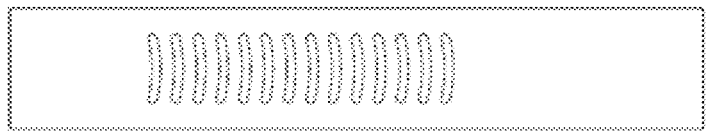
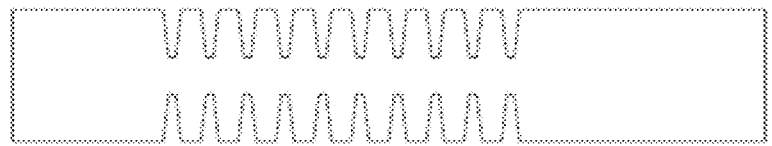
Fig. 20E

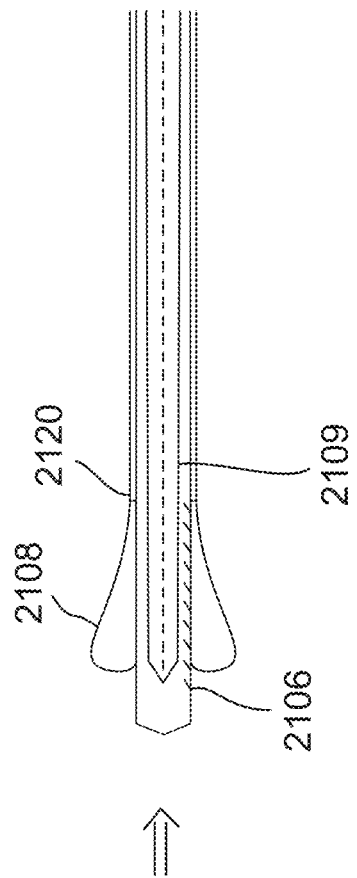
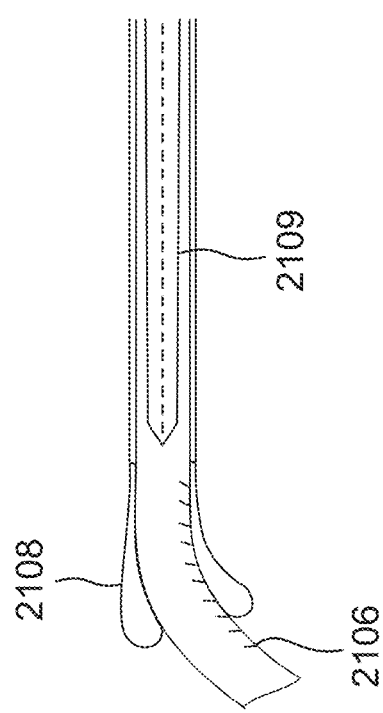
Fig. 21A
Fig. 21B

2308

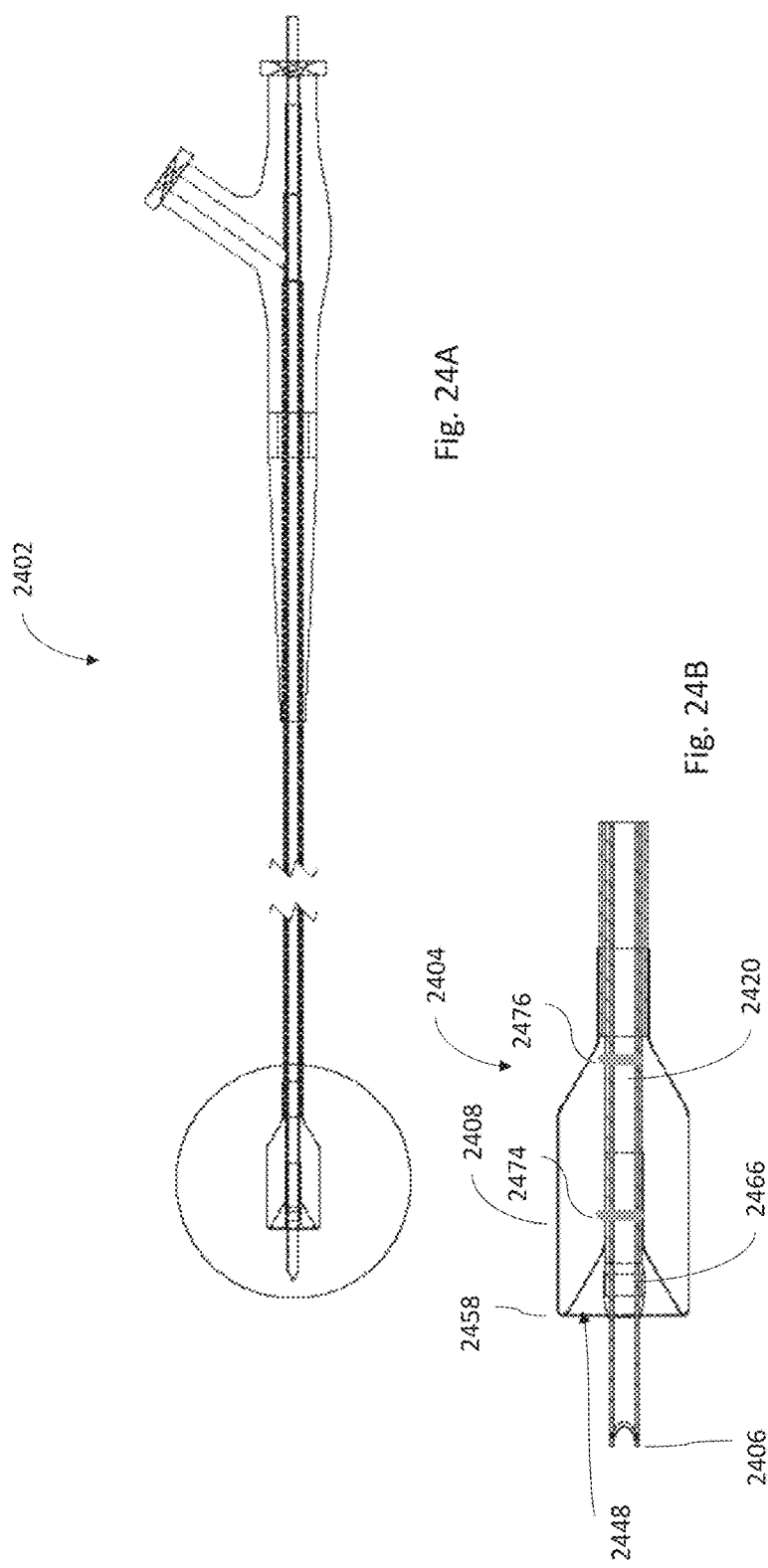

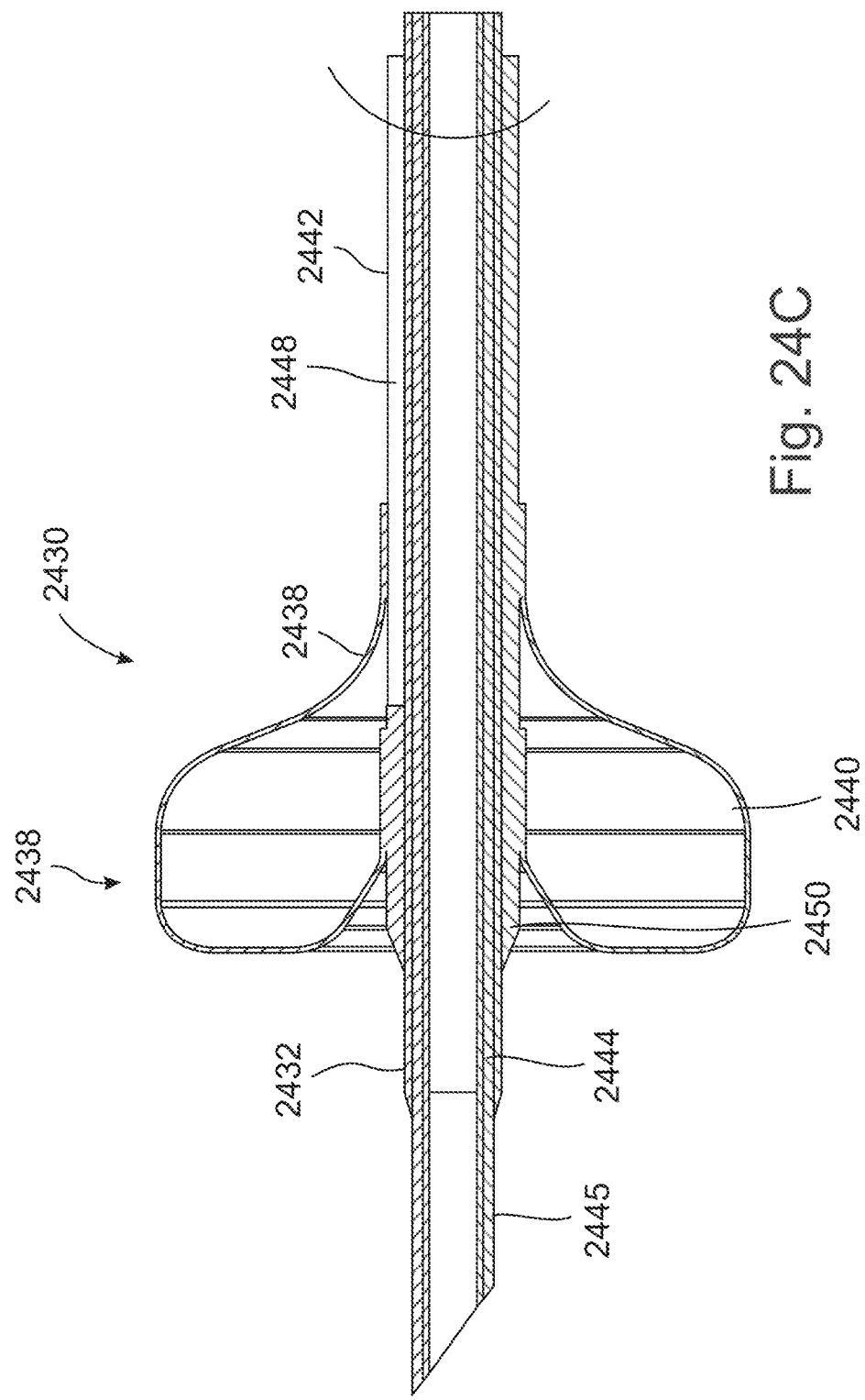

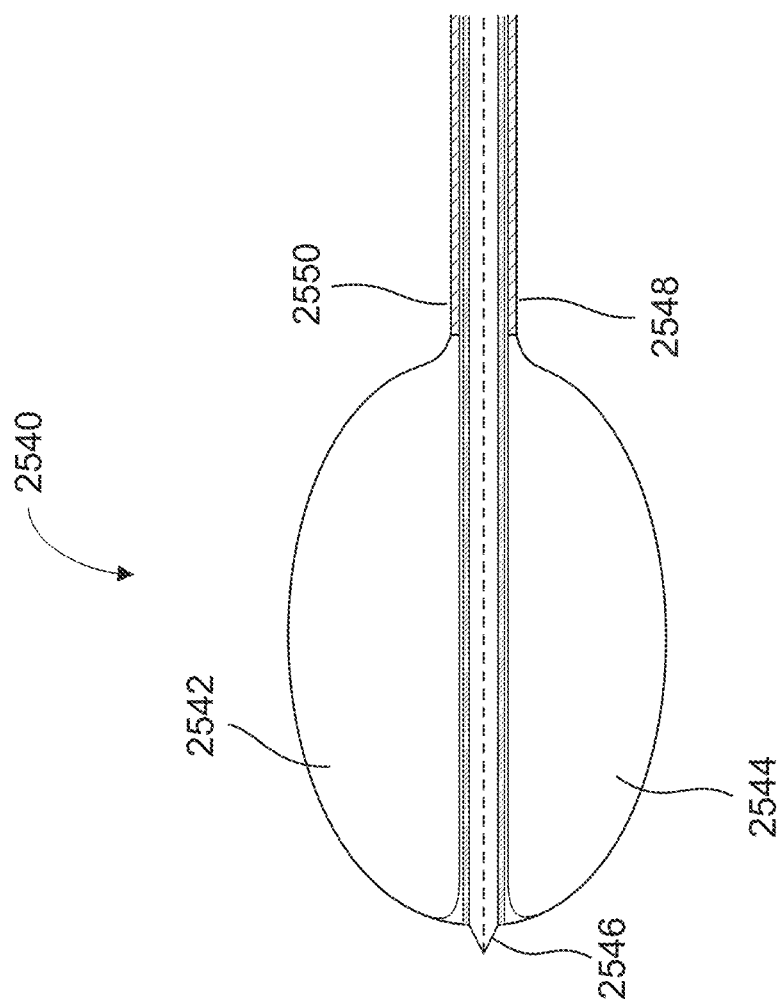

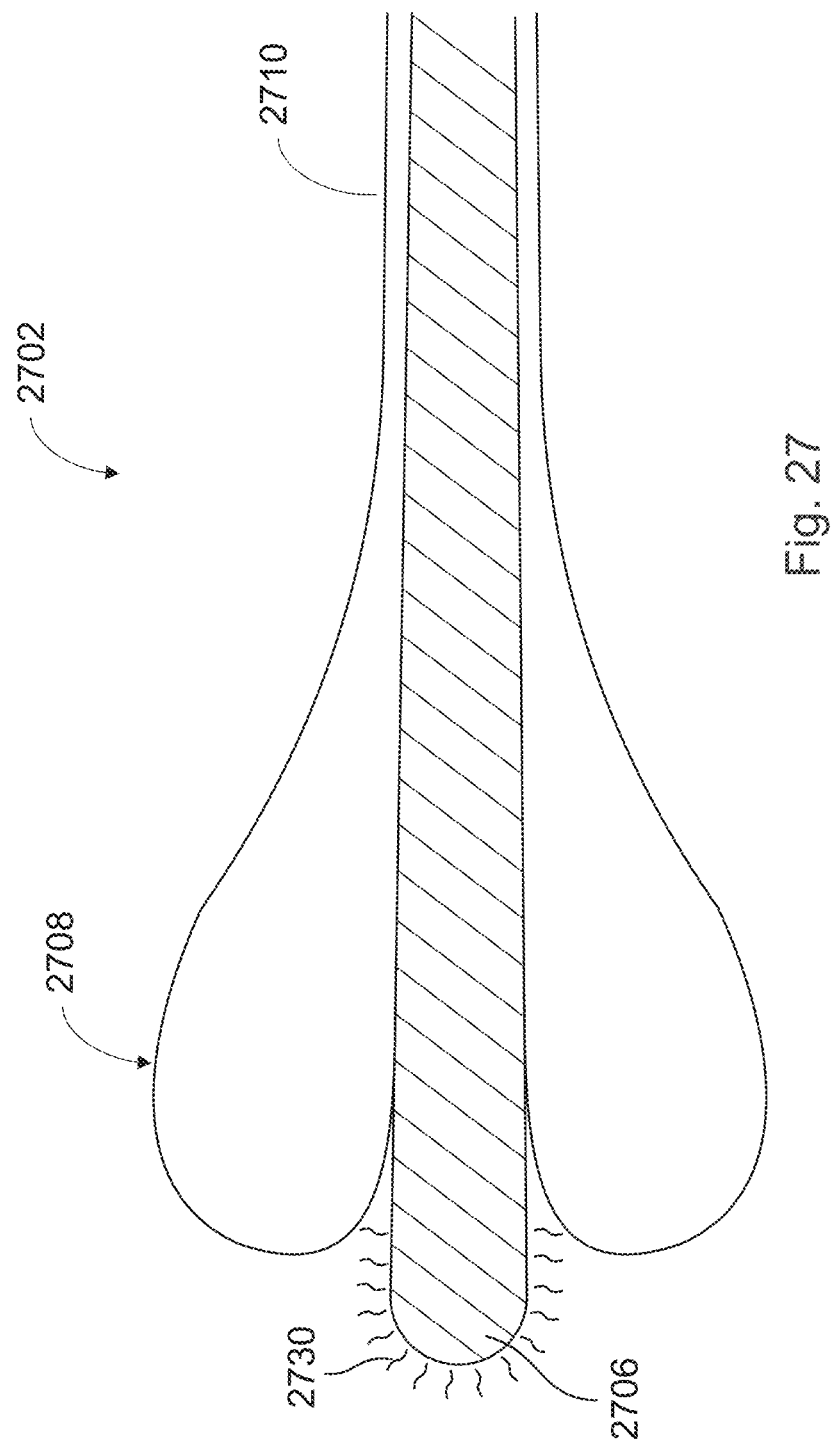

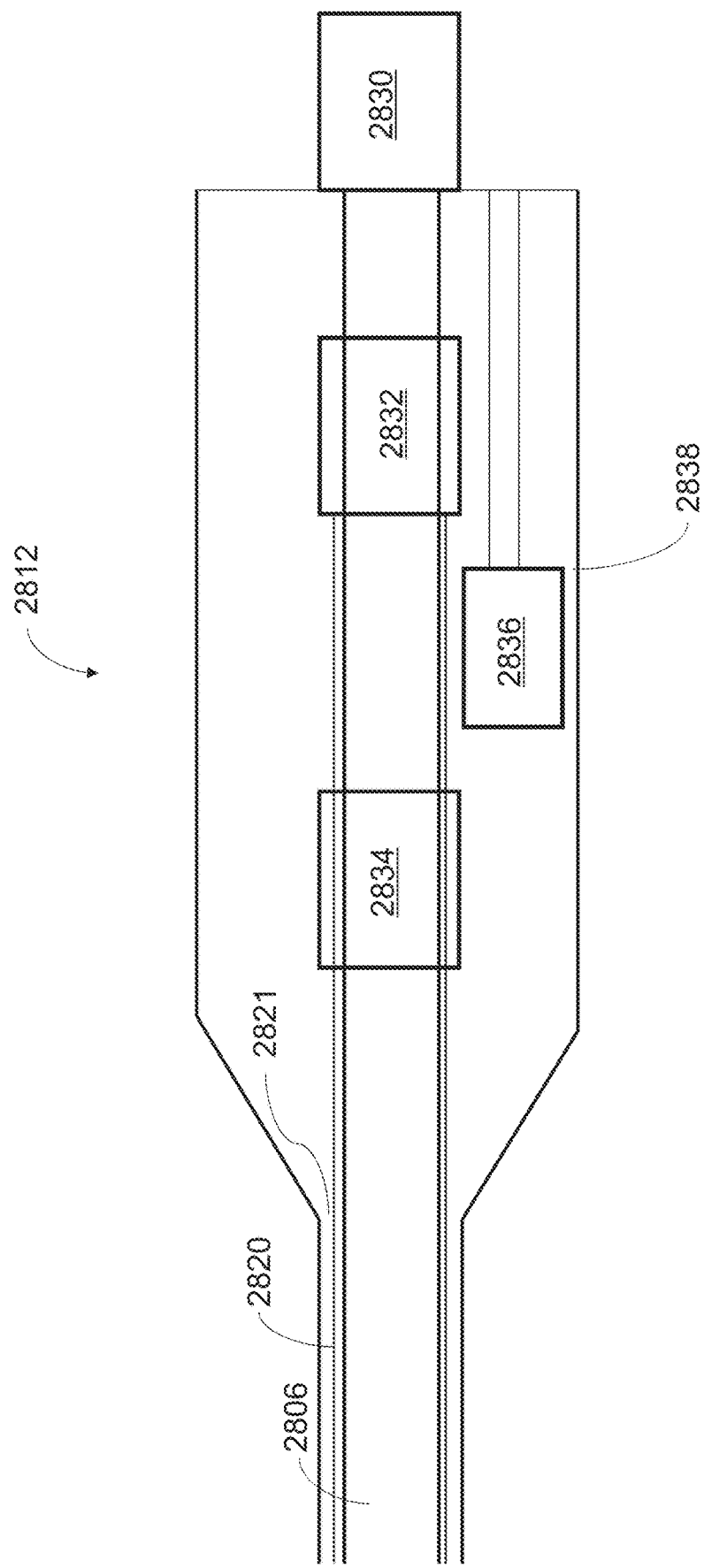

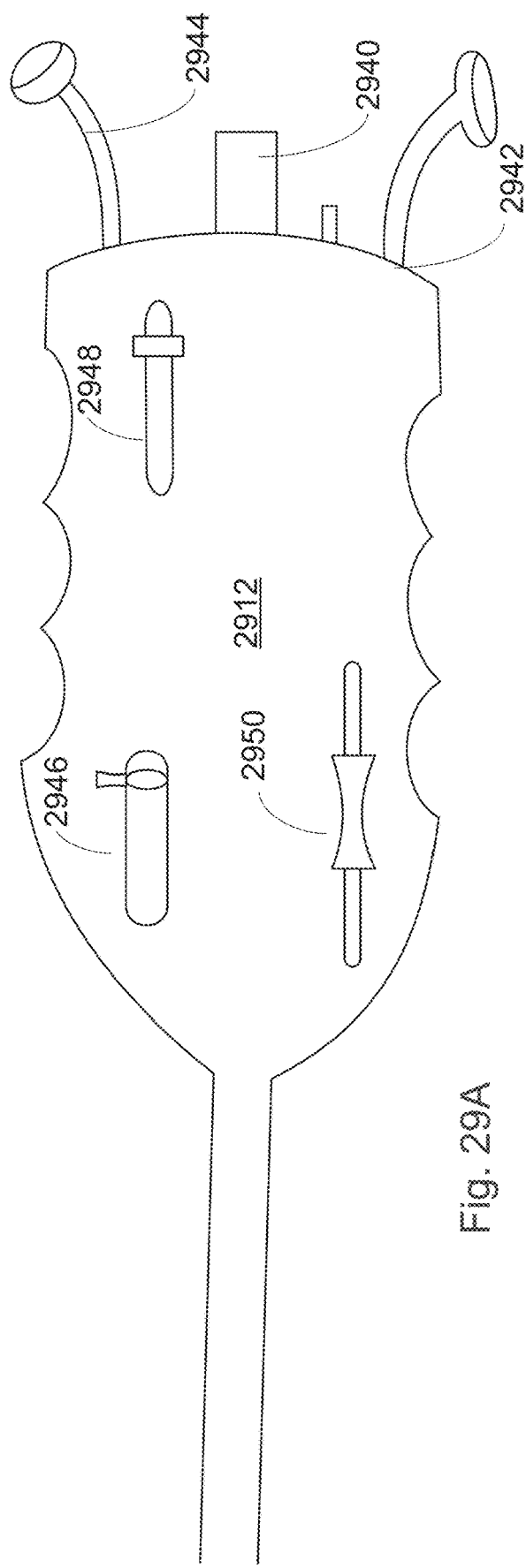
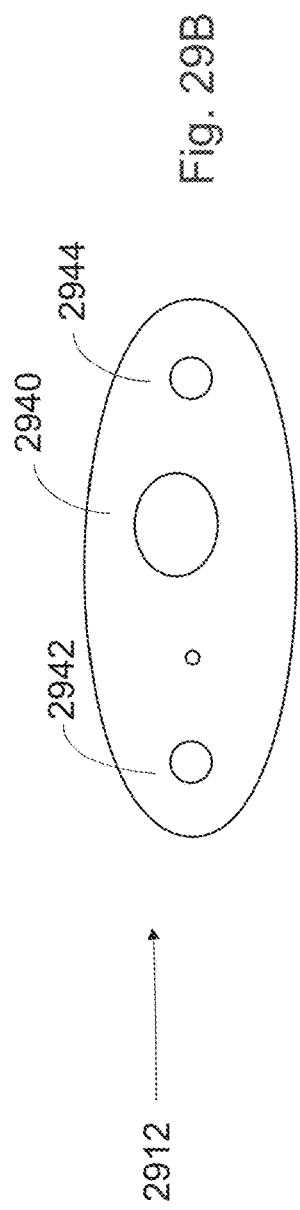
Fig. 29A
Fig. 29B

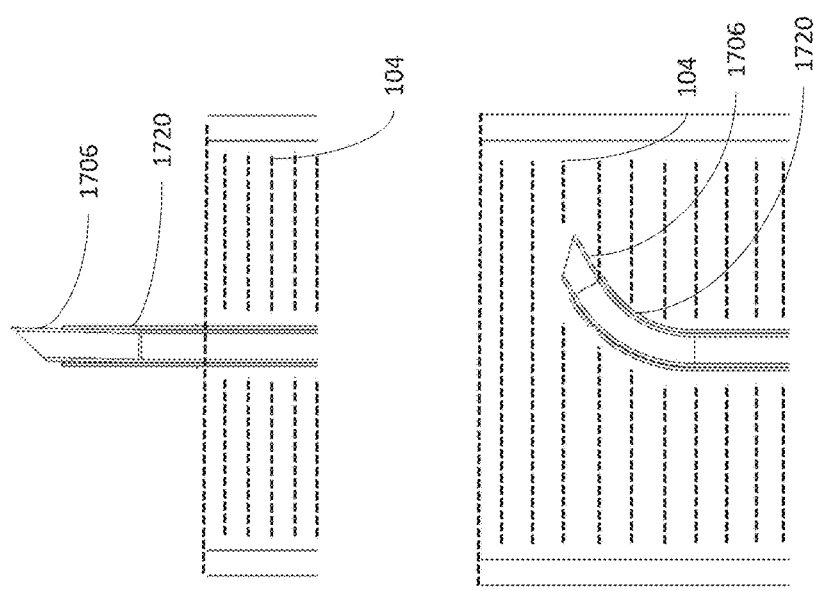
Fig. 35A
Fig. 35B
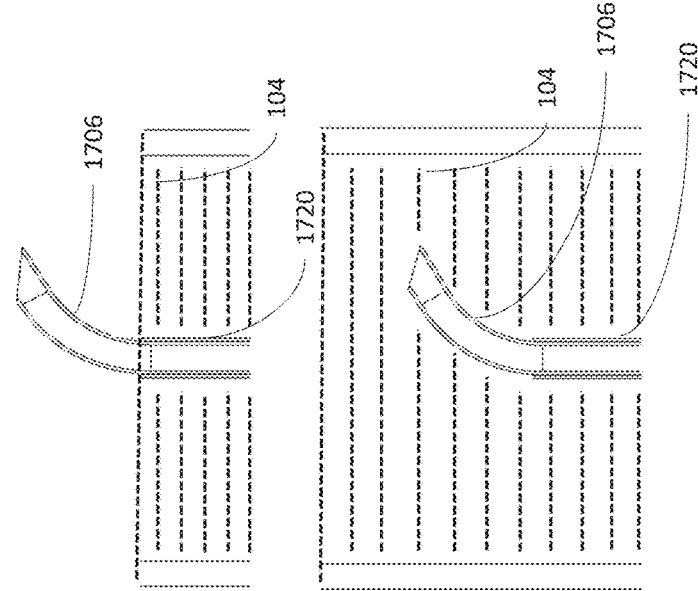
Fig. 34A
Fig. 34B

VESSEL BLOCKAGE PASSING

RELATED APPLICATIONS

This application is a Continuation of U.S. patent application Ser. No. 18/572,204 filed on Dec. 20, 2023, which is a National Phase of PCT/IL2022/050716 having International filing date of Jul. 5, 2022, which claims the benefit of priority under 35 USC 119(e) of U.S. Provisional Patent Application No. 63/218,421 filed on Jul. 5, 2021. The contents of the above applications are all incorporated by reference as if fully set forth herein in their entirety.

FIELD AND BACKGROUND OF THE INVENTION

The present invention, in some embodiments thereof, relates to passing blockages in vessels, and, more particularly, but not exclusively, to a catheter and method for passing blockages in veins.

Chronic Venous Occlusions (CVO's) typically develop from either chronic Deep Vein Thrombosis (DVT), Post-Thrombotic Syndrome (PTS), or May-Thurner's Disease. DVT starts as a blood clot in the peripheral veins, such as the Iliac or Femoral veins. The blood clot forms because of low blood flow, this can occur from long hours of sitting, for example, flying, or with age, smoking, and other risk factors associated with cardiovascular disease. If a DVT clot is not resolved fully, either by lysis or catheter directed thrombolysis (CDT), it transforms from a soft thrombus into a fibrotic collagen-based scar tissue. Unresolved DVT can result in a pulmonary embolism, blocking blood flow to the lungs. Vein blockages can also result in a clinical presentation of swollen or heavy legs, pain, trouble walking, and skin ulcers. If the occlusion is not resolved, the ulcers can progress, however, this is not a disease that is fatal. Despite the pain, patients will often live with these occlusions for years.

One challenge facing healthcare providers regarding these occlusions is opening them up. The current treatments such as blood thinners (pharmaceuticals) and compression stockings are mainly ineffective at long-term healing of ulcers and they fail to treat the source of the pain, the occlusion itself. Patient compliance is a major problem with conservative treatments. Compression stockings are often hot, difficult to apply, cause skin damage, and can cost as much as $100 per pair.

Khaja, M. S., Chick, J. F. B., Schuman, A. D., Cooper, K. J., Majdalany, B. S., Saad, W. E., & Williams, D. M. (2017). "Fluoroscopic Targeting of Wallstents and Amplatzer Vascular Plugs in Sharp Recanalization of Chronic Venous Occlusions" in CardioVascular and Interventional Radiology, 40(11), 1777-1783, the disclosure of which is incorporated herein by reference, shows the use of a needle to cross a CVO (chronic venous occlusion).

Berg, N. J., Dankelman, J., & Dobbelsteen, J. J. (2017), "Endpoint Accuracy in Manual Control of a Steerable Needle", in Journal of Vascular and Interventional Radiology, 28(2), doi:10.1016/j.jvir.2016.07.018, the disclosure of which is incorporated herein by reference, describes steerable needles.

Additional background art includes US 2020/0269014, U.S. Pat. No. 7,776,062, US2015051625, U.S. Pat. Nos. 9,737,333, 10,744,304.

SUMMARY OF THE INVENTION

Following is a non-exclusive list including some examples of embodiments of the invention. The invention also includes embodiments which include fewer than all the features in an example and embodiments using features from multiple examples, also if not expressly listed below.

Example 1. Apparatus for passing a blocked vein, comprising:
(a) an intravascular catheter body defining at least one lumen;
(b) a radially expandable anchor at a distal end of said catheter; and
(c) a penetration tool sized and shaped to be delivered by said lumen to a point distal of said radially expandable anchor, said penetration tool including a tip and configured for being pushed through venous blockage more than one week old and having with a young's modulus greater than 1 MPa.

Example 2. Apparatus according to example 1, wherein said penetration tool tip comprises a sharpened tip.

Example 3. Apparatus according to example 2, wherein said tip is asymmetrically sharpened.

Example 4. Apparatus according to example 2, wherein said tip is symmetrically sharpened.

Example 5. Apparatus according to any of examples 1-3, wherein said tip is hollow.

Example 6. Apparatus according to any of examples 1-5, wherein said tool is stiff enough to be pushed through a solid such blockage.

Example 7. Apparatus according to any of examples 1-6, wherein said tip includes a heater.

Example 8. Apparatus according to any of examples 1-7, wherein said penetration tool is configured for RF emission from said tip.

Example 9. Apparatus according to any of examples 1-8, wherein said penetration tool is configured for rotation within said lumen.

Example 10. Apparatus according to any of examples 1-9, wherein said blockage has a Young's modulus of at least 50 MPa.

Example 11. Apparatus according to any of examples 1-10, wherein said blockage has a content of at least 30% by volume fibrosis tissue.

Example 12. Apparatus according to any of examples 1-11, wherein said blockage has a content of at least 30% by volume collagen.

Example 13. Apparatus according to any of examples 1-12, wherein said penetration tool is bendable at a bend location at a distal end thereof such that said tip is steerable.

Example 14. Apparatus according to example 13, wherein said penetration tool is bendable at an angle selectable between 0 and 60 degrees.

Example 15. Apparatus according to example 13, wherein said penetration tool is adapted for said bending by pre-cutting thereof. Optionally, said pre-cutting comprises defining cuts on a concave side of said penetration tool which resist bending after reaching a pre-selected bending angle. Optionally or additionally, said pre-cutting uses different patterns of cuts on a ventral side and on a dorsal side of said penetration tool, one of said patterns configured to resist bending and another of said patterns configured to assist bending.

Example 16. Apparatus according to example 13, wherein said penetration tool comprises a pull-wire attached thereto at a distal side thereof.

Example 17. Apparatus according to example 13 or example 16, wherein said penetration tool is pre-bent.

Example 18. Apparatus according to example 13 or example 16, wherein said lumen includes a stiffened lumen section stiff enough to straighten said penetration tool at said bend location when said bend location is within said stiffened lumen section.

Example 19. Apparatus according to any of examples 13-18, comprising a stylet configured to selectably change a shape of said penetration tool at said bend location when said stylet is within said bend location.

Example 20. Apparatus according to any of examples 13-18, wherein said penetration tool is formed of a superelastic material.

Example 21. Apparatus according to any of examples 1-20, comprising an axially slidable sheath in said lumen and outside said penetration tool and which optionally shapes the penetration needle as it passes thereover.

Example 22. Apparatus according to any of examples 1-21, wherein said expandable anchor comprises one or more balloons.

Example 23. Apparatus according to example 22, wherein said balloon has a distance of less than 3 mm between (i) a most distal section which is less than 20% of a maximal diameter of said balloon and (ii) a more proximal section which has a diameter of more than 80% of said maximal diameter.

Example 24. Apparatus according to example 22, wherein said balloon has distal concavity facing axially.

Example 25. Apparatus according to any of examples 22-24, comprising a handle and wherein said handle optionally includes a chamber containing inflation fluid for said balloon and can actively inflate the balloon from this chamber without requiring an external inflation device.

Example 26. Apparatus according to example 25, wherein said handle comprises a first control for rotating and/or for bending said penetration tool and a second control for advancing and retracting said penetration tool.

Example 27. Apparatus according to example 25 or example 26, wherein said handle comprises a control for bending said penetration tool.

Example 28. Apparatus according to any of examples 1-27, wherein said anchor and apparatus define a distal exit point where said penetration tip exits said anchor and wherein said anchor includes a portion with a diameter greater than said penetration tip and which extends distally at least 1 mm past said exit point.

Example 29. Apparatus according to any of examples 1-27, comprising at least one radiopaque marker which indicates an expected bending direction of said penetration tool tip.

Example 30. A method of passing a blockage in a vein, comprising:
(a) advancing a catheter transvascularly to a location in a vein adjacent a blockage location;
(b) anchoring said catheter by radial expansion of a portion thereof; and
(c) forcing a penetration tool out of a lumen of said catheter and into said blockage,
wherein said blockage is a venous blockage more than one week old.

Example 31. A method according to example 30, wherein said blockage presents with a young's modulus greater than 1 MPa.

Example 32. A method according to example 30 or example 31, wherein said blockage comprises fibrotic and collagenous elastic scar tissue.

Example 33. A method according to example 30, wherein said forcing comprises penetrating by piercing into a bulk of said blockage rather than passing through a microchannel therein.

Example 34. A method according to example 30 or example 33, wherein said vein includes at least two blocked bends with a bending radius of between 10 and 200 mm and comprising steering a tip of said penetration tool to maintain said tool within the lumen of said vein.

Example 35. A method according to any of examples 30-34, comprising rotating said penetration tool.

Example 36. A method according to any of examples 30-34, comprising changing an orientation of said penetration tool.

Example 37. A method according to any of examples 30-36, wherein said forcing comprises coring said blockage with said penetration tool.

Example 38. A method according to any of examples 30-37, wherein said forcing comprises applying energy at a tip of said penetration to weaken said blockage.

Example 39. A method according to example 38, wherein said energy includes heat and/or RF.

Example 40. A method according to any of examples 30-39, comprising radially contracting said portion and advancing said catheter into said blockage and repeating (b) and (c) multiple times.

Example 41. A method according to the current invention, wherein said repeating comprises thereby passing a blockage of over 2.5 cm in length and any tortuosity $\tau$ from 1 to 2 in all directions and in all planes, for all sections of a traversed blockage, where $\tau$ is defined for a curve section as a ratio of length of a curve of a section to a distance between ends of the section, where the blockage is divided up into sections of constant sign of curvature Example 42. A method according to any of examples 40-41, wherein said anchoring comprises anchoring using a balloon and wherein said radial expansion widens a passage formed by said penetration tool.

Example 43. An intravascular balloon, comprising:
a flexible body, sized and shaped for insertion into a blood vessel, said body extending along an axial direction and said body defining a first axial location with a maximal expansion diameter at a resting state of said body;
said body defining at least one circumferentially extending geometry at an axial location other than said first axial location, which geometry is configured to assist in folding of said body.

Example 44. An intravascular balloon according to example 43, wherein said body is semi-compliant.

Example 45. An intravascular balloon according to example 43 or example 44, wherein said body is sealably mounted on an elongate shaft.

Example 46. An intravascular balloon according to any of examples 43-45, wherein said geometry comprises a radial crimp.

Example 47. An intravascular balloon according to any of examples 43-46, wherein said geometry is located at a distal side of said first axial location and is configured to support inversion of a more distal part of said body into a more proximal side of said body, during manufacture.

Example 48. An intravascular balloon according to any of examples 43-47, wherein said geometry is located at a proximal side of said first axial location and is configured to guide folding of said balloon during deflation thereof to preferentially collapse in a radial direction.

Example 49. A method of estimating material properties of a tissue in which a penetration tip is located, comprising:
(a) advancing a tip deformer along the tip, where the deformer has a different axial geometry than said tip and is stiffer than said tip; and (b) detecting a change in geometry of said tip in response to said tip deformer advancement.

Example 50. A method according to example 49, wherein said tip deformer comprises a sheath advanced over said tip.

Example 51. A method according to example 49, wherein said tip deformer comprises a stylet advanced within a lumen of said tip.

Example 52. A method according to any of examples 49-51, wherein said tip is part of a tool located within a blood vessel.

Example 53. A method according to example 52, comprising assessing if said tip is inside the blood vessel based on said detected change.

Example 54. A method according to example 52 or example 53, comprising assessing if said tip is inside an occlusion in the blood vessel based on said detected change.

Example 55. A method according to any of examples 52-54, comprising advancing said tip and repeating said (a) and said (b) a plurality of times while passing an occlusion in a blood vessel.

Example 56. A method according to any of examples 52-55, wherein said blood vessel is a chronically occluded peripheral vein.

Example 57. A method according to any of examples 49-56, wherein said tip is bent and said tip deformer has a resting state of being straight.

Example 58. A method according to example 57, wherein said tip is bent over an arc of at least 45 degrees.

Example 59. A method according to example 57 or example 58, wherein said tip has a resting state of being bent.

Example 60. A method according to example 57 or example 58, wherein said tip is actively bent.

Example 61. A method according to any of examples 49-60, wherein said detecting comprises detecting using x-ray imaging.

Example 62. A method according to any of examples 49-61, wherein said detecting comprises detecting using ultrasound imaging.

Example 63. A method according to any of examples 49-62, wherein said detecting comprises detecting using a bend-indicating sensor in a tool including said tip.

Example 64. A method according to any of examples 49-63, wherein a deforming force applied by said tip deformer is greater than a resistance of said tip to said deformation and smaller than a sum of said resistance and a resistance of a venous chronic occlusion.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 16B shows a penetration tip with a radio-opaque marker which may be useful for indicating orientation, in accordance with some embodiments of the invention;

FIG. 19 shows a design for a penetration tip, of a blockage penetrator system, in accordance with some embodiments of the invention;

FIG. 20E shows exemplary tip cutaway designs, in accordance with exemplary embodiments of the invention;

FIGS. 21A-21B are cross-sectional views of a tip of blockage penetrator system illustrating stylet-based bending, in accordance with some embodiments of the invention;

FIGS. 24A-24B shows a cross-sectional view of a blockage penetration system with a balloon with an inverted distal neck, in accordance with some embodiments of the invention;

FIG. 24C is a side cross-sectional view of a BPS in accordance with some embodiments of the invention;

FIG. 25F shows a multi-chamber balloon design for a BPS, in accordance with some embodiments of the invention;

FIGS. 26-27 show cross-sectional views of tip of blockage penetration systems having active energy deposition, in accordance with some embodiments of the invention;

FIG. 28 is a block diagram of a handle for a blockage penetration system, in accordance with some embodiments of the invention;

FIGS. 29A, 29B, 29C and 30 are schematic showings of handles for operating a blockage penetration system, in accordance with some embodiments of the invention;

FIGS. 34A and FIG. 34B show a curved penetration tip in a starting position outside of and inside of an occlusion, respectively, according to some embodiments of the invention;

FIGS. 35A and FIG. 35B show a curved penetration tip after advance of a sheath along it outside of and inside of an occlusion, respectively, according to some embodiments of the invention.

DESCRIPTION OF SPECIFIC EMBODIMENTS OF THE INVENTION

Figure 1:
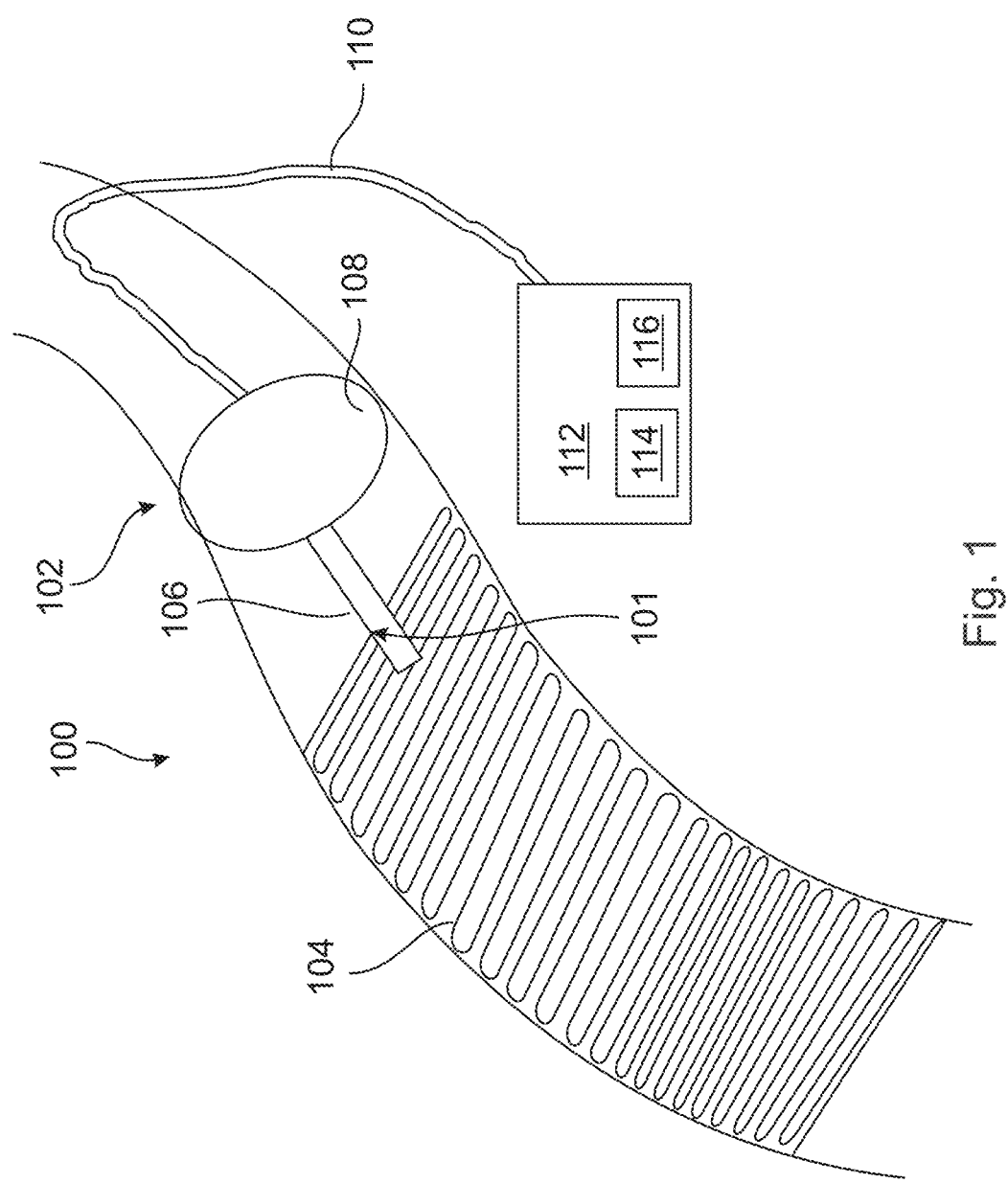
FIG. 1 is a schematic showing of a blocked vein and a blockage penetrator for passing the blockage, in accordance with some embodiments of the invention.

The present invention, in some embodiments thereof, relates to passing blockages in vessels, and, more particularly, but not exclusively, to a catheter and method for passing blockages in veins.

A broad aspect of some embodiments of the invention relates to passing blockages in veins, for example, deep veins. In some embodiments of the invention, the blockage is stable and includes one or both of fibrotic material and collagen, often resembling scar tissue. In some embodiments of the invention, the blockage is total in that it reduces blood flow through the blocked vein by at least 80%, 90%, 95%, 98% or even 100%, or intermediate percentages of the original vein diameter, potentially preventing any blood flow from passing. In some embodiments, enough of the vein is occluded to prevent adequate drainage requiring intervention. In some embodiments of the invention, passing the blockage includes during and/or after passing, creating a flow channel for resuming functionality of the vein for drainage. In some embodiments of the invention, part of the blockage is removed from the body, for example, 5%, 10%, 20%, 30%, 50% or smaller or intermediate or greater percentages, by volume, of a total blockage portion.

In some embodiments of the invention, a vein blockage penetration system is provided which includes a local stabilizer, such as a balloon, configured to expand and anchor the system near the blockage and a penetration tool which extends through or by the balloon into the blockage. In some embodiments of the invention, the system (e.g., balloon and/or penetration tube) includes a guidewire channel to support delivery over a guidewire. In other embodiments, no guidewire is provided. In some embodiments of the invention, the penetration tool is bendable relative to an elongate longitudinal axis of said system. Optionally or additionally, the penetration tool is rotatable around said longitudinal axis.

A particular feature of some embodiments of the invention relates to vein blockages presenting differently from arterial blockages. Typically, venous fibrotic occlusions present as rubbery like substances that completely occlude the vein. A potential problem with opening such a blockage using a balloon and a stent arises if the physician attempts to track a guidewire across an unopened lesion. The guidewire provides the "track" for the balloon and stent. Such tracking is often difficult due to the fibrotic and occlusive nature of such lesions. In a typical process, a physician attempts to find microchannels inside the occlusion that will lead the guidewire to the other side. Like a labyrinth, however, there may be multiple "dead ends" where the physician must retreat and try another passage. Lack of proper imaging often makes the process trial and error with a lot of backtracking. In up to 10% of cases, physicians fail to cross the lesion. In many cases, "successful" crossing can take up to six hours and uses up to five guidewires. This inability to cross costs the hospital significant time and money. Also, in the USA, when a procedure is aborted only partial reimbursement is provided from insurance companies. In accordance with some embodiments of the invention, a penetration tool capable of penetrating blockages also not via micro-channels may contribute to reducing crossing time.

An aspect of some embodiments of the invention relates to penetrating a vein blockage. In some embodiments of the invention, such a vein blockage is stiffer and/or tackier, and or highly elastic like rubber as compared to a fresh thrombus. For example, such a non-fresh thrombus may have been in-situ for over 14, 30, 60, 90 days or intermediate times, or longer, such as up to as long as 10 years.

In some embodiments of the invention, penetration is assisted by using a stiffer and/or sharper tool than a guidewire. It is noted that vascular guidewires are often selected for their ability to be atraumatic and flexible. In some embodiments of the invention, the tool is stiff having a high bending modulus and column strength, for example, above 1 GPa. Optionally or additionally, the tool is configured (stiffness, diameter) to be push-able into an elastic material with a Young's modulus above 10 MPa, 100 MPa, 1000 MPa, or intermediate or greater moduli of elasticity. Optionally or additionally, the penetration tool is sharpened. In some embodiments of the invention, the penetration tool includes a hollow tip. Optionally, the hollow tip is used to reduce an effective cross-section of the tool, optionally using vacuum to suck out cored parts of a blockages. Optionally or additionally, the hollow tip is used to receive a stylet which is used for guiding and/or for stiffening of the penetration tool.

In some embodiments of the invention, a hollow sheath is provided surrounding the penetration tool (e.g., but inside the shaft of the catheter), which hollow sheath may be pre-bent or straight and acts to force at least part of the penetration tool to conform to the geometry of the sheath.

In some embodiments of the invention, the sheath is pre-bent, additionally or alternatively to the penetration tool being pre-bent. Optionally, this is used to control the direction of penetration, before extension of a penetration tool out of the sheath, by rotation of the sheath. Such control can even be applied while the sheath is maintained straight (e.g., by a surrounding sheath or internal stylet).

In some embodiments of the invention, the tip of the penetration tool uses energy deposition to assist in penetration, for example, the tip may deliver heat and/or radiation which may soften the blockage potentially providing for easier and/or smoother penetration.

In some embodiments of the invention, a method of blockage passing comprises penetrating the blockage with a penetration tool, advancing an expandable structure into the blockage, expanding the structure, and further advancing the penetration tool. Optionally, the penetration tool is advanced at an angle relative to a longitudinal axis of the penetration system, for example, being steered.

An aspect of some embodiments of the invention relates to a steerable vein penetration tool. In some embodiments of the invention, such steering is used to guide the penetration tool, so it travels within a vein and does not exit the wall of the vein when the vein bends and/or due to deflection by the blockage.

In some embodiments of the invention, the tool tip is pre-bent but is maintained in a straight configuration by a surrounding sheath, for example, located at least in part within the balloon anchor of the system. When the tip is advanced sufficiently to extend the pre-bent part out of the sheath, the tip bends to the side, providing steering. This embodiment of the tip is optionally made out of shape memory metal, e.g., nitinol. In some embodiments of the invention, the sheath is advanced while enclosing the penetration tip. This may prevent damage to tissue by the tip. When the sheath is retracted, the penetration tip, if pre-bent, can bend. In some embodiments of the invention, such advancing is provided over a space between the blockage passing device and a blockage.

In some embodiments of the invention, the tool tip includes a pull-wire to selectively straighten and/or bend the tip. The tip may be pre-shaped to bend or to be straight, in some embodiments. Optionally, the pull-wire sits in a groove formed in an outside wall of the penetration tool.

In some embodiments of the invention, the tool tip is steered using an internal pre-bent stylet. Optionally, the tip includes a weakened part which conforms, at least in part, to the shape of the stylet.

In some embodiments of the invention, a sheath is provided over the penetration tool (and within the lumen of the device) and which can serve to shape the penetration tip (e.g., maintain it straight or bend it, depending on the design of the sheath). Optionally, the sheath is advanceable and/or rotatable.

A potential advantage of such steering is to support passage of relatively long and convoluted blocked veins, for example, at least 1 cm, 3 cm, 5 cm, 10 cm, 15 cm, 20 cm long or smaller or intermediate lengths. Optionally, the vein includes a sequence of curves in different plane and possibly with less than 10 cm, 5 cm, 3 cm between curves.

In some embodiments of the invention, a tortuous vein includes at least one and optionally two curves, each with a bending radius between 10 and 100 mm. Optionally, the vein has a diameter between 1 and 30 mm.

In some embodiments of the invention, the veins being treated are not-superficial veins, for example, being deep veins, possibly with insufficient collaterals. When dealing with tortuous veins, it may be important to avoid, or alternatively to go into branching veins. In some embodiments, this is controlled using a steering capability as described herein.

In some embodiments of the invention, the penetration system is designed with a kink resistance suitable for the tortuosity. For example, the penetration tool, any sheath, and balloon/shaft may have a kink radius of, for example, 20 mm, 15 mm, 10 mm or less or intermediate sizes.

An aspect of some embodiments of the invention relates to minimizing spacing between the expanding anchoring element and the blockage. In some embodiments of the invention, the expandable anchor is a balloon and the balloon includes flat or concave distal end, so that the anchoring part of the balloon is closer to the start of the blockage than if a distally tapered balloon were used. In some embodiments of the invention, the distance between the anchoring part of the balloon and the distal tip of the balloon of the blockage is less than 5 mm, 3 mm, 2 mm, 1 mm or smaller or intermediate amounts.

In some embodiments of the invention, the balloon extends distally past the point in the balloon where the penetration tip exits, for example, being 1 mm, 2 mm, 3 mm, 5 mm or intermediate or more recessed. In some embodiments of the invention, the balloon distal end is shaped like a concave donut, with a rim and central region (e.g., through which the penetration tool extends) more distally extending than a section between them. In some embodiments of the invention, the balloon is shaped like a sphere intersection with a cylinder, so it has flat sides. In some embodiments of the invention, the balloon is spherical, ovoid and/or asymmetrical (e.g., one end flatter than another). In some embodiments of the invention, the balloon is spherical with a proximal taper. Optionally, the balloon is provided in several diameters, for example, between 6 mm and 24 mm, in steps of 2 mm. Optionally or additionally, the balloon is selected to be slightly oversized for the target vessel, for example, between 1 and 3 mm oversized, for example, between 10% and 30% of the vein resting diameter. Optionally, the balloon is between 2 and 30 mm long, for example, between 2 and 10 mm, between 10 and 20 mm and/or between 20 and 30 mm.

An aspect of some embodiments of the invention relates to ease of use of a blockage passing system. In some embodiments of the invention, the system uses an anchoring balloon which is repeatedly inflated and deflated. Optionally, the inflation fluid is stored in a handle used to control the system. Optionally or additionally, the handle includes a steering control for, for example, bending and/or rotating a penetration tool relative to the balloon. Optionally or additionally, the handle includes an advancement control for selectively advancing and retracting the penetration tool relative to the balloon.

If a manipulatable sheath is provided for the penetration tip, a control to manipulate the sheath (e.g., advance/retract, turn and/or bend) is optionally provided in the handle.

An aspect of some embodiments of the invention relates to a balloon with a folding directing geometry, for example, in the form of one or more circumferential crimps. In some embodiments of the invention, a circumferential crimp assists in refolding of the balloon when emptied. Optionally or additionally, a circumferential crimp assists in eversion of the balloon during manufacture.

An aspect of some embodiments of the invention relates to evaluating tissue type surrounding the tool tip. In some embodiments of the invention, such evaluation is used to detect if a penetration tip is inside an occlusion and/or if such tip is outside of a blood vessel and/or if a surrounding occlusion is less or more stiff and/or if such tip is inside a blood vessel and past an occlusion.

A potential advantage of such evaluation is that an occlusion may be difficult to image, for example, contrast material cannot easily be injected into it.

In some embodiments of the invention, a penetration tip with a first geometry has its geometry changed (or attempted to be changed) by an inner stylet and/or an external sheath with a different geometry.

In some embodiments of the invention, a balance of forces applied to the penetration tip determines if and how much the tip will deform. For example, if the penetration tip is pre-bent and a straight sheath is advanced over the tip, the stiffness of the surrounding tissue may decide if the tip straightens. For example, if the resistance of the tissue plus the resistance of the needle is greater than the force applied by the sheath, the tip will not straighten, or will straighten less or the sheath will follow the curve of the needle. This same calculus applies if a hollow tip is straightened (or bent) using an inserted stylet of different geometry. It is expected that the stiffness of tissue outside a blood vessel, for example, interstitial tissue, is lower than that of a venous obstruction and higher than that of blood.

In some embodiments of the invention, the stiffness of the tip and its resiliency are selected so that a bent penetration tip will straighten if not in a mature venous occlusion but will straighten the penetration tip when the penetration tip is in an un-occluded lumen of the vessel or outside the lumen.

In some embodiments of the invention, such behavior of the tip is used to detect if the penetration tip inadvertently exited the vessel and/or to detect if/when an occlusion is traversed. In such cases, the tip is expected to be straightened by the sheath.

In some embodiments of the invention, the geometry of the tip is identified using an X-ray image. Optionally, one or more fiduciary markers are used to judge the rotational aspect of the tip. Optionally or additionally, an ultrasound imager or other imager is used. Optionally or additionally, a sensor (e.g., a tension sensor or bend sensor) is used to report on the tip geometry.

In some embodiments, the presence of an obstruction is determined, at least in part, based on a resistance to advancement of the sheath, such resistance caused, for example, by a need of the sheath to bend and/or friction between the sheath and the tip and/or between the sheath and the surrounding tissue.

In some embodiments of the invention, the sheath is coated with a hydrophilic coating and/or has a tapered from end and/or is thin, and resistance to its advance is small.

An aspect of some embodiments of the invention relates to the design of a bendable penetration tip in the form of a cut hollow tube that is designed to bend in a single plane and including different cuts designs for a bending direction than for a non-bending direction. Optionally, the penetration tip is designed to only bend in one direction. Optionally, the cuts are arranged to encourage bending in only a single plane. Optionally, there is a preferred bending direction. In some embodiments, the cuts define an engagement step including a tab and a wall, by which bending in a certain, ventral, direction is resisted substantially more after the tab abuts against the wall. This has a potential advantage of increasing pushability in a bent state.

Optionally or additionally, the tube, on a dorsal side, opposite to said ventral side includes cuts for flexibility. This has the potential benefit of reducing resistance to shaping by an overtube.

In some embodiments of the invention, different engagement steps have a different resistance to bending, such that as the penetration tip is bent, an increasing number of steps is engaged. Such engagement potentially increases pushability. In some embodiments of the invention, a compressible or flowable material, such as a polymer material, is provided in gaps defined by the cuts, for example, in the engagement steps. This has the potential benefit of modulating the mechanical properties of the engagement step. Optionally or additionally, this has a potential benefit of aligning the step and the wall. Optionally or additionally, this has the potential benefit of reducing metal-on-metal contact.

In some embodiments of the invention, the penetration tip is prebent. Optionally or additionally, the penetration tip is bent be a pull wire.

The cuts may be uniform or they may vary, for example, longitudinally and/or circumferentially (e.g., being arranged in a spiral configuration). This has a potential benefit of defining various shapes for the bent penetration tip other than just a single direction in plane bend.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Vein Blockage Penetrator

Referring now to the drawings, FIG. 1 is a schematic showing of a blocked vein 100 and a blockage penetrator system (BPS) 102 for passing a blockage 104 of vein 100, in accordance with some embodiments of the invention.

As shown a penetration tip 106 is used to penetrate into blockage 104, optionally at an entry point 101. An anchor 108, optionally a balloon, optionally aims tip 106 and/or anchors tip 106 in a transverse direction. A shaft 110 optionally extends out of the body (e.g., through a vascular port, not shown) and is connected to an optional control handle 112. In some embodiments of the invention, handle 112 includes one or more controls 114, for example for relative manipulation of tip 106 and balloon 108, for inflation and/or steering. Optionally or additionally, an inflation chamber 116 stores inflation fluid for anchor 108, in the handle.

In some embodiments of the invention, BPS 102 operates by using an expandable anchor 108. In some embodiments of the invention, BPS 102 is in the form of a catheter that is initially tracked over a guidewire to the lesion site. Once the catheter is distal to the lesion, balloon 108 is inflated. After balloon 108 is fully expanded, penetration tip 106 advances distally to puncture the occlusion.

Figure 2:
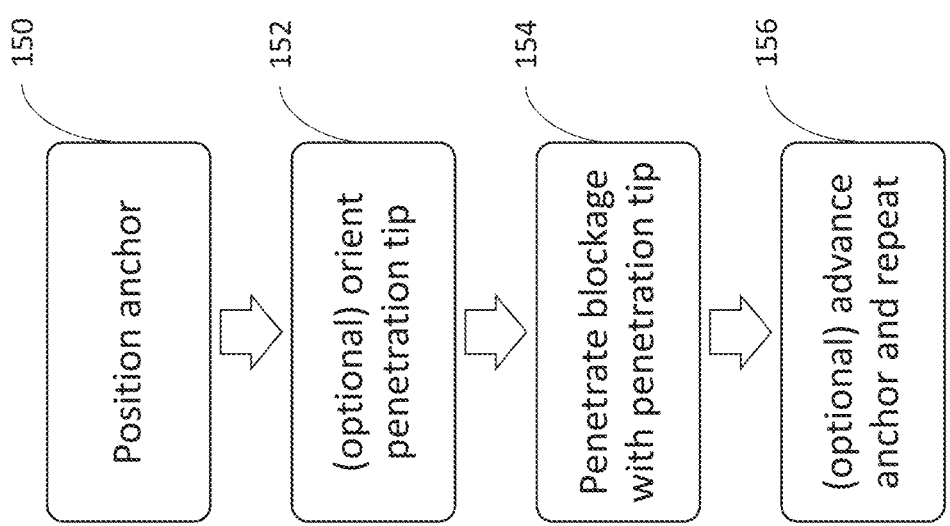
FIG. 2 is a top level flowchart of an operation of a blockage penetrator, in accordance with some embodiments of the invention.

Referring now to FIG. 2 which is a top level flowchart of an operation of BPS 102, in accordance with some embodiments of the invention.

At 150, anchor 108 (e.g., a balloon) is positioned in a vein near blockage 104. As shown below, an optional inverted neck in balloon 108 allows closer placement of balloon 108 to blockage 104 and/or allows expansion of balloon 108 to clear a larger cross-section of the vein up against the blockage. Optionally, positioning includes inflating balloon 108 to create space around the catheter and/or to center the catheter in the vein. Optionally or additionally, space creation (e.g., of order of the side of the balloon) is used to reduce the risk that advancement of penetration tip 106 will penetrate the vein wall.

In some embodiments of the invention, expansion of the balloon causes reactive forces from the vein wall and compressed blockage material which may serve to center and/or otherwise align BPS 102, potentially reducing the risk of inadvertent penetration of vein wall by the penetration tip.

Optionally, at 152, penetration tool tip 106 is aimed at blockage 104, for example, using steering of the penetration tool and/or using repositioning and/or reorientation of balloon 108.

At 154, penetration tip 106 is advanced into blockage 104. Optionally, the penetration tool is advanced, while the anchoring of balloon 108 prevents relative motion between balloon 108 and the wall of vein 100. This forces penetration tip 106 to move forward relative to the local vein wall. The sheath defined by balloon 108 may prevent sideways movement of penetration tip 106.

At 156, balloon 108 is optionally advanced into the core created by penetration tip 106, for example, being first deflated and/or with penetration tip 106 retracted. The process is now optionally repeated one or more times (e.g. supporting an earthworm-like movement). It is noted that expansion of balloon 108 inside blockage 104 may widen a channel therethrough and/or may be provided together or as a preliminary to stent delivery inside blockage 104. For example, a guidewire may be provided through BPS 102 and after blockage coring, BPS 102 may be withdrawn leaving the guidewire in place for guiding stent placement. Optionally, standard balloons and stents will then follow along the guidewire.

In some embodiments of the invention, BPS 102 is used to recanalize chronically occluded peripheral veins including the Iliac, Femoral, and/or Inferior Vena Cava. Additionally, the catheter can also be used for recanalizing occluded dialysis access channels such as central veins, e.g. brachiocephalic and/or external jugular, that are occluded after the long-term indwelling of a central venous catheter (CVC) and/or arteriovenous fistulas (AVF's) created for hemodialysis access. Optionally, BPS 102 is used with a guidewire as a first-in-line device.

In some embodiments of the invention, penetration tip 106 is a distal end of an elongate penetration tool extending from handle 112 through shaft 110 and past anchor 108. In an alternative embodiment, the penetration tool is shorter (e.g., between 1 and 15 cm) and may be attached to an extension which extends outside the body.

In some embodiments of the invention, penetration tip 106 is sized as a standard-gauge needle, for example, a 16, 17, 18, or 19-gauge needle and/or optionally includes a long distal taper to allow for penetration and subsequent enlargement of the newly created channel. In some embodiments of the invention, the needle is hollow to allow for passage of a guidewire, for example, a 0.035" guidewire.

The penetration tool is optionally constructed out of either shape memory metal or super-elastic material, such as nitinol, or a stiffer but laser cut design made from Cobalt-Chromium. Optionally or additionally, the penetration tool is made of stainless steel. Optionally or additionally, the penetration tool is constructed using different materials or mixtures of materials at different locations, such as tip, body and bending location. For example, a Co—Cr tip may be used with a stainless-steel shaft; this may cut down on costs.

Shaft 110 may be a standard catheter shaft, for example, an extruded polymer with a stainless-steel braid and PTFE liner. Optionally, shaft 110 includes multiple layers, for example, defining an outer or side lumen for inflating anchor 108 and a central lumen for said penetration tool. In some embodiments of the invention, shaft 110 is designed to have high push-ability, column strength, and flexibility using HHS tubing attached to the penetration tool and/or braided shaft with a PTFE liner and PEBAX or Nylon outer layer. In some embodiments of the invention, the shaft is constructed of extruded PEBAX with a reflowed braid and inner PTFE liner.

In some embodiments of the invention, handle 112 is in the form of an ergonomic injection molded (e.g., as a clamshell) with multiple actuators (e.g., one or more of dials, slides, and/or thumbwheels). Control 114 may be operative to smoothly inflate balloon 108 and to smoothly actuate the penetration tool in synchronization, and provide advancement and penetration, as described herein. In one example, a plunger used for inflation has a first travel distance where it is coupled to a fluid filled chamber, to force that chamber into the balloon and a further travel distance which mechanically couples to and advances the penetration tip. The plunger may decouple from the inflation mechanism once it reaches the end of the first travel distance (e.g., the plunger including a protrusion and the inflation mechanism and penetration tip being coupled to a matching recess or protrusion which interferes with the protrusion. An audible and/or tactile click may be used to inform the user of this change over. Handle 112 optionally includes a control (e.g., a dial) for steering tip 106. Optionally or additionally, handle 112 includes one or both of a guidewire exit point, and a flushing port.

Exemplary Distal Side

Figure 3:
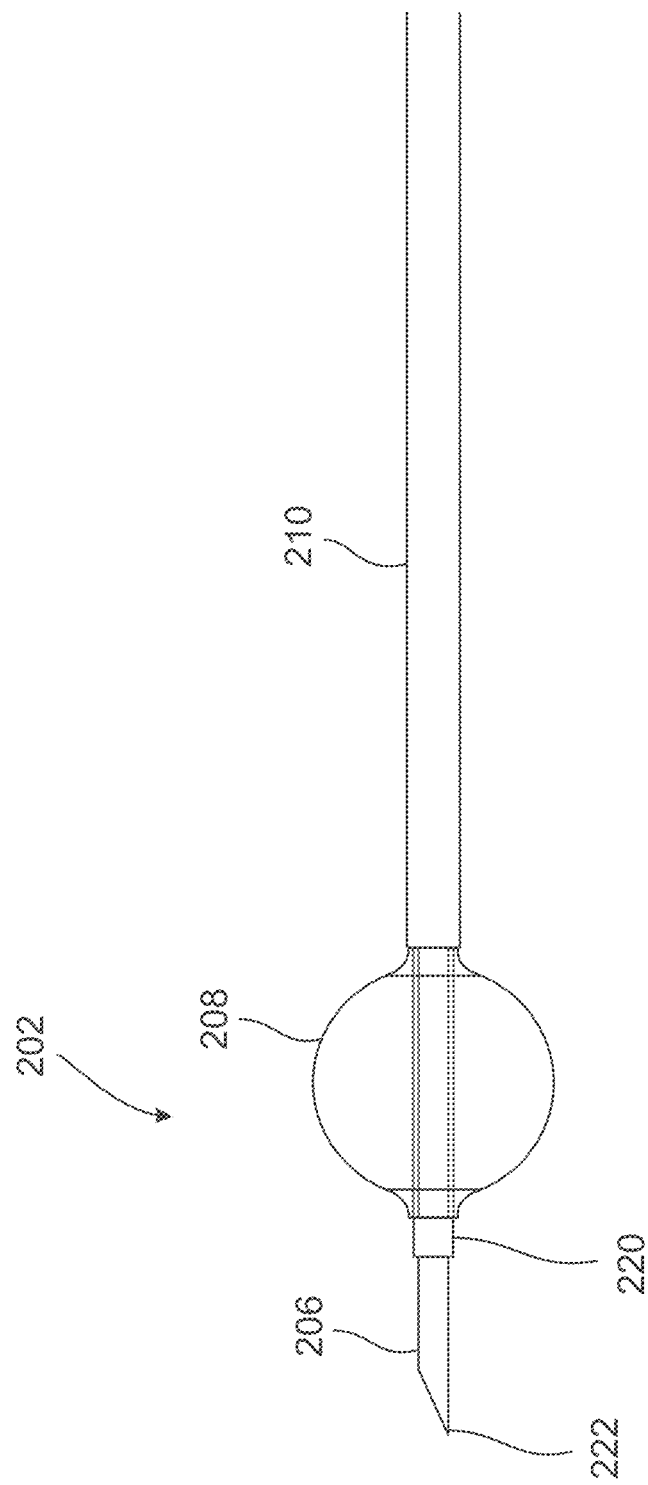
FIG. 3 is an image of a blockage penetrator, in accordance with some embodiments of the invention.

FIG. 3 is an image of a distal end of a blockage penetrator system (BPS) 202, in accordance with some embodiments of the invention.

BPS 202 has a penetration tip 206 which is an extension of an elongate penetration tool that lies in a lumen of a shaft 210 of BPS 202. As shown, an exit aperture 220 of the lumen lies distally of a balloon/anchor 208. Also shown is an optional sharpened tip section 222.

Exemplary Anchor

In some embodiments of the invention, anchor 208 comprises a balloon, optionally a non-compliant balloon selected to match the diameter of the vein, so that inflation thereof will not damage the vein. It is noted, however, that veins have some elasticity and that expanding a balloon the diameter of the unblocked vein is expected to compress the blockage against the vein walls and possibly somewhat expand the vein diameter. Some recoil may be expected. However, such recoil is expected to be less than 100%, so a patent channel is maintained. A potential advantage of a balloon or other expandable structure with a relatively continuous and flattened surface is that the force applied by the balloon to the vein wall is more evenly distributed and less likely to damage the vein wall. In some embodiments of the invention, inflation is between 2 and 30 atm, for example, between 5 and 23, for example, up to about 20 atm.

In some embodiments of the invention, balloon 208 is symmetrical and serves to center BPS 202 in the vein. Optionally, when so anchored, tip 206 is pointed towards blockage 104, so when advanced it will not penetrate a wall of vein 100. Optionally, such centering is also provided when balloon 208 is inside blockage 208. Optionally, balloon 208 can be inflated up to 20 atm of pressure using saline and/or fluoroscopic contrast solution or dye.

In some embodiments of the invention, balloon 208 is manufactured from PEBAX, Nylon, PET, polyurethane, or another polymer suitable for intravascular balloon construction, and blow molded to expand it to the desired inflated diameter. It is then optionally bonded to shaft 210, for example, using reflow. In some embodiments of the invention, the polymer is selected to be semi-compliant (e.g., can expand to up to 10% more than its maximum resting diameter).

In some embodiments of the invention, the balloon geometry short, for example, the balloon having a length (of the parts in contact with the vein wall), of between 2 and 60 mm and a diameter of, for example, between 6 and 30 mm. In some embodiments of the invention, the length is selected to reduce risk of vein rupture.

Exemplary Method of Vein Blockage Passing

Figure 4:
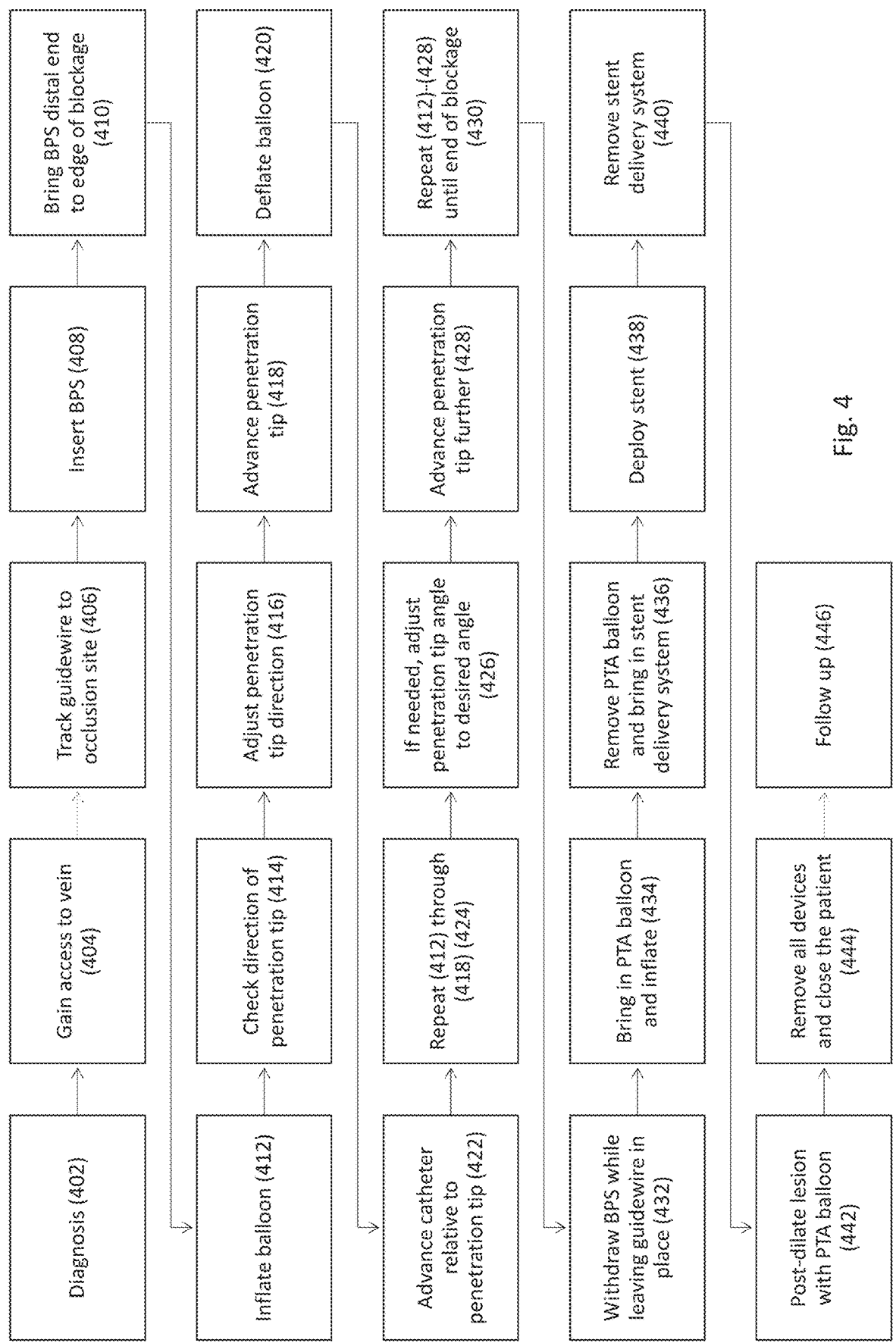
FIG. 4 is a detailed flowchart of a method of using a blockage penetrator, in accordance with some embodiments of the invention.

FIG. 4 is a detailed flowchart of a method of using a blockage penetrator system (102,202), in accordance with some embodiments of the invention. FIGS. 5-15B illustrate stages of carrying out of the method of FIG. 4.

Diagnosis & Access

At 402, a patient is diagnosed with a blocked vein. Optionally, diagnosis, for example, using angiographic imaging, is used to detect a length and/or diameter of the blocked portion of the vein. Optionally, the age of blockage is estimated so as to predict a difficulty in passing the blockage (e.g., older is more difficult).

A suitably sized BPS 202 may be selected (e.g., balloon length and/or diameter and/or penetration tip shape and/or type). In some embodiments of the invention, imaging is used to assess a tortuosity of the blockage and the vein and a BPS selected according to the vein parent diameter. For example, a femoral vein may have a balloon diameter of between 7 and 13 mm selected for it. An iliac may have a balloon diameter between 10 and 16 mm and an internal jugular may use a balloon of between 18 and 24 mm. In some embodiments of the invention, the balloon is optionally chosen to have a maximal diameter of between 0 and 3 mm (e.g., between 1 and 2 mm) larger than the vein diameter.

At 404, access to the venous system may be provided, for example, using standard methods, for example, upstream and/or downstream of a blockage.

Figure 5:
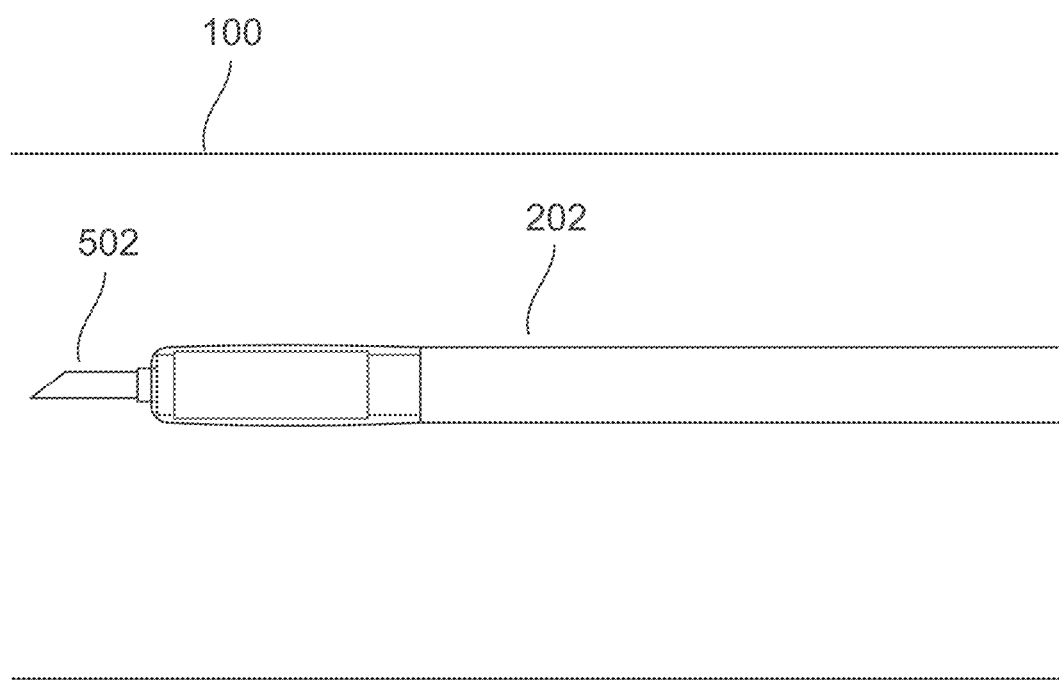
FIGS. 5, 6, 7, 8, 9A-9B, 10, 11A-11B, 12, 13, 14 and 15A illustrate stages in a process of passing a blockage using a blockage penetrator, in accordance with some embodiments of the invention.

FIG. 5 shows BPS 202 riding on a guidewire 502 in vein 100, in accordance with an exemplary embodiment.

At 406, a guidewire (e.g., a 0.035" guidewire) is optionally advanced until blockage 104.

At 408, a BPS is mounted on the guidewire and advanced.

It is noted that the use of a guidewire is optional. For example, a guide sheath or self-steering catheter system may be used.

Positioning

Figure 6:
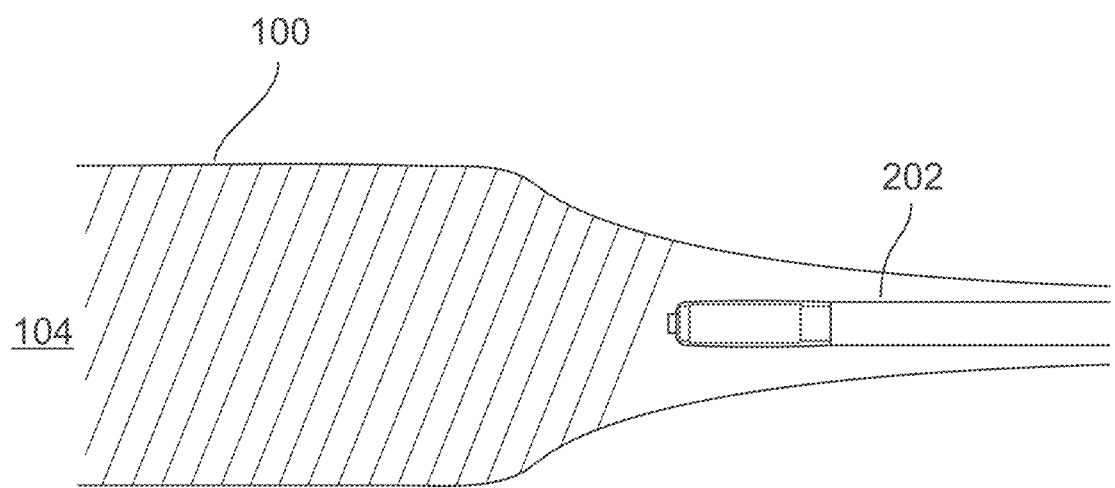
Figure 7:
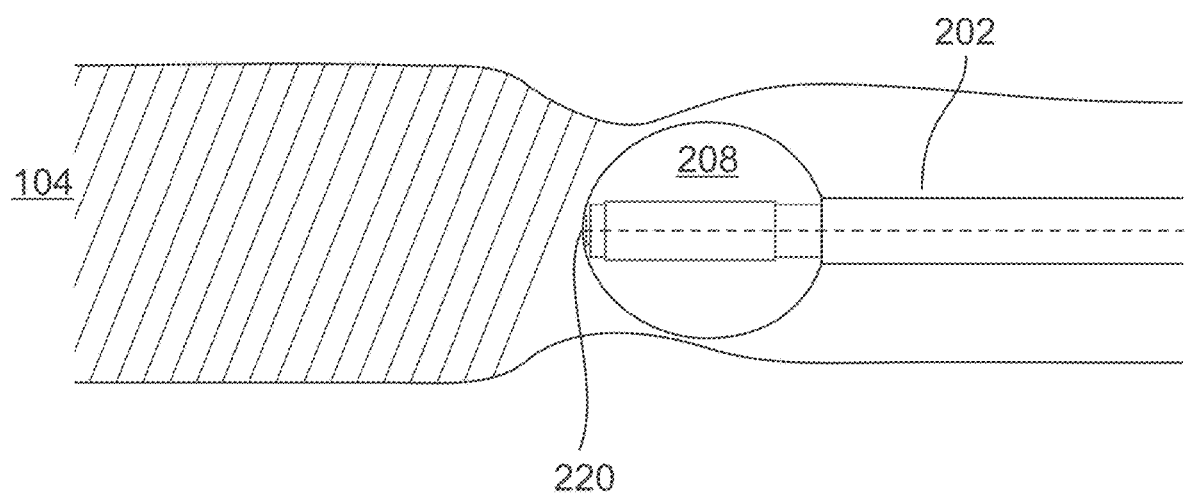

At 410, BPS 202 is brought adjacent blockage 104, for example as can be seen in FIG. 6. Optionally, BPS 202 is simply advanced until it cannot be advanced more and/or as can be seen on an x-ray or other image.

At 412, balloon 208 is inflated, centering aperture 220 (and thus potentially penetration tip 206 when it exits aperture 220). This can be seen, for example, in FIG. 7.

At 414 the expected direction of penetration tip 206 is assessed (e.g., using x-ray and/or by extending penetration tip 206 and checking its extension direction). In some embodiments of the invention, a radiopaque marker (see FIG. 16B, for example) is used to assess orientation of the tip. Optionally or additionally, the handle of BPS 202 may include a marked dial (see FIGS. 29A-30, for example), for example with an indicator at 0 degrees to indicate a preset direction such as up, to indicate orientation. As described here, there are multiple ways of setting the expected direction of tip 206, including bending or a pre-bent tip, a sheath and/or a shaped balloon.

At 416, BPS 202 may be manipulated, for example, by manipulating one or more of balloon 208, controls on the handle, advancing of the penetrating tip, manipulating a sheath and/or a bending mechanism, to modify the direction of extension of penetration tip 206.

Penetration

Figure 8:
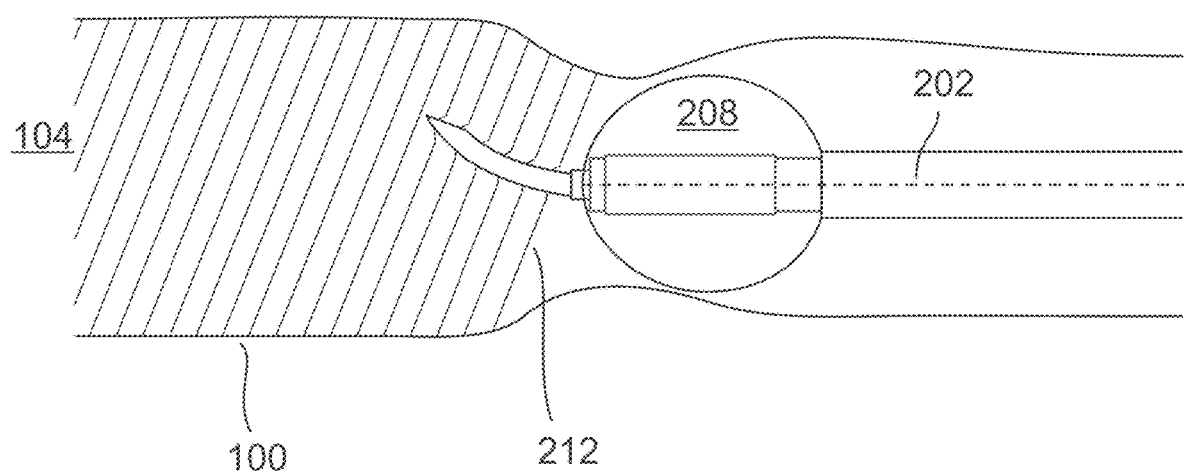

At 418, penetration tip 206 is advanced, for example, as shown in FIG. 8. In some embodiments of the invention, penetration tip 206 is pre-bent, so it does not advance coaxially with shaft 210. In some embodiments, penetration tip 206 is kept straight by a stiffer over-sheath which surrounds tip 206 and which can be selectively advanced and/or retracted.

In some embodiments of the invention, penetration tip 206 is stiff enough and sharp enough so it can be pushed into blockage 104. In some embodiments of the invention, providing a hollow tip 206 assists in such penetration.

In some embodiments of the invention, penetration tip 206 is advanced between 1 and 12 mm during a penetration act, for example, a distance decided based on a risk of perforation and a risk of divergence of tip 206. Optionally, if needed, an additional advance of tip 206 is provided after an initial penetration. Optionally, the direction of tip 206 is modified and/or checked before such further advance.

Advance

At 420, balloon 208 can be deflated. Often, vein 100 will collapse around shaft 210 at this time, as shown for example in FIG. 9A.

At 422, balloon 208 is advanced relative to penetration tip 206 into a channel 902 formed by act 418. In some embodiments of the invention, tip 206 is retracted before and/or during such advance. In some embodiments of the invention, the tip is not retracted, for example, if the recoil of the vein and blockage quickly closes the channel in a way that prevents advancement of balloon 208.

Figure 9A:
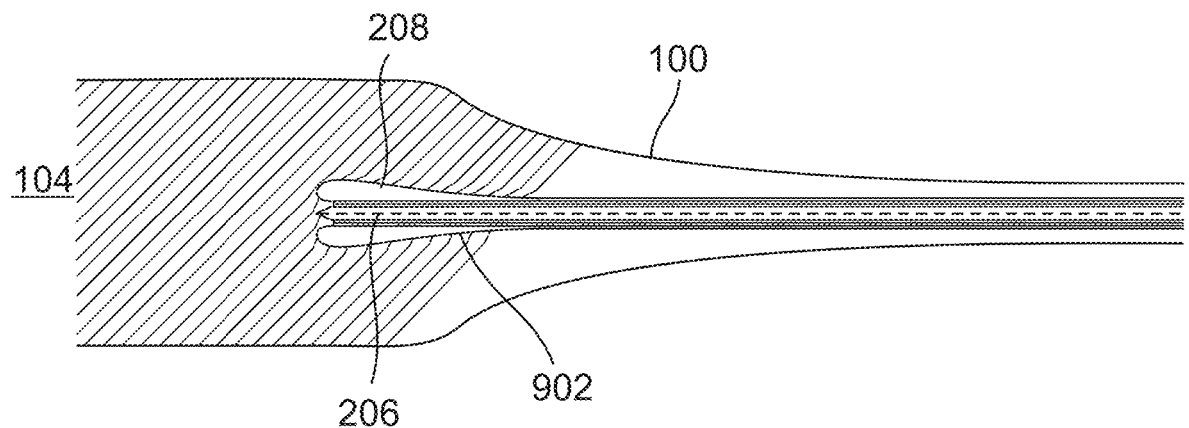
Figure 9B:
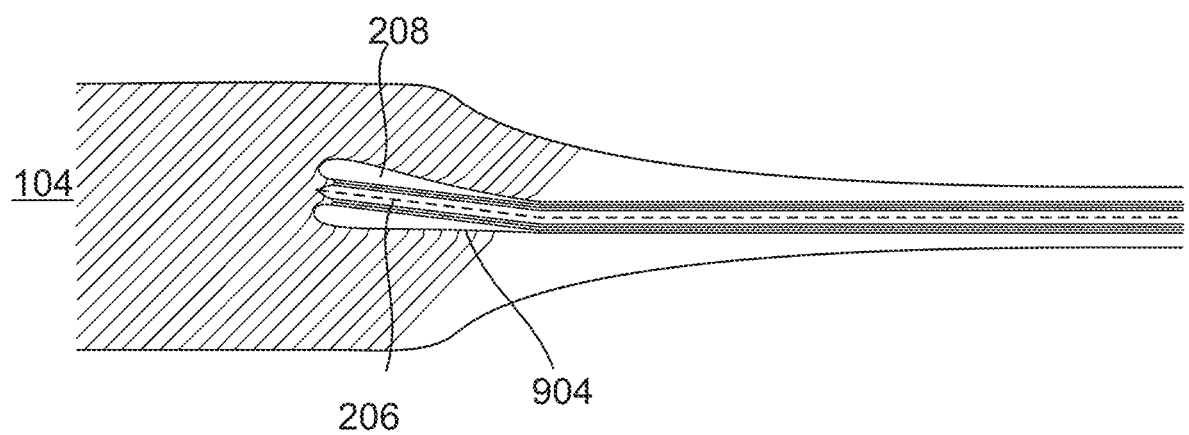

FIG. 9B shows an example where penetration tip 206 formed a curved channel 904. When inflated, balloon 208 may follow curved channel 904. Optionally, if sufficient pressure is used, inflation of balloon 208 will reduce the deflection of channel 904. In some embodiments of the invention, the balloon forces an essentially straight channel segment, with the overall channel shape being piecewise linear. Optionally, however, the inflation self-centers BPS 202 in the vein due to forces applied to it by surrounding blockage and vein walls. The actual layout may depend, for example, on the distance from the wall, the type of blockage and inflation amount/pressure. In a procedure, the physician may identify such parameters which provide a desired outcome.

Repeat

Figure 10:
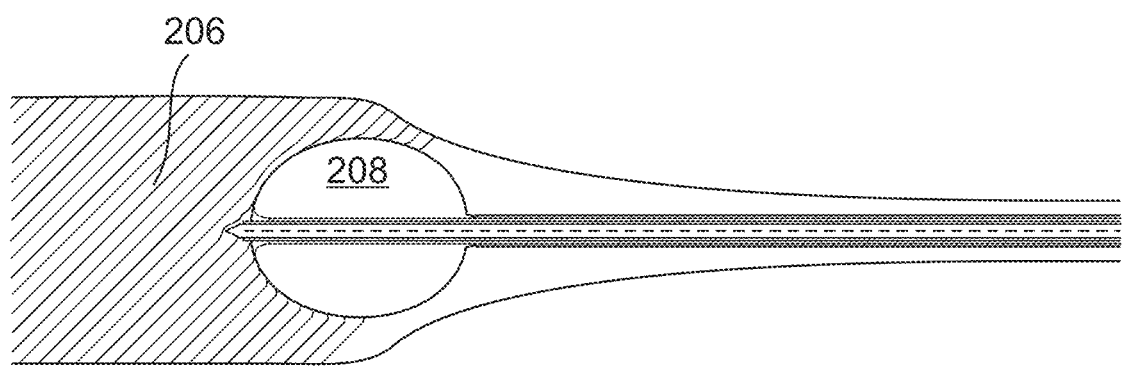

At 424, acts 412 through 418 are repeated. FIG. 10 shows an exemplary effect of inflating balloon 208 in channel 902 and penetration tip 206 ready for further penetration. In the figure, the blockage is schematically shown as being compressible. In some cases, the expansion will also increase the vein diameter and/or blockage will recoil somewhat into the channel formed by the expansion.

Tortuous Vein

While in some cases penetration tip 206 needs to be adjusted/re-aimed for maintaining a desired linear path, in some cases, the vein itself is tortuous and the path to be formed is tortuous as well.

Figure 11A:
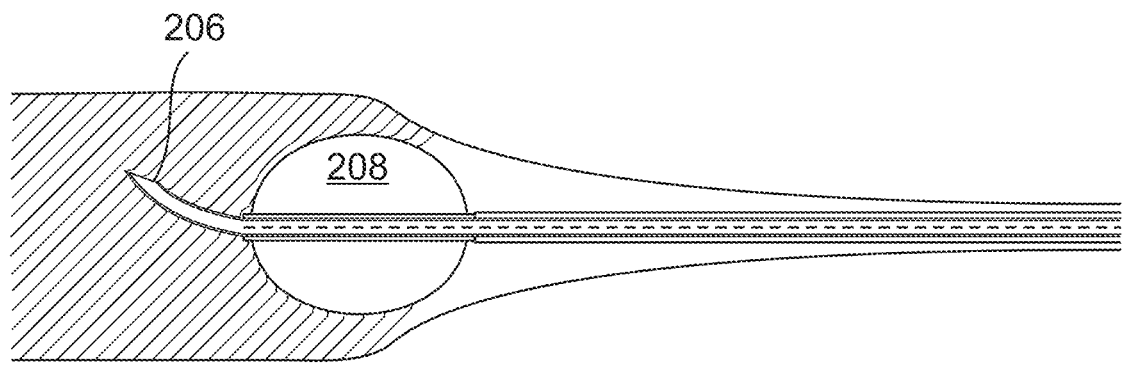
Figure 11B:
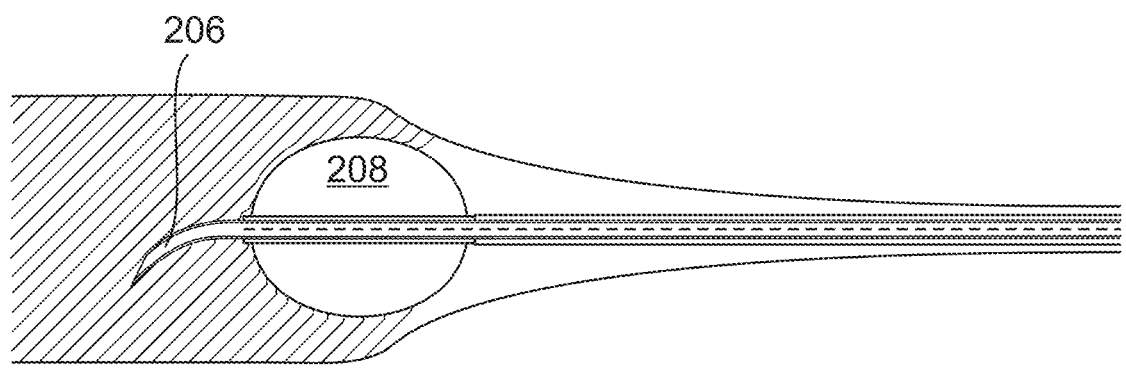

At 426, if needed, penetration tip 206 is adjusted (e.g., by rotation or other means, for example as described herein) to change an advancing direction. FIGS. 11A and 11B show exemplary effects of such readjustment.

Figure 15A:
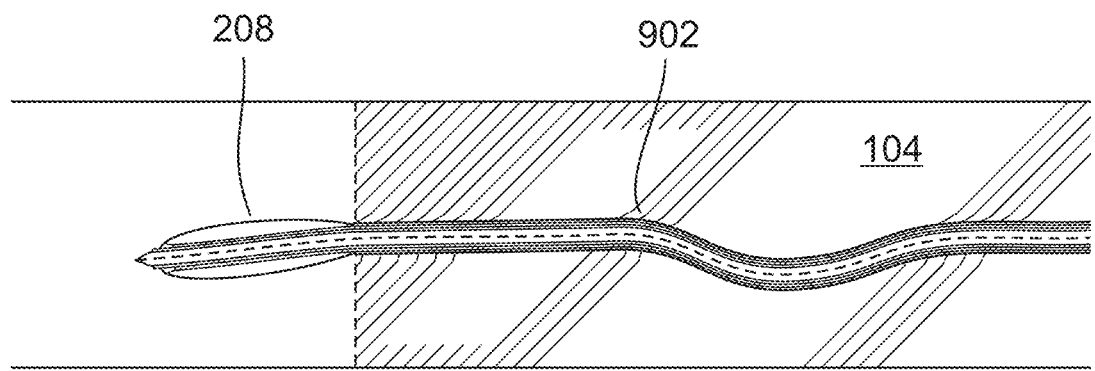
Figure 15B:
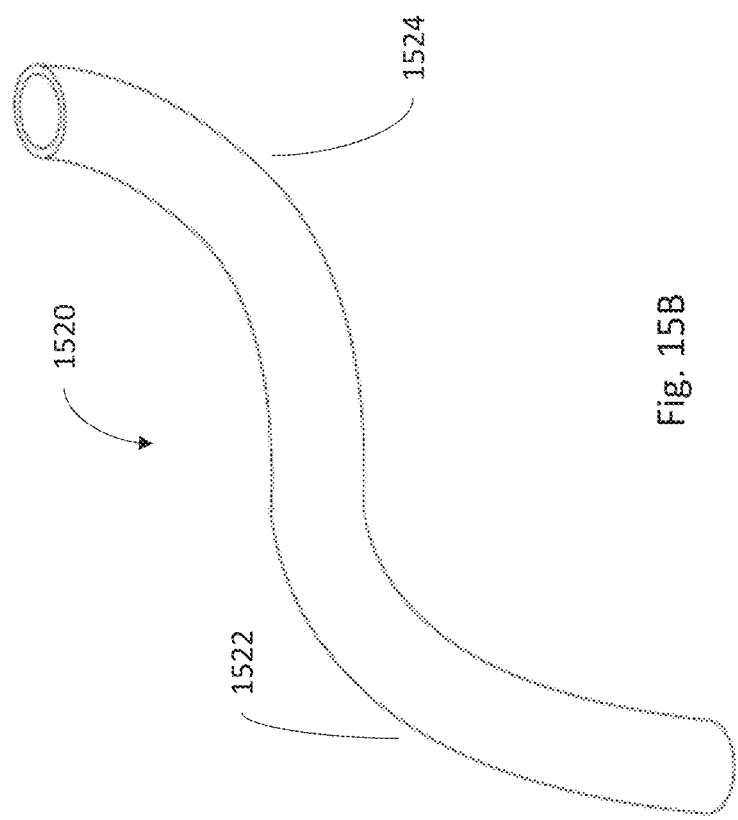
FIG. 15B illustrates a convoluted vein, a blockage in which may be traversed in accordance with some embodiments of the invention.

This process may be repeated (430) thus allowing the transversal of a tortuous vein, for example, as shown in FIG. 15B. It is noted that the Iliac vein shows this type of tortuosity (two relative sharp bends, in different planes, near each other. In the example shown, a vein 1520 has a first bend 1522 with a bending radius of, for example, 20 mm, substantially adjacent to a second bend with a bending radius of, for example, 24 mm.

Completion

Figure 12:
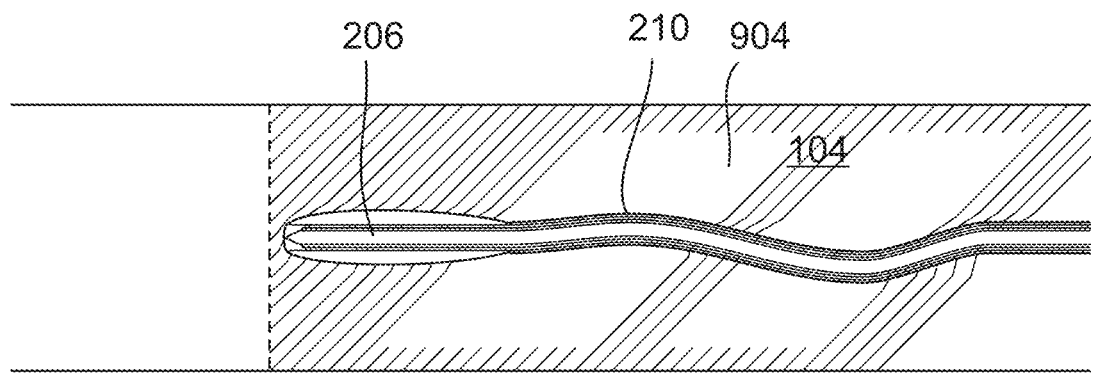

FIGS. 12-15B show the last stages of such an advancing process. In FIG. 12 penetration tip 206 has been advanced nearly to the end of blockage 104 along channel 904.

Figure 13:
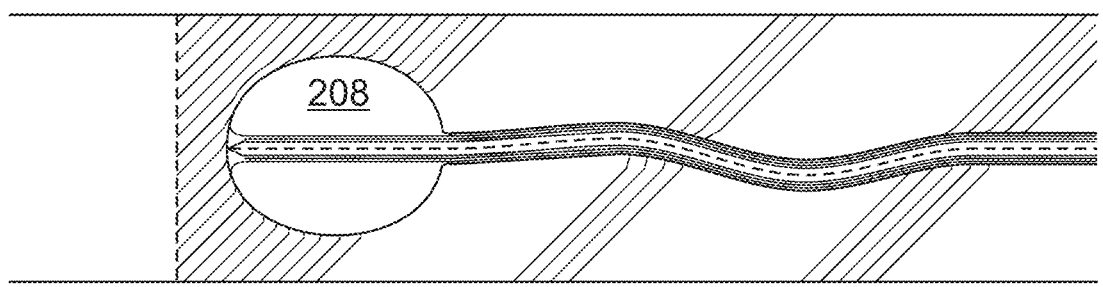
Figure 14:
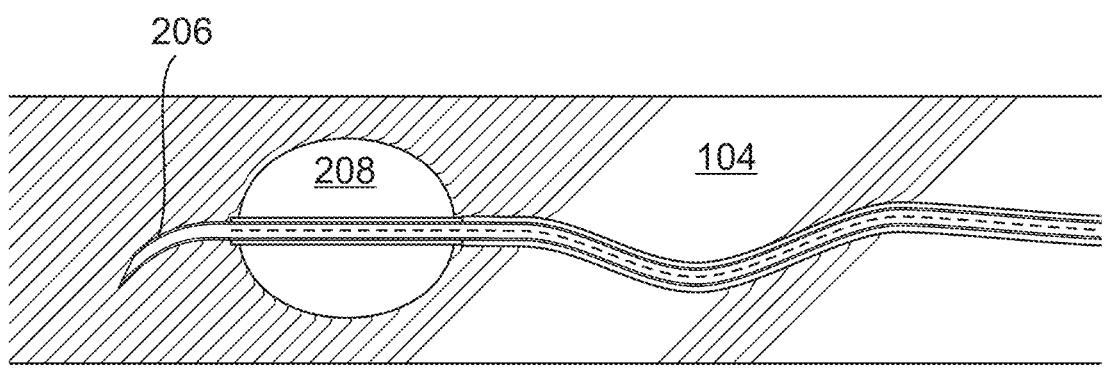

In FIG. 13, balloon 208 is inflated, allowing penetration tip 206 to be advanced out of the blockage in FIG. 14 and inflation/passage of balloon 208 on the edge or outside of blockage 104, confirming such exit (e.g., using a contrast material injection and an x-ray and/or using a radio-opaque marker on balloon 208 and/or penetration tip 206).

In some embodiments of the invention, penetration tip 206 is radio-opaque (or radio semi-opaque, so it is visible on an x-ray). Optionally or additionally, balloon 208 is filled with a radio-opaque inflation fluid. Optionally or additionally, contrast material is injected between the balloon and the blockage and a small amount may penetrate the blockage (e.g., due to existence of micro-channels therein, due to a patent channel being formed and/or due to pressure of injection).

In some embodiments of the invention, small radio-opaque markers are used, which may be more radio-opaque than other parts of the system, for example. In one example, a radio-opaque marker is provided at penetration tip 206. FIG. 16B shows an example radiopaque marker 1650, shaped so that an orientation of the tip 206 can be discerned. In this example, the marker includes an asymmetrical arrangement of radio-opaque portions on either side of a midline, which is optionally also marked with a radio-opaque portion. Optionally, such a marker is embedded in or welded to the body of penetration tip 206.

After passage, PTA or stenting (or other wall manipulation methods, such as atherectomy or a cutting catheter) may be applied. In one example, at 432, BPS 202 is withdrawn leaving a guidewire in channel 902. At 434 a balloon catheter (e.g., PTA) is advanced over the guide wire and inflated. At 436, a stent delivery system may be provided, for example, over the balloon or after the balloon is removed, and a stent deployed (438, 440 and/or 442).

When treatment is completed, the various delivery systems are removed (44) and the venous access closed.

Optionally, at 444, patient follow up is provided.

Exemplary Blockage Penetration Tip Design

Figure 16A:
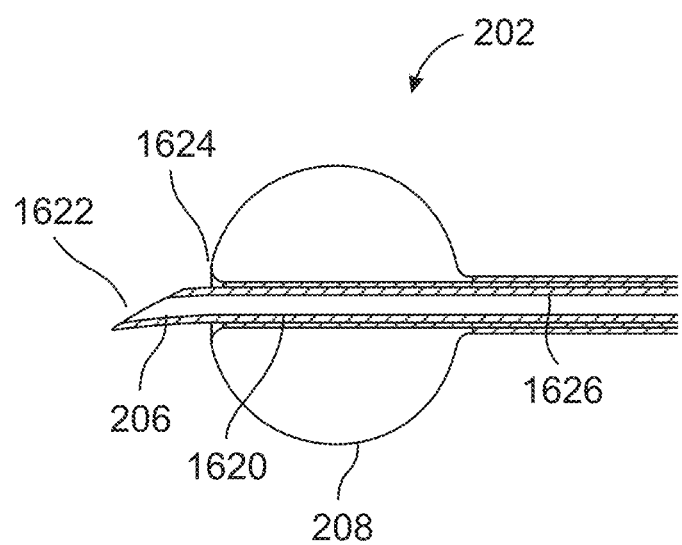
FIG. 16A is a cross-sectional view of a blockage penetrator, in accordance with some embodiments of the invention.

FIGS. 16A-B is a cross-sectional view of a distal end 1600 of an embodiment of blockage penetrator system 202, showing various exemplary details, in accordance with some embodiments of the invention.

As shown, balloon 208 has a flat or concave distal end 1624. This may assist in bringing balloon 208 as close as possible to blockage 104 when first penetrating blockage 104 and/or may assist in centering penetration tip 206. Optionally, closeness may increase the effectiveness of balloon 208 inflation on centering of tip 206.

Optionally or additionally, penetration tip 206 has a single sided ground edge 1622, which may urge the tip towards the ground edge, which may be useful if the tip bends in another direction and is under lateral forces by the penetrated blockage. In other designs, the edge is double ground.

Optionally or additionally, BPS 202 includes a sheath 1620 inside balloon 208. This may be useful to hold tip 206 straight during advancement thereof and/or to prevent tip 206 from assuming a pre-bent shape, if any. FIG. 24C shows an exemplary embodiment where a sheath can be advanced with the tip and optionally maintain a straight configuration of tip 206.

In the embodiment shown, penetration tip 206 is an extension of an elongate tube (e.g., a hypo-tube) 1626. Optionally, the tube is cut or even cut into separate segments, optionally connected by living hinge type joints or be joints with sliding movement.

Not shown in the figure is a separate inflation lumen for balloon 208. FIGS. 25B-25F show exemplary embodiments of inflation tubes.

Exemplary Steerable Design

As noted with reference to FIG. 4, it is useful in some embodiments of the invention to include a mechanism for changing the direction of penetration tip 206.

A first, basic, manner of doing so is to provide a tip which is pre-bent, but prevented from exhibiting that bend due to sheath 1620.

Figure 17:
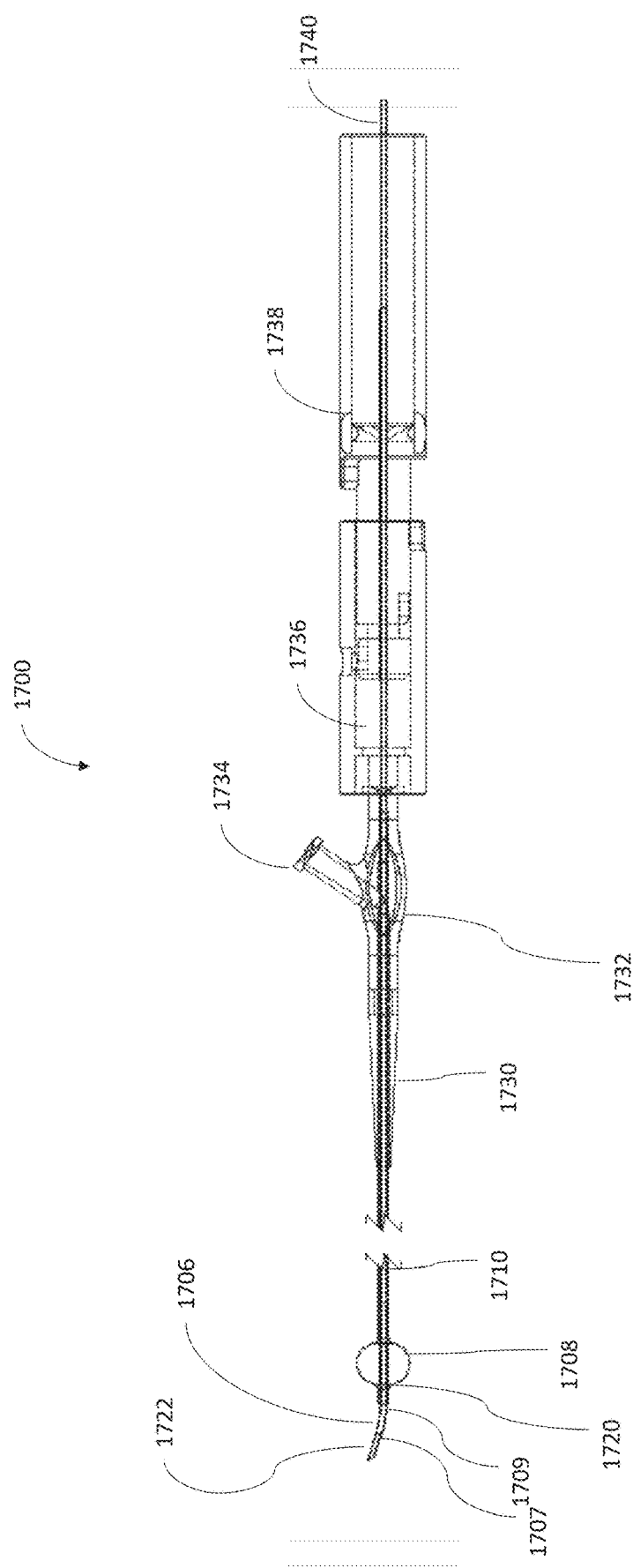
FIG. 17 is a cross-sectional view of a blockage penetrator system, in accordance with some embodiments of the invention.

FIG. 17 is a cross-sectional view of a blockage penetrator system 1700 (e.g., an embodiment of BPS 202), in accordance with some embodiments of the invention.

In this embodiment, penetration tip 1706 with a sharpened end 1722 has a first section 1707 which is straight, followed by a bent section 1709. Sheath 1720 prevents bending of penetration tip 1706 while bent section 1709 is held within. For example, section 1707 may be 6 mm long and section 1709 may be 6 mm long. Other lengths, for example, between 4-8 mm or smaller or larger may be provided for either or both of these sections. In addition, a variety of penetration tools may be provided, with the diameter (e.g., 6 French), length, length of advanceable part and/or bending location and/or bending diameter selected as needed. In some embodiments of the invention, the penetration tool is bent as needed in the operating theater.

In the embodiment shown, sheath 1720 extends away from balloon 1708, but this is optional. It is noted that sheath 1720 may be stiff enough to be pushed into blockage 104 and/or along channel 902. In some embodiments of the invention, sheath 1720 has a blunt tip. In some embodiments, sheath 1720 is sharpened. In either embodiment, sheath 1720 may or may not have a tapering from an outer diameter to an inner diameter thereof.

In some embodiments of the invention, the sharpening of end 1722 is in the form of a bevel which further assists in guiding penetration tip 1706 along the path defined by the bend. Optionally or additionally, the stiffness of the penetration tool is selected to correspond to the mechanical properties of the blockages, so as to obtain a desired bent path. For example, a less stiff tip (e.g., a nitinol tip) may be used for softer blockages and a stiffer tip (e.g., Co—Cr or thicker walls) used for harder blockages. In some embodiments of the invention, a stiffer tip is made less stiff by laser cutting (or chemical etching or heat treatment or using a different type of cutting), so as to reduce the structural integrity of the tip and thereby reduce its stiffness. In some embodiments, such cutting is used to create spaces which add elasticity. FIG. 20E shows examples of possible cuts which may also reduce stiffness and/or guide bending.

Figure 18:
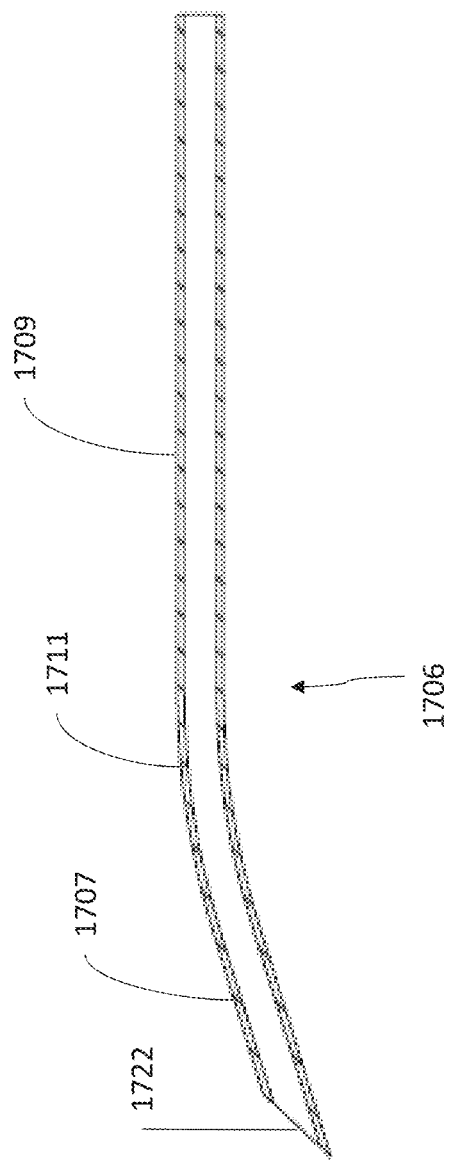
FIG. 18 shows a design for a penetration tip, of a blockage penetrator system, in accordance with some embodiments of the invention.

FIG. 18 shows a design for a penetration tip 1706, of a blockage penetrator system, in accordance with some embodiments of the invention.

As shown, a beveled end 1722 is optionally provided with a bevel away from the curve of tip 1706. Also shown is, in this design, a defined bend location 1711. As long as section 1711 is within sheath 1720, tip 1706 will appear straight.

It is noted tip 1706 only includes one bend. In some embodiments, more than one bend location, possibly in different planes and/or directions are provided. Optionally or additionally, the direction of advance of tip 1706 is controlled by rotating of tip 1706 (e.g., using a portion thereof extending out of the body).

In an alternative design, tip 1706 is provided with a continuous bend, possibly along the entire length of tip 1706 (or length that extends past balloon 208), so that the trajectory of tip 1706 depends on how far it is extended out of sheath 1720.

For example, a Nitinol hypo-tube is ground down to create a beveled needle and then a curve is fixed thereon using heat treatment. The curve radius can be, for example, between 5-30 mm and the maximum angle between 5 and 120° For example, between 5-90°, for example, between 20 and 60 degrees. In other embodiments the curve is not uniform in radius, e.g., the bending radius may increase and/or decrease with distance from the penetration tip. Optionally, such change in bending radius is continuous. Alternatively, the change is relatively stepped, with, for example, 1, 2, 3 or more steps, for example, a first section may have a larger bending radius (e.g., about 20 mm) then transition to a medium bending radius (e.g., about 10 mm) and then have a tight bend at the end of (e.g., about 5 mm). Optionally, such changes are indicated in the control handle, to allow selecting a degree of bending.

Optionally, the outer diameter of tip 1706 is between 0.8-1.3 mm. Sheath 1720 is optionally a steel hypo-tube, more rigid than tip 1706 and therefor maintaining it straight. Optionally or additionally, sheath 1720 is made of a stiff polymer, for example, PEEK and/or Nylon 12. Optionally, the length of the stiff part of sheath 1720 is about or a small amount longer than that of the bent part of tip 1760, this may serve to preserve the overall flexibility of BPS 1700.

In an example of a non-uniform radius, if the penetration tip is exposed 5 mm, then there is a 30° angle in the plane of the bend between an unbent and a final pointing direction of said tip. Optionally, if the tip is only exposed 2.5 mm, there is a 5°. Conversely, if the tip is advanced to 15 mm, then it there is a 60° angle. See also the example embodiment of tip bending described with reference to FIG. 24E.

Referring back to FIG. 17, a shaft 1710 is shown in part and may be, for example, between 10 and 200 cm long and is configured for dwelling in a blood vessel (e.g., may have hydrophilic coating).

A tapered portion 1730 that optionally functions as a strain relief bridges the part of system 1700 between shaft 1710 and various controls/inputs, for example, a Luer input 1734, e.g., as part of a Y connector, for example, for contrast material injection into the vessel lumen and/or into balloon 1708, e.g., for inflation thereof and/or used an input for a guide wire.

In some embodiments of the invention, system 1700 includes the inflation fluid for balloon 1708, for example in a chamber 1736 which is selectively compressed and released by a piston 1738. These may be in the handle.

In some embodiments of the invention, the inflation lumen of balloon 1708 surrounds the channel of a penetration tool 1740 (that terminates in tip 1706). Optionally, sealing is provided between shaft/tool 1740 and chamber 1736 and piston 1738.

In some embodiments of the invention, penetration tool 1740 does not exit the handle in a proximal direction. Optionally, in such cases, reference 1740 indicates only a guidewire.

Exemplary Alternative Steering Mechanisms

FIG. 19 shows an alternative design for a penetration tip 1906, of a blockage penetrator system, in accordance with some embodiments of the invention. The numbering for parts of tip 1906 are as for FIG. 17, with a prefix of 19 instead of 17.

In some embodiments of the invention, penetration tip 1906 is formed of metal, such as Nitinol, stainless steel (316L), Nickel-Cobalt alloy like MP35N or a Cobalt-Chromium alloy, such as L605. In some embodiments of the invention, bending is assisted and/or guided by providing one or more weakenings in the body of tip 1906. Optionally, the weakenings are in the form of notches (e.g., laser cut) 1913. Other weakening methods can be provided as well, for example, selective annealing, thinning and chemical treatment.

In some embodiments of the invention, penetration tip 1906 is pre-bent and a mechanism is used to straighten it. For example, a pullwire may be provided in a longitudinal groove and attached at distal end (or near a bending location 1911) of penetration tip 1906. In some embodiments of the invention, two or more wires are provided, attached to different circumferential locations, and may be used, for example, to actively bend penetration tip 1906 in a desired direction. Optionally or additionally, a pullwire on an opposite side is used to straighten penetration tip 1906, for example, being connected to a spring (not shown) in the handle of system 1906.

In some embodiments of the invention, the pull wire is connected at a proximal side to a spring, in the handle of system 1900.

The orientation of penetration tip 1906 is optionally set by rotating penetration tip 1906 via shaft 1940. In some embodiments of the invention, multiple pull wires are provided and may be used to set the orientation.

Figure 20A:
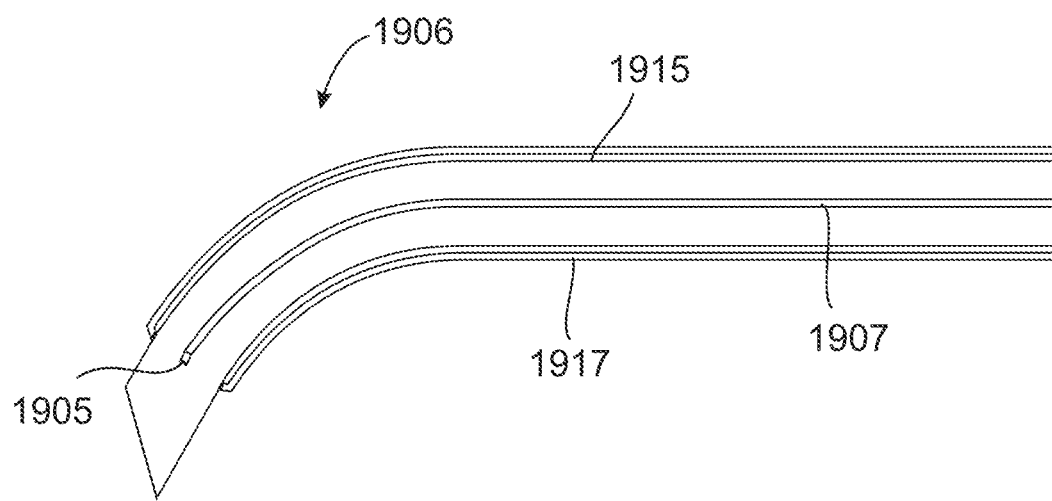
FIGS. 20A-20D schematically show exemplary bending of a penetration tip using a first pull wire and a second pull wire, in accordance with an exemplary embodiment of the invention.

FIG. 20A shows a design for pull wires, in accordance with an exemplary embodiment of the invention. A groove 1907 (of which there may be 1, 2, 3, 4 or more circumferentially spaced apart is formed in tip 1906 (and may extend all the way to the handle of BPS 202). Optionally, the groove does not penetrate the thickness of tip 1906. Reference 1905 indicates an attachment point for a pulling wire (not shown) that fits in the groove.

Two pulling wires 1915 and 1917 are shown. It is noted that in some embodiments the pulling wire(s) do not lie in a groove.

Figure 20D:
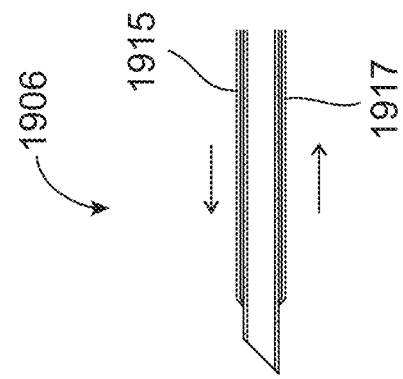
Figure 20C:
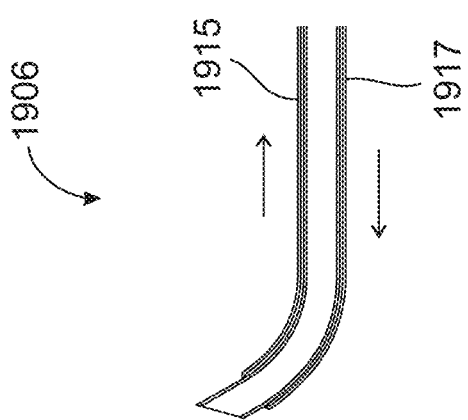
Figure 20B:
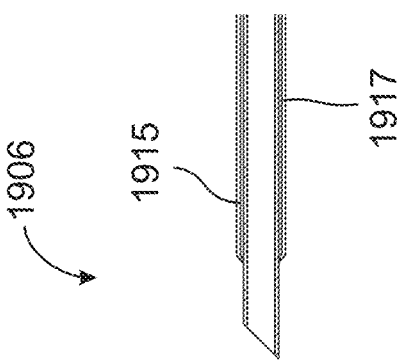

FIGS. 20B-20D schematically show exemplary bending of tip 1906 using a first pullwire 1915 and a second pullwire 1917, in accordance with an exemplary embodiment of the invention. In FIG. 20B, tip 1906 is in a resting condition, with both pullwires under equal tension. In FIG. 20C, tension is increased in pullwire 1915 and reduced in pullwire 1917, causing penetration tip 1906 to bend up. In FIG. 20D, tension is increased in pullwire 1917 and decreased in pullwire 1915, causing penetration tip 1906 to straighten.

Tip 1906 (with or without pull wire grooves) is optionally formed by etching or laser cutting a tube. FIG. 20E shows several exemplary designs (in plan view) for such laser cutting which may encourage bending in only one direction or in more than one direction.

Figure 20F:
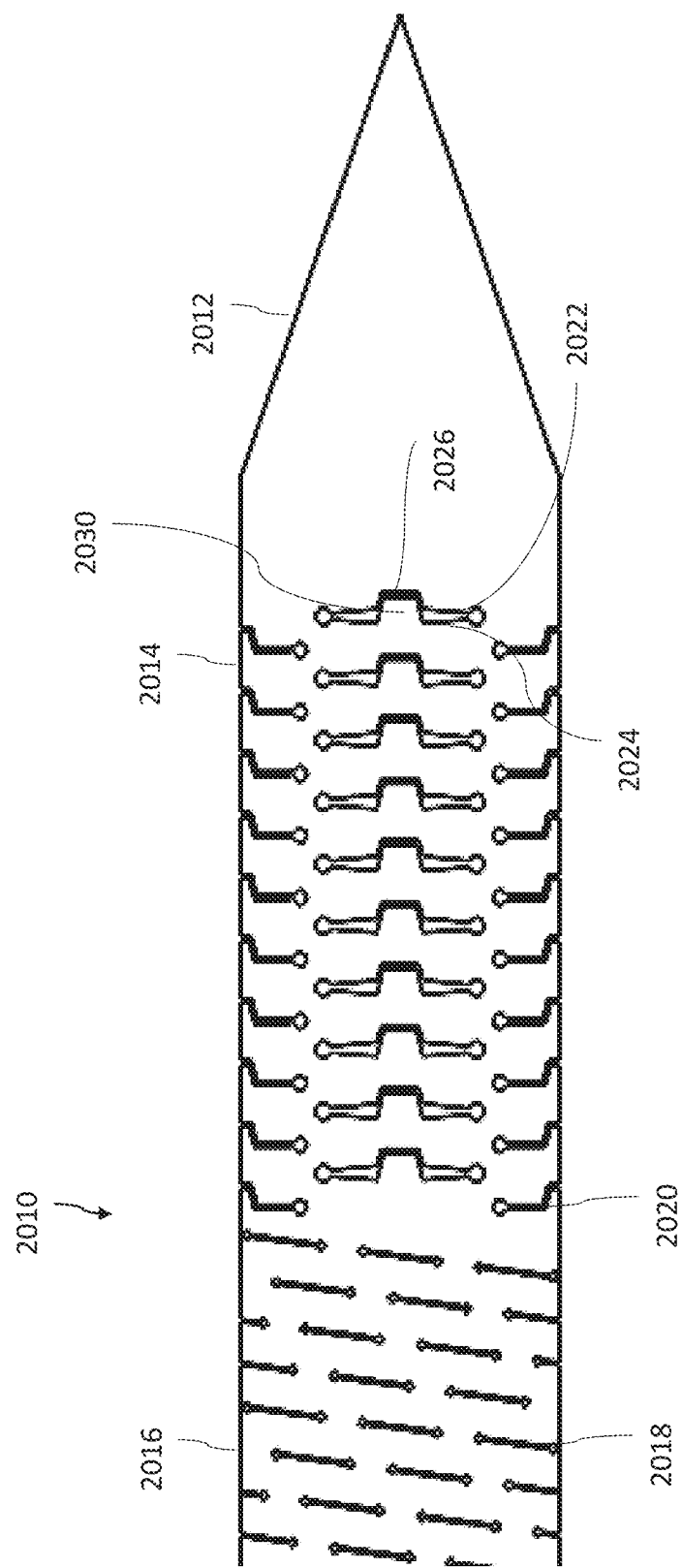
FIG. 20F is a plan view of a single-plane and single-direction bending penetration tip, in accordance with some embodiments of the invention.

FIG. 20F is a plan view of a single plane & single direction bending penetration tip 2010, in accordance with some embodiments of the invention.

As shown, penetration tip 2010 includes a sharp tip 2012 and a directional bending section 2014. Optionally, a general flexible section 2016 is provided proximally and/or distally. As shown, general flexible section 2016 optionally includes a plurality of cuts 2018, optionally arranged in a general spiral direction and optionally including stain-relief roundings at ends thereof.

Referring now to directional bending section 2014, a first section, termed dorsal, includes cuts 2020 which support bending of penetration tip 2010 in a general manner. Cuts 2020 may also be straight lines, rather than, as shown, to include a curve.

On a ventral side, an axially extending series of cuts are shown which include an engagement step mechanism that resists bending, once engaged. These engagement steps can be selected to set a maximum bending of penetration tip 2010, for example, 60 degrees.

In some embodiments of the invention, all or most of the engagement steps have substantially identical flexibility so they all bend a same way and lock at a same time. Optionally or additionally, at least some engagement steps are defined to have a greater or lesser flexibility (e.g., based on the length of edges 2022, 2024, described below) and therefore engage and lock (e.g., resist further bending) at different times. In some embodiments of the invention, the spacing between the engagement steps and/or within the engagement steps is used to set the shape of the curve. It is a particular feature of some embodiments of the invention that the dorsal cuts are different in shape (and optionally in number and/or size and/or location) than the ventral cuts.

In the example shown, an engagements step includes a proximal edge 2024 and a distal edge 2022 defining a gap there between. Edge 2024 defines a tab 2030 which faces a wall 2026 defined by edge 2022.

In some embodiments of the invention, a gap between tab 2030 and wall 2026 closes by bending of penetration tip 2010 in a ventral direction (towards the viewer of the figure) and thereby defines a size of step, which, once reached, resists further bending. This abutment of tab 2030 and wall 2026 has the potential benefit of stiffening penetration tip 2010 while bent and assisting pushability in that state.

In some embodiments of the invention, for example as shown, edges 2024, 2022, and/or cuts 2020 are curved and/or include a change in direction. This may be useful to reduce the radial profile of the area at the cut when the tool is bent and/or may otherwise reduce geometrical interference with an external sheath.

FIGS. 21A-B is a cross-sectional view of a penetration tip 2106 of blockage penetrator system illustrating stylet-based bending, using a stylet 2109 in accordance with some embodiments of the invention.

Penetration tip 2106 is optionally pre-bent. However, when a rigidifying stylet 2109 is inserted through, penetration tip 2106 is straightened thereby. In some embodiments of the invention, only the tip of stylet 2109 is stiff, for example, of a length within a factor of 2 or 5 or intermediate values of the bending portion of penetration to 2106. Optionally, stylet 2019 is used together with a balloon-related sheath 2120 to straighten penetration tip 2106. In this manner, retracting stylet 2109 can allow penetration tip 2106 to bend and manipulate a balloon 2108. In an alternative embodiment, stylet 2109 is pre-bent and provides a bend to penetration tip 2106.

Exemplary Non-Projecting Balloon Neck

Figure 22:
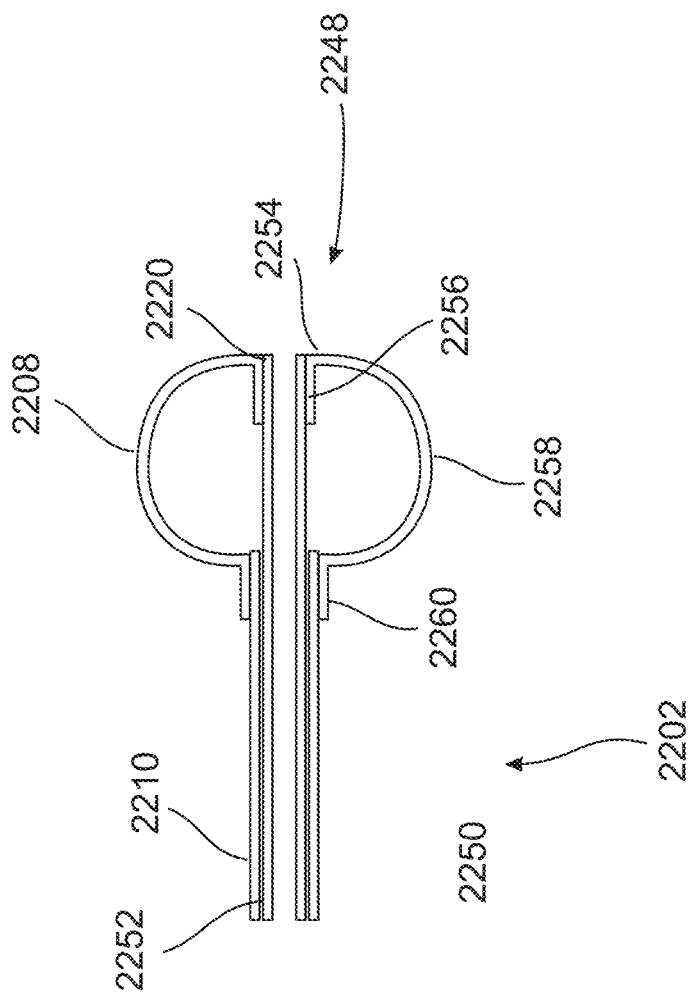
FIG. 22 is a cross-sectional view of a balloon with an inverted distal neck, in accordance with some embodiments of the invention.

FIG. 22 is a cross-sectional view of a distal section 2202 of a BPS including a balloon 2208 with an inverted distal neck 2248, in accordance with some embodiments of the invention.

In some embodiments of the invention, it is desirable that the expansion of balloon 2208 be as close to penetration point 101 (into blockage 104) as possible, or even past such point. This may be useful to help provide better aiming and/or better alignment of penetration into blockage 104. A typical balloon, however, is tapered in both a distal and proximal direction, which means that the anchoring location (a waist portion 2258 of the balloon) is distanced from such penetration point.

In the embodiment shown, distal end 2248 of balloon 2208 is inverted in a proximal direction, so that a front face 2254 is flat or even concave. An aperture 2220 of sheath 2250 may be at the same axial position, more distal or more proximal, depending on the implementation and also as shown in some examples herein. A potential advantage of such an arrangement is balloon distal end 2248 can be placed at a distal most end of system 2202. Balloon 2208 can potentially be used to manipulate a penetration tool tip while having a control and small area of expansion. This may create more torque and moment directing the penetration tip towards a desired part of blockage 104. Another potential advantage of such a proximally regressed aperture 2220 relative to balloon 2208 is protection of the wall of vein 100 from a penetration tip.

In the example shown, a distal extension 2256 of a membrane used to form balloon 2208 is inverted and attached to sheath 2220 inside of balloon 2208. Optionally, a proximal side of balloon 2208 is attached in a traditional manner—with a proximal flap 2260 attached to shaft 2210 proximally to balloon 2208.

Also shown in this figure is an example of an inflation lumen 2252, between sheath 2220 and shaft 2210.

In some embodiments of the invention, balloon 2208 is made of non-compliant materials such as Nylon or PEBAX. A potential advantage of a balloon over a metal structure is that a balloon can better distribute stress on the vein wall and such stress may be a problem when using the balloon to anchor while advancing a penetration tip into viscous or rubbery blockage. Another potential advantage of a balloon over a structure which is not continuous is that a balloon may be able to apply more force and/or provide better friction so it anchors better in a blockage and/or vein.

FIGS. 23A-E show various views of an alternative design of a balloon 2308 with an inverted distal section (which may or may not include an inverted neck), in accordance with some embodiments of the invention.

Figure 23A:
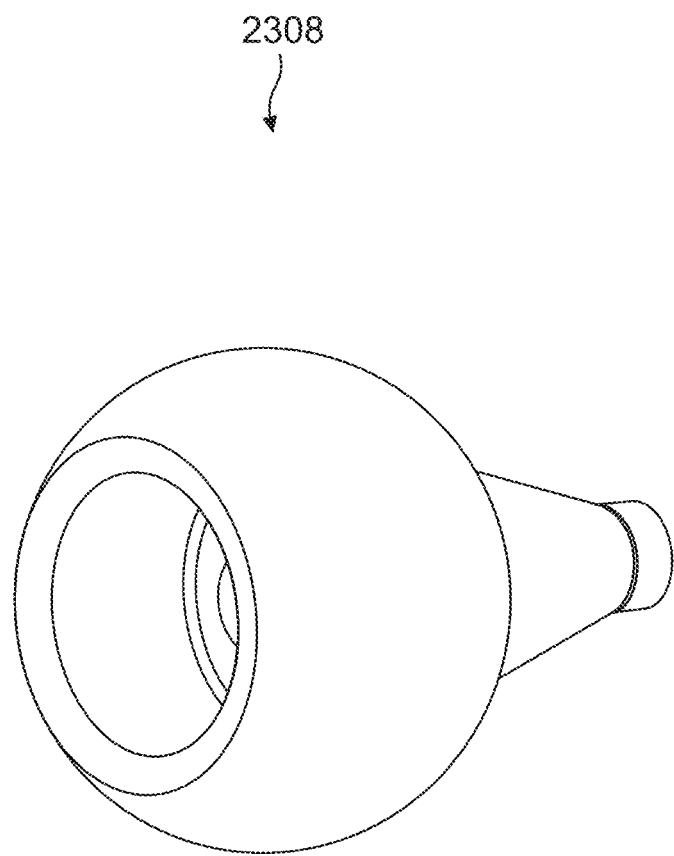
FIGS. 23A-23J shows designs of balloons with an inverted distal neck, in accordance with some embodiments of the invention.
Figure 23B:
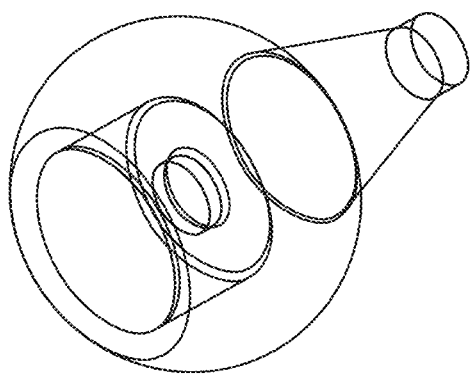
Figure 23C:
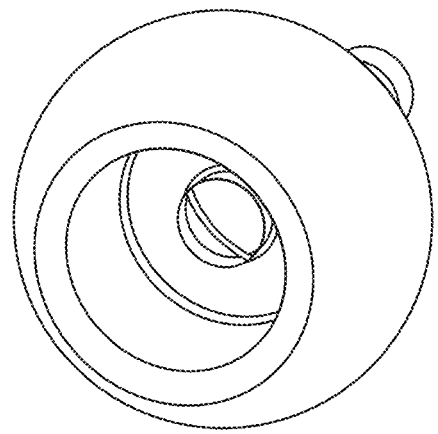
Figure 23D:
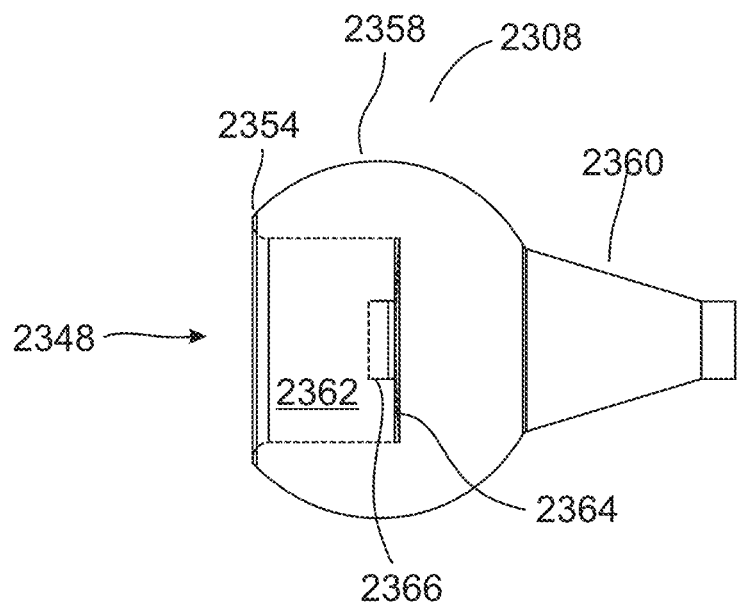
Figure 23E:
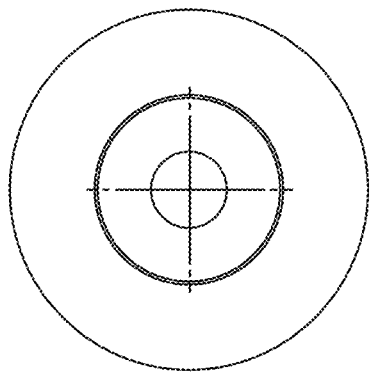
Figure 23I:
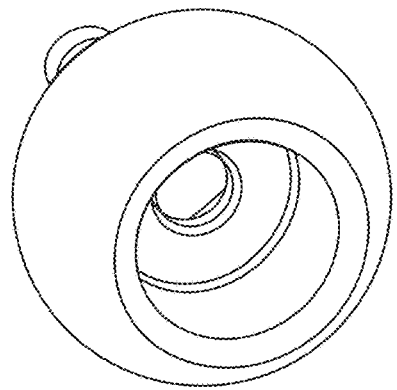
Figure 23J:
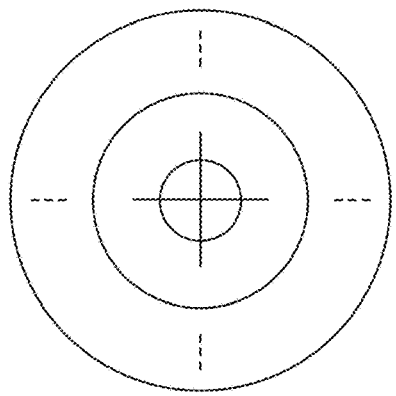

FIG. 23A is a shaded side perspective view.
FIG. 23B is a side perspective transparent view.
FIG. 23C is a front perspective view.
FIG. 23D is a side cross-sectional view.
FIG. 23E is a front view.

Referring specifically to FIG. 23D, a front most edge 2354 defines a concavity 2362 together with a more proximal surface 2364. An optional protrusion 2366 may be a portion of balloon 2308 which overlaps a sheath (not shown in this figure). Also shown in the figure, are a proximal attachment section (to a shaft) 2260 and a widest portion 2358 which sets the anchoring against the wall of vein 100. Optionally, the distance between widest portion 2358 and front most edge 2354 is less than 10 mm, 7 mm, 5 mm, 3 mm, 2 mm or intermediate axial distances, along a long axis of the blockage passage system.

Figure 23H:
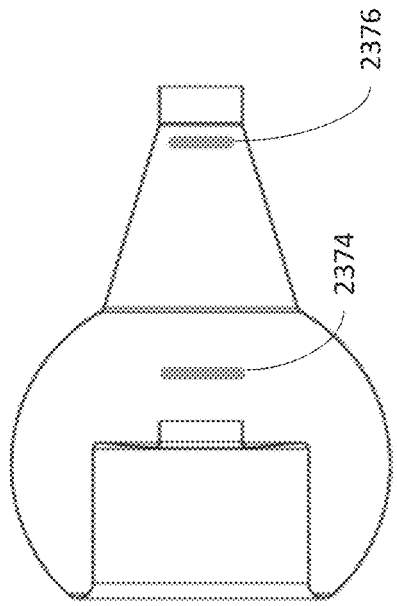
Figure 23G:
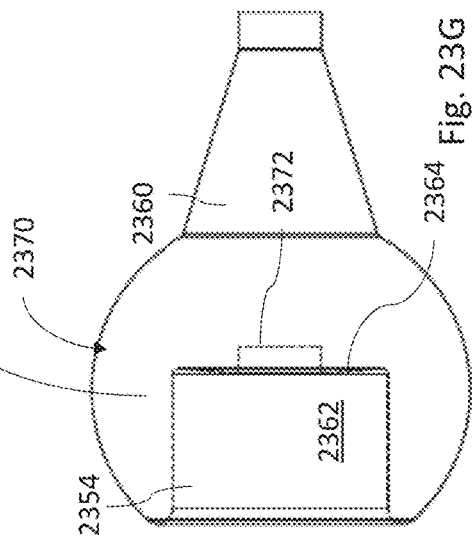
Figure 23F:
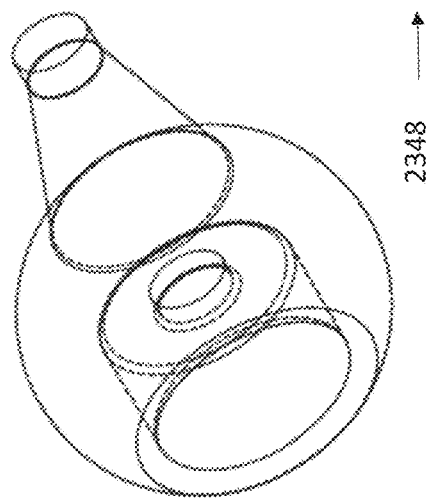

FIGS. 23F-23J correspond generally to FIGS. 23A-23E, but show a different embodiment of a balloon 2370. Referring specifically to FIG. 23G, it is noted that protrusion 2366 is replaced by a non-protruding and optionally inverted section 2372.

Referring to FIG. 23H some options of radio-opaque markers are shown, for example, markers on body 2358 or on a shaft (not shown) on which the balloon body is mounted. For example, a radiopaque marker 2376 may be used to indicate a proximal side of the balloon. Optionally or additionally, a radiopaque marker 2374 may be used to indicate a position to which to retract the penetration tip. More distal locations may be provided as well, for example, indicating a distal edge or a maximal expansion axial position on the balloon. In some embodiments of the invention, the markers are circumferential. Optionally or additionally, at least one marker is not circumferential and/or is not circumferentially symmetric, so it may optionally be used for determining a rotational state of balloon 2308/2370.

Figure 23L:
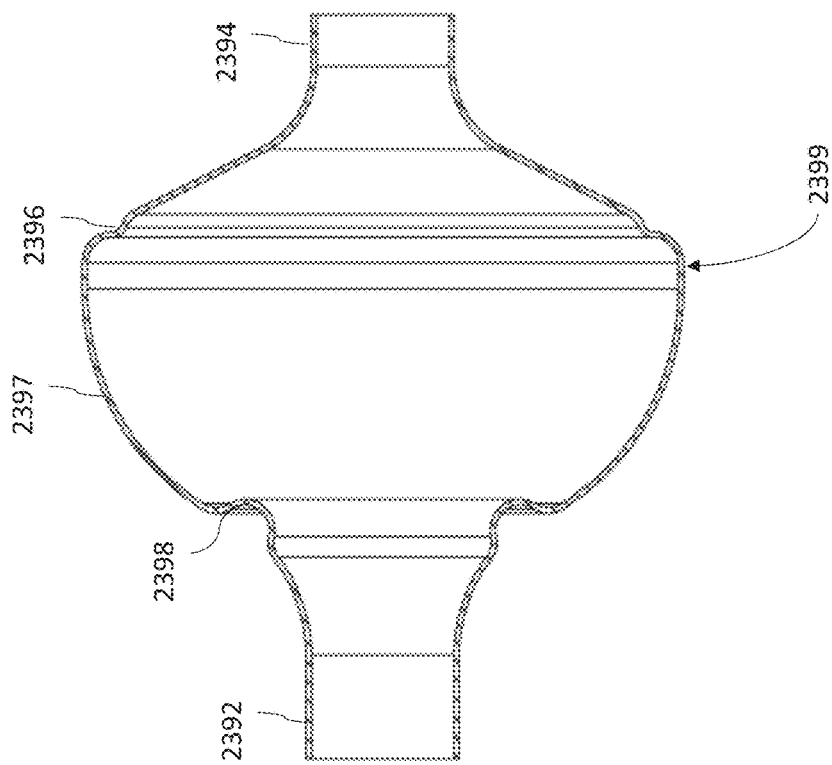
FIGS. 23K-23L show invertable balloons, including one or more crimps, in accordance with some embodiments of the invention.
Figure 23K:
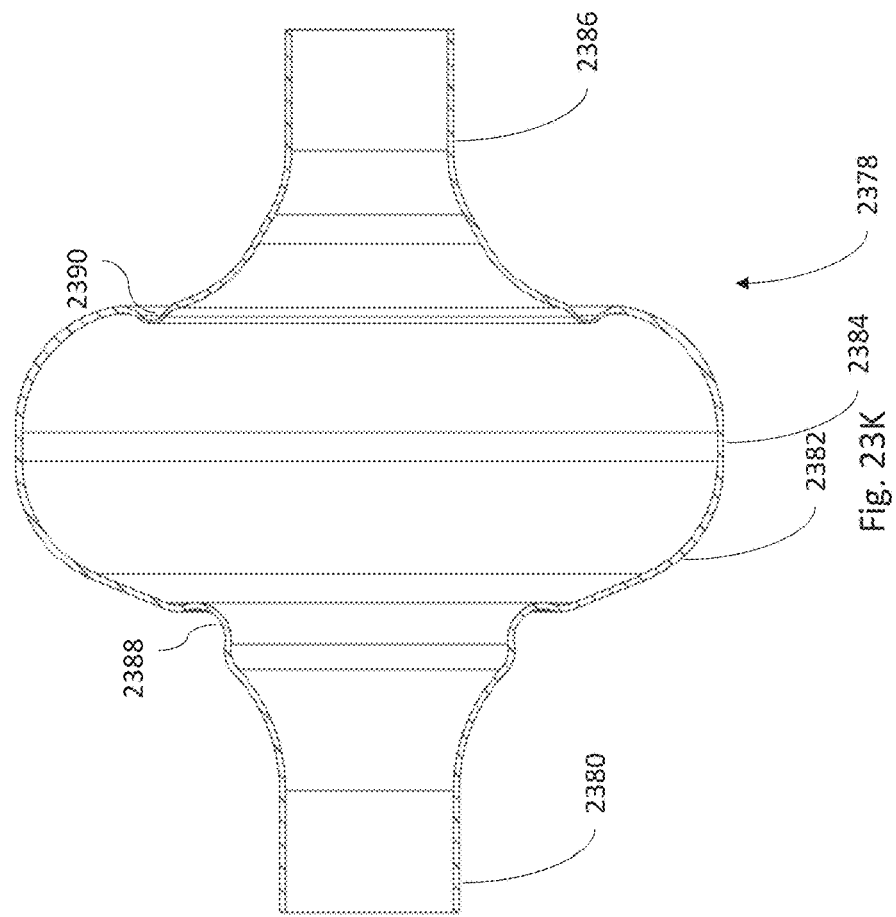

FIG. 23K shows a balloon 2378 including one or more geometries designed to help balloon 2378 fold, in accordance with some embodiments of the invention.

A reference 2380 indicates a proximal side and 2386 a distal side of balloon 2378. As shown, it is desirable in some embodiments that the balloon invert on the distal side, for example, during manufacture. To this end, distal end 2386 is optionally made with a more uniform diameter. Optionally or additionally, a geometry 2390 is provided to assist in inversion of end 2386.

In some embodiments of the invention, geometry 2390 comprises a circumferential crimp, which is deep enough in an axial direction to substantially isolate a body 2382 of balloon 2378 from deforming due to the inversion (e.g., during manufacture). A possible mechanism of operation is that geometry 2390 preferentially propagates strains caused by the inversion in a circumferential direction. This may prevent stresses formed during inversion from propagating to body 2382. Optionally or additionally, the axial depth of the geometry defines a deformation which is stable under the forces caused by inversion. Optionally or additionally, the crimping acts as a pre-deformed zone which gives less resistance to the inversion of the balloon material.

Geometry 2390 is on a distal side of a widest part 2384 of body 2382.

In some embodiments of the invention, a geometry 2388 is provided, optionally to assist in more compact and/or even folding of balloon body 2382 during use. As noted, in an exemplary embodiment, body 2382 is inflated and deflated to a minimal diameter multiple times during passing of a blockage.

In some embodiments of the invention, geometry 2388 encourages first deflation of body 2382 before deflation of parts proximal thereto. This may assist in better compaction. In some embodiments of the invention, the crimped zone acts to prevent pancaking of the balloon and instead encouraging radial compression of body 2382. Optionally, the crimped zone resists collapse more than body 2382, as the balloon volume is reduced, and this may encourage radial compression instead of pancaking, as pancaking may require folding of geometry 2388, to which it may be more resistant that body 2382 is to radial collapse.

In some embodiments of the invention, axially extending pleats (not shown, for example on an outside or an inside surface of the balloon) are provided to assist in folding. Geometry 2390 may also assist in folding of balloon body 2382.

FIG. 23L shows an alternative design for folding-assisting geometries in a balloon 2399, with a proximal end 2392 and a main body 2397. It is noted that balloon 2399 is shown as being generally more tapered on a proximal side, even at areas with large radii.

In this design, a proximal geometry 2398 has a radial extent larger than in balloon 2378. Such location is optionally selected to provide support for a desired design, for example, an amount of forward facing balloon material to contact the blockage. Optionally or additionally, a distal side geometry 2396 is at a greater radial location than for balloon 2378. This has the potential advantage (together with an optionally shorter distal section 2394), of a differently shaped concavity.

FIG. 24A and an inset FIG. 24B shows a cross-sectional view of a blockage penetration system 2402 with a balloon 2408 with an inverted distal face 2448, in accordance with some embodiments of the invention. The numbers follow the numbering of FIGS. 23A-L, with a "24" prefix. In addition, two radio-opaque markers are shown, 2474 and 2476 which generally correspond to those in FIG. 23H, shown here mounted on a shaft on which balloon 2408 is mounted. By comparing balloon 2408, 2308 and 2378, several differences can be seen, in particular the shape of the balloon is different. A shorter balloon may be useful to provide better anchoring and/or better blockage compression, due to more force applied at a point of contact. A longer balloon may be useful to reduce the pressure applied at any point, e.g., to prevent damage and/or to reduce a number of advancing steps and/or to provide support to more of channel 904. A longer balloon may also be useful for straighter channels. A shorter balloon may exhibit greater self-centering behavior.

A first optional modification is that balloon 2408 is generally cylindrical. A second optional modification is that the widest portion 2458 is substantially at a most distal part of BPS 2402. A protrusion 2466 (including a sheath portion of a sheath 2420) optionally extend to near the distal end of BPS 2402. This may assist in protecting balloon 240 from a sharp tip of a penetration tip 2406. Optionally or additionally, this may assist in protecting vein 100 from accidental penetration.

FIG. 24C is a cross-sectional view of a blockage penetration system 2430 including an axially movable sheath 2432, in accordance with some embodiments of the invention. As shown, system 2420 includes an axially short balloon 2438 with relatively flat sides 2440 and a flat and concave distal face. A shaft 2442 defines therein a lumen with a penetration tool 2444 located within. Optionally, and as shown, movable sheath 2432 is located between penetration tool 2444 and shaft 2442. An inflation lumen 2448 is also shown.

In some embodiments of the invention, an exit port 2450, optionally with a tapered chamfer defines an exit from shaft 2442 and optionally extends slightly past a front face of balloon 2438. Sheath 2446 also optionally has a tapered chamfer. As shown port 2450 is thicker (and/or otherwise made stiffer) which may prevent deformation of balloon 2438 and/or maintain sheath 2432 and/or penetration tool 2444 from bending, if they are pre-bent. Penetration tool 2444 ends with a distal penetration tip 2445 which is optionally pre-bent.

Figure 24D:
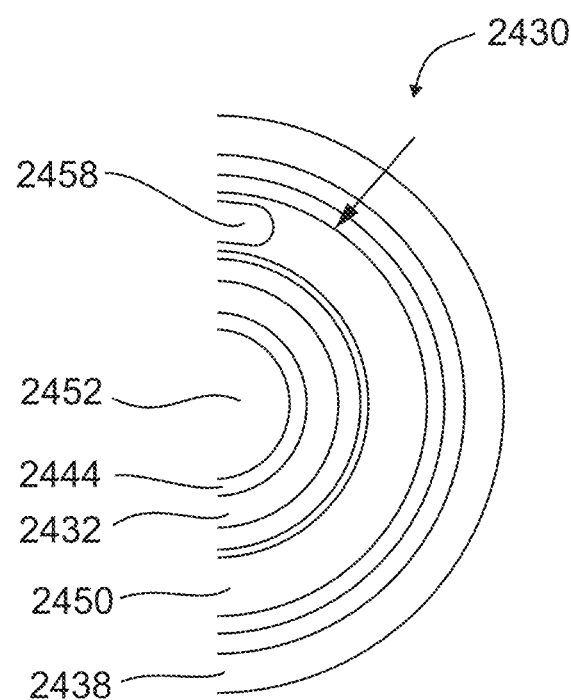
FIG. 24D is a front view showing various layers in a tip of a BPS, in accordance with some embodiments of the invention.

FIG. 24D is a cross-sectional front view of BPS 2430, showing concentric layers, in order from the inside out:
a guide wire lumen 2452;
penetration tool 2444;
sheath 2432;

port 2450;
an inflation lumen 2458; and
balloon body 2438.

In some embodiments of the invention, inflation lumens and/or contrast material injection lumens may be defined between layers.

Figure 24E:
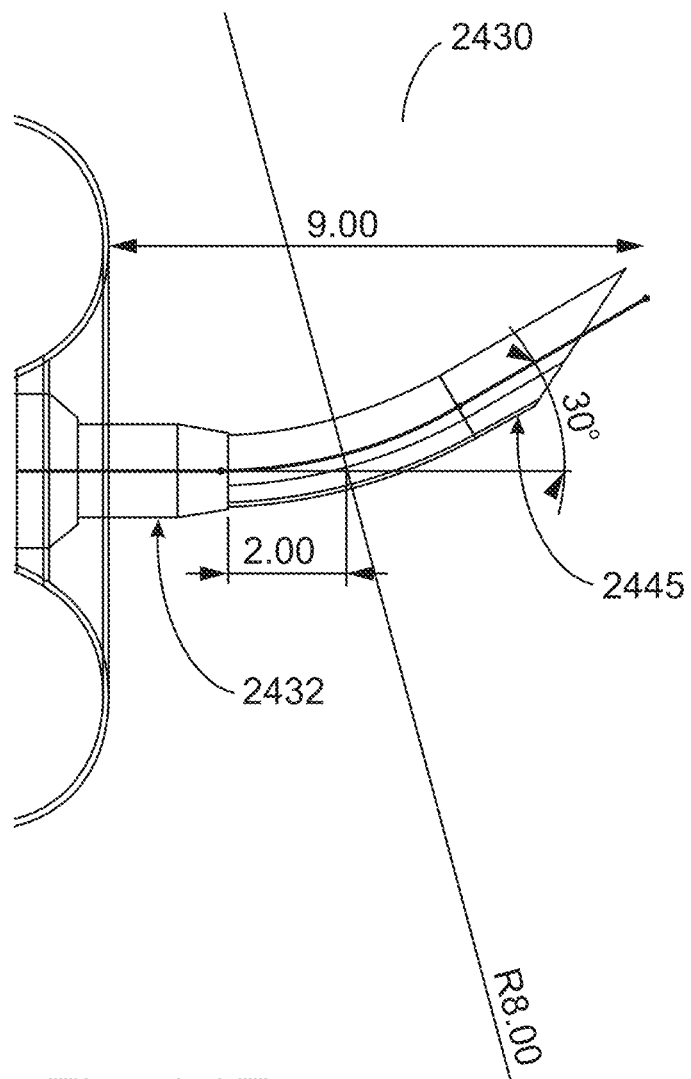
FIG. 24E is a side view of a tip of a BPS showing a bent penetration tip, in accordance with some embodiments of the invention.

FIG. 24E is a side view of penetration tip 2445 extending out of BPS 2430, in accordance with an exemplary embodiment of the invention.

In the embodiment shown, penetration tip 2445 is prebent (or includes bending means). As can be seen, sheath 2432 prevents bending of tip 2445. Also shown is an angle of 30 degrees formed between a direction of the tip of penetration tip 2445 (this tip of tip is optionally straight, with a bend forming proximally thereof) and sheath 2432. As shown, penetration tip 2445 is pre-formed with a bending radius of, for example, 8 mm.

Exemplary Asymmetric Balloon Design

In some embodiments of the invention, an asymmetric balloon is chosen. This may be useful, for example, if a desired penetration point 101 is not at the center of the cross-section of vein 100. This may be a potential advantage if the vein is deformed, for example, due to vein deformation or if expansion of the vein is limited on one or more sides by harder tissue, such as bone or muscle.

Figure 25A:
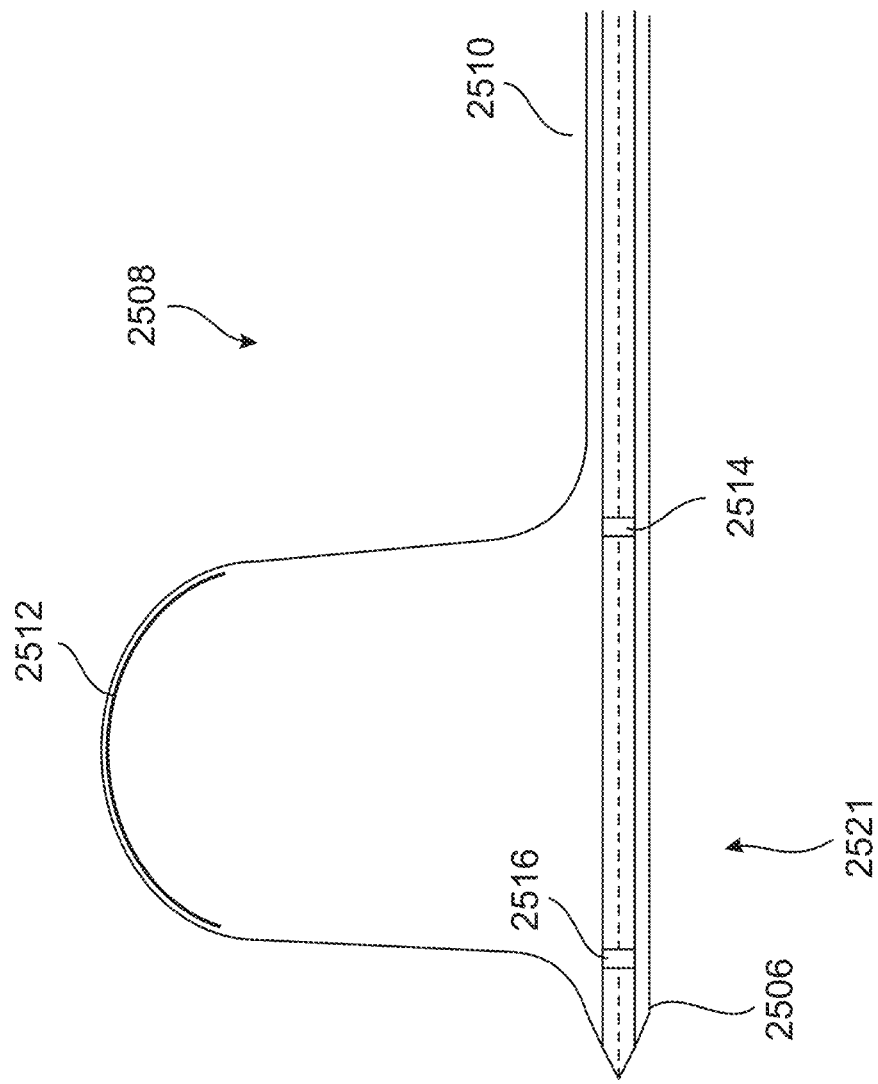
FIG. 25A shows an asymmetric balloon design, in accordance with some embodiments of the invention.

FIG. 25A shows an asymmetric balloon 2508, in accordance with some embodiments of the invention, in which substantially all expansion is to one side of a shaft 2510. In other examples, there may be a different ratio between the amounts of expansion on opposite sides of shaft 2510, for example, 1:4, 1:3, 1:2, 1:1.1 or intermediate or greater or smaller ratios. Also, in balloon 2508 a partially (or non-) inflating section 2521 (e.g., the section of the balloon with a smaller diameter or cross-section) need not cylindrical or spherical. For example, the balloon may include a notch, optionally for passage of an elongate tool, such as a guidewire or a penetration tool, therealong.

In the extreme example shown in FIG. 25A, a penetration tool tip 2506 passes to the side of an expanding part of balloon 2508.

In some embodiments of the invention, the balloon expands asymmetrically due to a greater stiffness on one side of the balloon, for example, due to a greater thickness of material. Optionally, the balloon is allowed to be semi-compliant.

FIG. 25A also shows exemplary radio-opaque markers, for example, a radially extreme marker 2512 showing a radial extent of expansion of balloon 2508 and optionally also used to determine an orientation thereof. One or more radio-opaque markers 2514 and 1516 on shaft 2510 are optionally used to indicate an axial start and/or end of an expanding portion of balloon 2508.

Figure 25B:
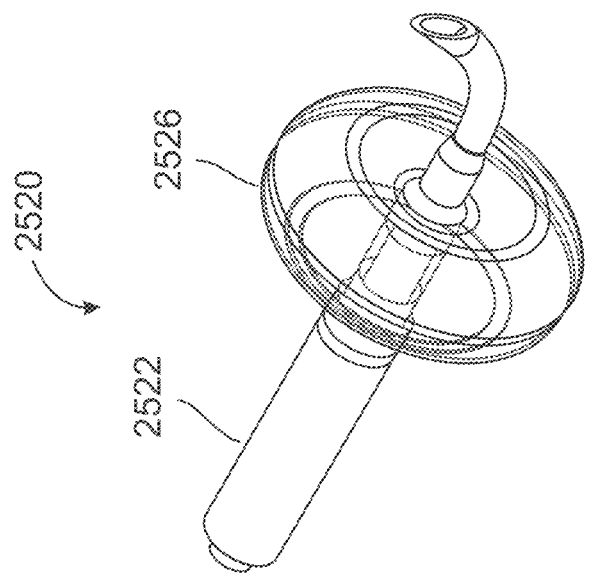
FIGS. 25B-25E show designs for balloon inflation lumens, in accordance with some embodiments of the invention.
Figure 25C:
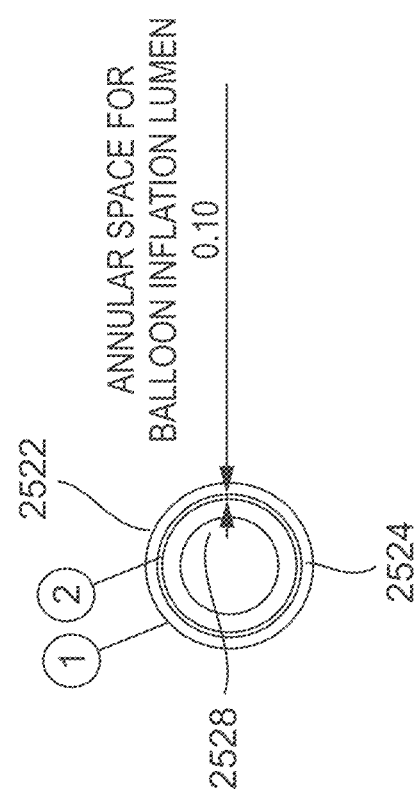

FIG. 25B shows a semi-transparent perspective view of a distal side of a BPS 2520 and FIG. 25C a cross-sectional view through a shaft 2522 thereof, indicating a location of an inflation lumen 2524 for a balloon 2526 thereof.

As shown, inflation lumen 2524 is formed between shaft 2522 and an inner tube, such as a sheath or penetration tool or another tube, 2528.

Figure 25D:
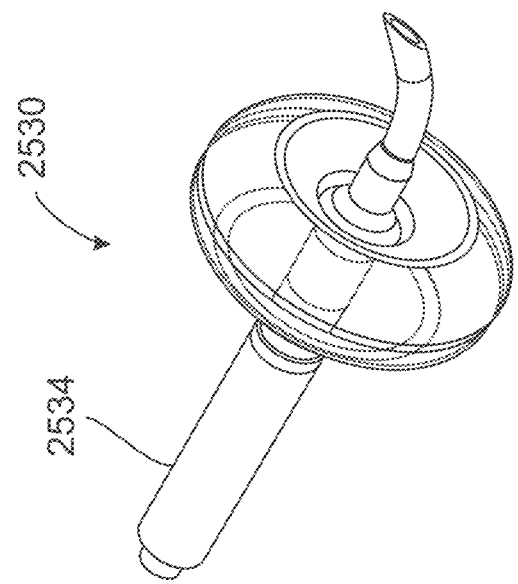
Figure 25E:
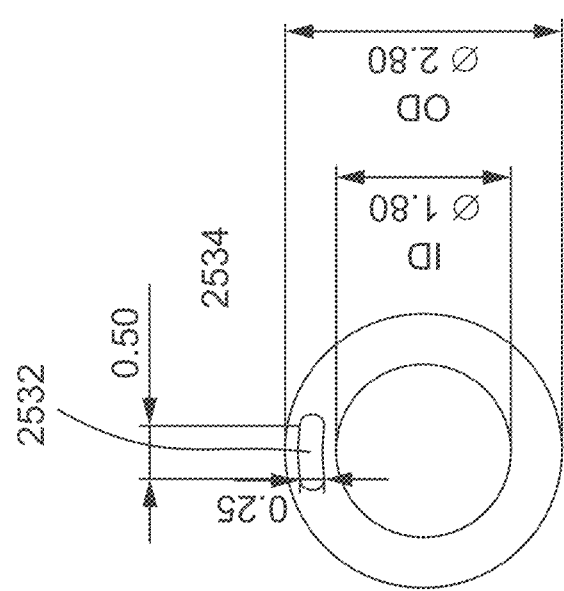

FIG. 25D and FIG. 25E correspond generally to FIGS. 25B and 25C, except that in a BPS 2530 shown in FIG. 25D, a side inflation lumen 2532 is formed in a body of a shaft 2534 thereof. This inflation lumen may be used, for example, in the embodiment of FIG. 24D (2458).

FIG. 25F shows a balloon design 2540 including a plurality of compartments 2542, 2544. While two are shown, a larger number, such as 3, 4, or more may be provided. While the two compartments are shown as equal, in some embodiments they have different lengths, shapes, circumferential extent, radial extent and/or volumes from each other.

Optionally, as shown, separate inflation lumens (2548, 2550) are provided for each balloon compartment. A potential advantage of multiple compartments is that selective inflation may be used for navigation and/or aiming of a penetration tip 2546 and/or for other tissue manipulation. Another potential advantage is the ability to use a same device for both symmetric and asymmetric balloon applications.

Exemplary Energy Deposition

As noted, blockage 104 may be rubbery and/or otherwise difficult to penetration. In some embodiments of the invention, such penetration is aided by delivery of non-mechanical energy at a tip of the penetration tool.

Figure 26:
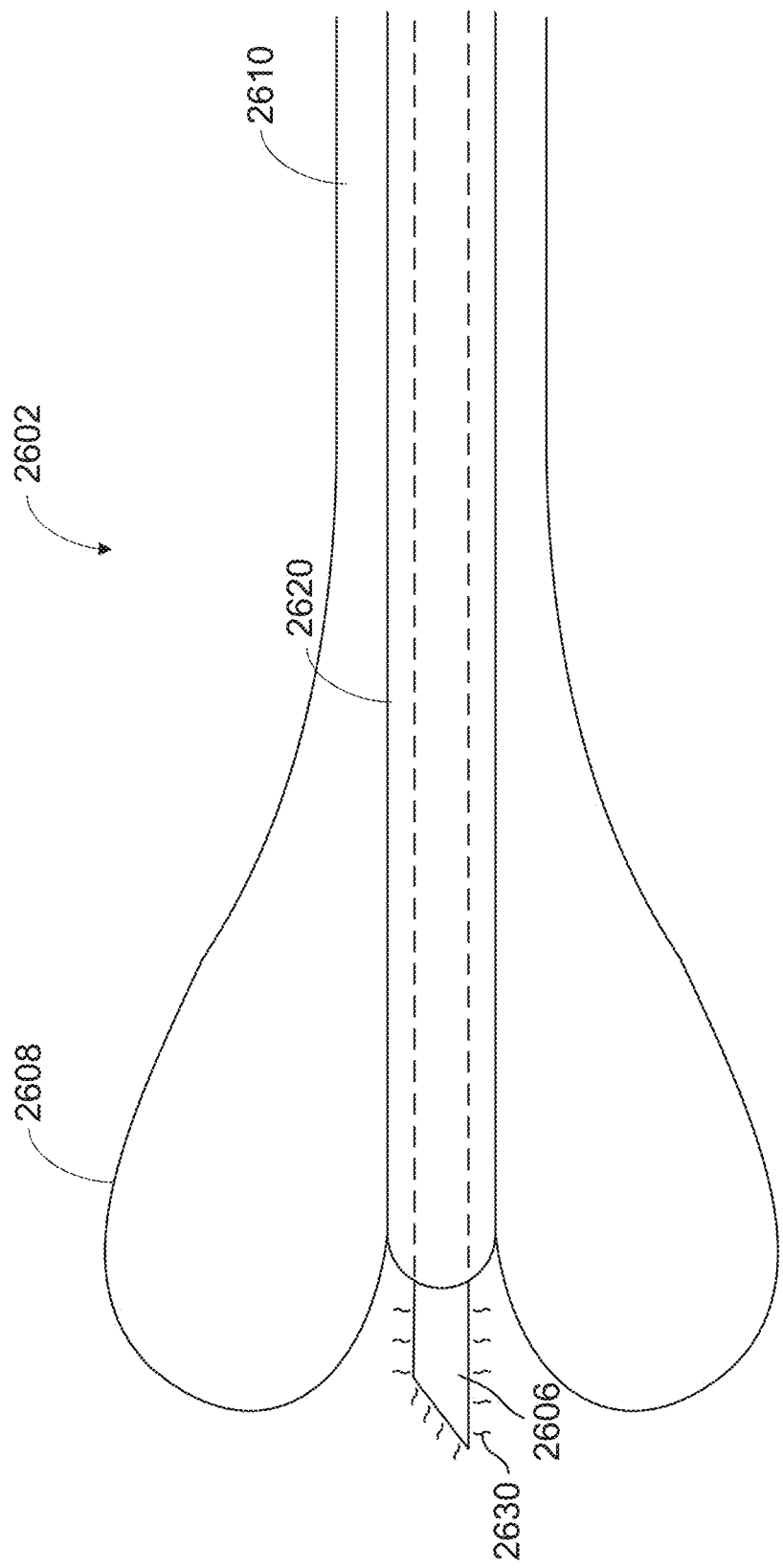

FIG. 26 is a cross-sectional view of a blockage penetration system 2602 including a heated penetration tip 2602, emitting heat, shown as 2630, in accordance with some embodiments of the invention. In some embodiments of the invention, penetration tip 2606 is sheathed in an isolating sheath 2620 to prevent damage to parts of system 2602 (such as a balloon 2608 or a shaft 2610) and/or the patient's body (e.g., vein 100).

In some embodiments of the invention, insulation is provided using a high-temperature melting polymer, such as PEEK. Optionally, heat is generated by one or more electrodes (and a resistance element, possibly the tip itself). Alternatively, heat may be generated in the handle or more proximally and transmitted along the penetration tool to the tip.

In some embodiments of the invention, tip 2606 is heated to, for example, between 50 and 90 degrees Celsius, for example, between 55 and 80, for example, about 60 degrees. Optionally, a temperature is chosen to enhance penetration of tip 2606. Optionally, a duration of heating is selected so that heat will not propagate to the surrounding vein wall in a manner which will cause damage to it. In some embodiments of the invention, such propagation is prevented by controlling the amount of heat and allowing that heat to be absorbed by the blockage, for example, a blockage stiffening in response to heating, for example, by collagen cross-linking thereof.

FIG. 27 is a cross-sectional view of a blockage penetration system 2702 including an RF emitting penetration tip 2702, emitting RF, shown as 2730.

In some embodiments of the invention, BPS 2702 acts as a unipolar RF emitter optionally used with a common receiver in the form of a ground area electrode (e.g., attached to the back). Optionally or additionally, tip 2702 includes a plurality of electrodes and acts as a bipolar RF source. Optionally, the body of the elongate penetration tool serves as one electrode and a separate wire, optionally embedded in shaft 2710, serves as a second electrode.

In some embodiments of the invention, tip 2702 is blunt, for example, rounded, with the RF (or, for BPS 2602, heat) softening blockage 104 enough to allow advancement of tip 272 therethrough.

In some embodiments of the invention, RF is provided by a standard RF generator. Optionally or additionally, RF (or heat, for BPS 2602) is generated in the handle of BPS 2702 and optionally transmitted along the penetration tool or catheter shaft to the distal end of BPS 2702.

In some embodiments of the invention, other means of providing energy at tip 2706 are used. For example, tip 2706 may be used to deliver electrical current (e.g., AC and/or DC) into the body and, optionally, tip 2606 is covered with a resistive material which heats when electrical current passes therethrough. Optionally or additionally, tip 2706 is configured to vibrate, e.g., using a local vibration source or using a vibration source in the handle of BPS 202.

Exemplary Handle Designs

In some embodiments of the invention, some or all of the controls and/or components needed for a procedure are provided in one system. For example, the system may include a built-in penetration tool, inflation system and sheath (if any). Optionally, a separate guidewire is used. Potentially, such design can simply the use and/or setup of BPS 202.

FIG. 28 is a block diagram of a handle 2812 for a blockage penetration system, in accordance with some embodiments of the invention. In some embodiments of the invention, the handle is self-contained and includes all the controls and/or sources (e.g., fluid, power) needed for treatment. Optionally or additionally, the handle uses electrically controlled actuators, such as electric linear or rotary motors so that user manipulation is amplified or transduced (or otherwise used to control) to have an effect on the distal end of the BPS.

In some embodiments of the invention, a handle body 2838 is attached (e.g., injection molded) on a proximal end of the BPS. Body 2838 may include one or more apertures, optionally with Luer fittings for various functionalities, such as guidewire insertion, inflation fluid and/or contrast material injection. Optionally, handle body 2838 is a clamshell design and/or formed of polypropylene or HDPE.

Reference 2806 indicates a proximal end of a penetration tool, which is optionally advanced and/or retracted via an actuator 2830. Example of manual actuators include a dial, switch and a slider. Optionally, actuator 2830 includes a port for guidewire insertion.

Reference 2820 indicates a sheath through which penetration tool 2806 slides and which defines an inflation lumen 2821 outside for inflating a distal anchoring and/or compacting balloon (not shown in this figure).

Reference 2834 indicates an inflation unit, which optionally includes its own storage of inflation fluid. Optionally, inflator 2834 is also operative to deflate the anchoring balloon, for example, including a bi-directional syringe pump. In some embodiments of the invention, circuitry 2836 for power provision and/or coordination. Optionally, circuitry 2836 coordinates advancing/retraction by actuator 2830 with inflation/deflation by inflator 2834, potentially simplifying the use of the BPS.

In some embodiments of the invention, a spring (not shown and possibly as part of actuator 2830 and/or an actuator 2832, which may be used for rotating, bending and/or axial movement) is used to bias the penetration tool to a retracted position, potentially assisting in retraction.

FIG. 29A is a schematic side showing of a handle 2912 for a BPS, in accordance with an exemplary embodiment of the invention. FIG. 29B is a back view of handle 2912. Handle 2912 is optionally sized and shaped to be ergonomic and to guide a user's fingers to one or more of the controls described below. Optionally, handle 2912 includes one or more finger recesses.

Handle 2912 optionally includes one or more of the following ports: a guidewire and penetration tool port 2940, an inflation port 2942 (for the balloon) and a contrast material port 2944 (e.g., for injection through the penetration tool or between the tool and its sheath). One or more other controls may be provided, for example, to control the penetration tool (e.g., rotation and/or bending and/or axial position), for example in embodiments where a proximal side of the penetration tool does not extend past the handle, or extends less than 20 cm.

Handle 2912 optionally includes a first control 2946 for controlling a rotation of the penetration tool (e.g., instead of or in addition to using a rotatable port 2940). Optionally or additionally, handle 2912 includes a control 2948 for selective advancing and retracting of the penetration tool. Optionally or additionally, handle 2912 includes a control 2950 for bending of a tip of the penetration tool. Alternatively, one control is used for advancing the penetration tool until a point where it bends and another control is used to further advance the penetration tool (which is pre-bent) so it can bend. Optionally or additionally, a control is used for the inflating the balloon, for example, control 2946, for example in the form of a plunger (e.g., movable axially or screwed forward). Any of these controls may be, for example, in the form of a slider or a knob.

Handle 2912 may include markings to show a position and/or orientation and/or bending degree of the penetration tool.

Figure 29C:
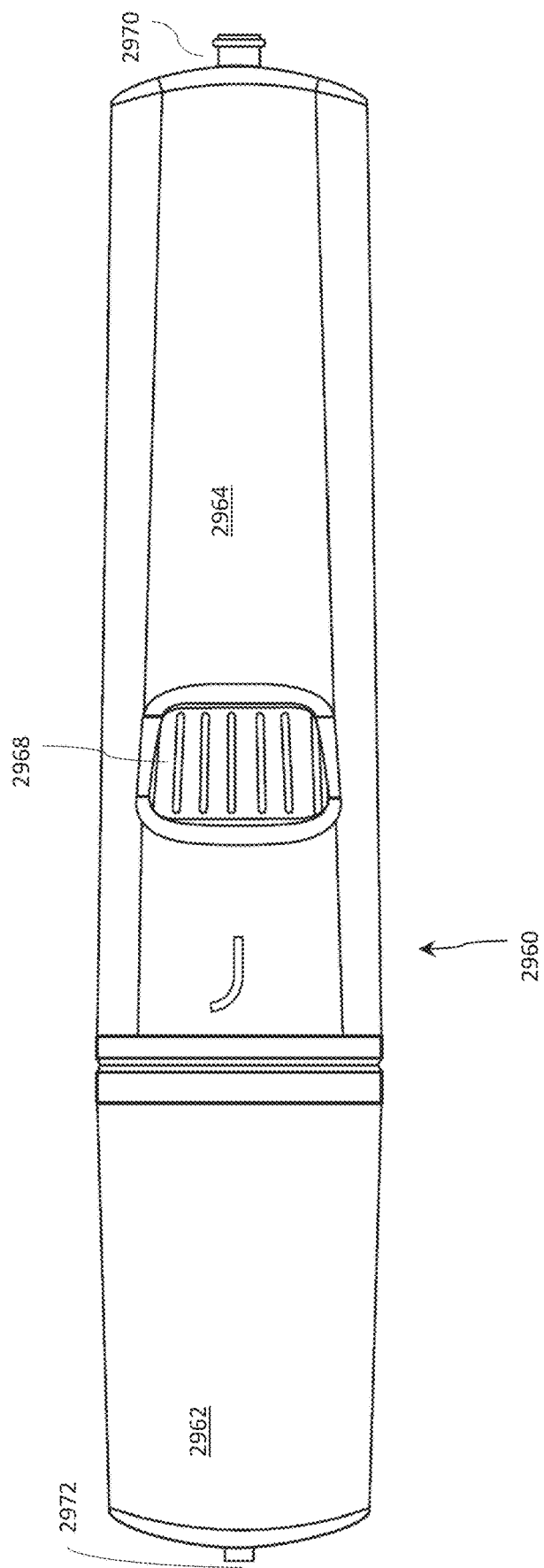

FIG. 29C shows a handle 2960 in accordance with another embodiment of the invention. Handle 2960 includes a tip port 2972 which, for example, connects to a tube, such as a sheath, used to deliver the penetration tool into the body. An optional rear port 2970 is optionally used for a guidewire. In some embodiments of the invention, handle 2960 is axially expandable, with a proximal section 2962 slidable away from a distal section 2964. In some embodiments of the invention, such sliding activates the penetration tool, for example, inflating or deflating the balloon and/or advancing and/or retracting the penetration tip. Optionally or additionally, a knob 2968 is used for one or more of these functions. Optionally, a pre-bent direction of the tool is shown on the handle. Optionally or additionally, knob 2968 is used to rotate the tip relative to the balloon.

Figure 30:
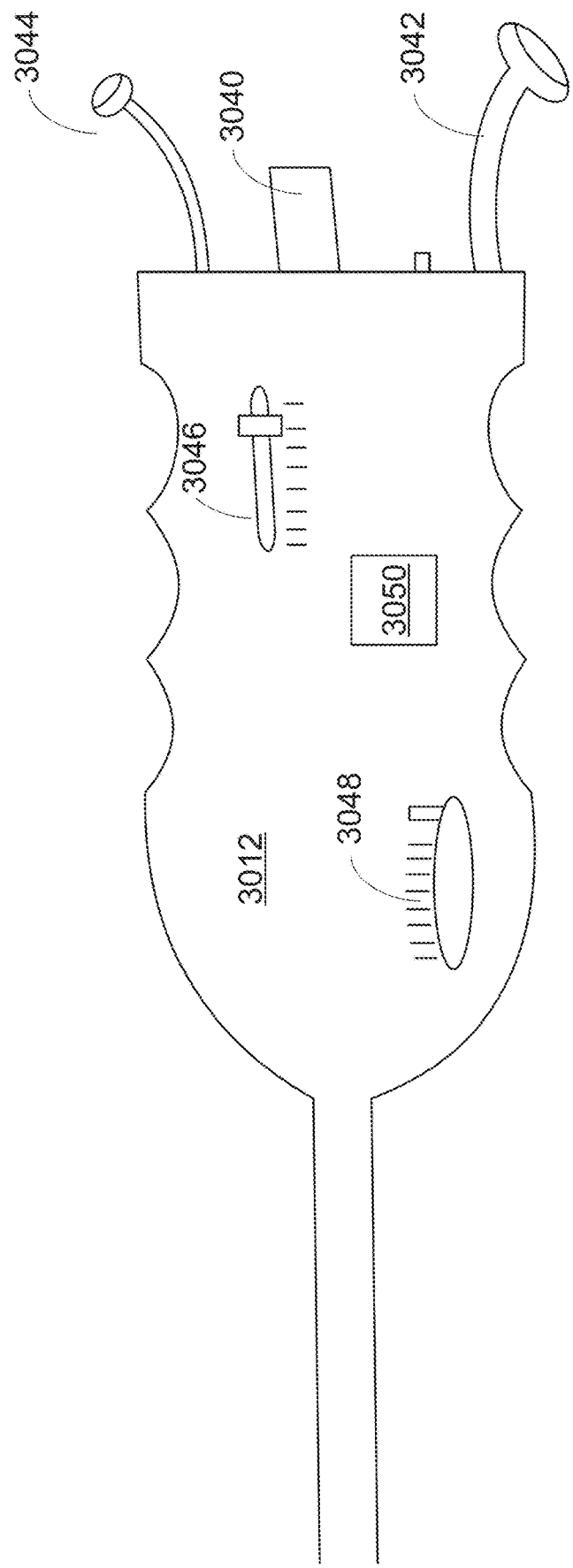

FIG. 30 shows an alternative handle 3012 used with a pre-bent penetration tool, in accordance with some embodiments of the invention. An actual handle may include features selected from any of the handle designs described herein.

References 3040-3044 may be similar to 2940-2944 (FIG. 29A). In some embodiments of the invention, a first control 3040 is used to control an axial location of the penetration tool and a second control 3046 is used to control a rotational orientation of the penetration tool. Markings are shown in the Figure.

If the penetration tool is pre-bent, there is a known relationship between axial advance and angle of the tip, which may both be shown using the markings on one of the controls.

In some embodiments of the invention, fluid for inflation is inside handle 3012 and optional, one of the controls (or an additional one, such as in FIG. 29A) is used for selective inflation deflation. Optionally, such inflation and/or deflation is keyed to axial motion (e.g., control 3048). Optionally, the handle include a pressure gauge 3050 (and optionally an associated pressure sensor, not shown), to show balloon inflation pressure, or a user may rely on the marking on the control. Optionally, handle 3012 is pre-filled with fluid before a procedure (e.g., using one of ports 2044 and 3042).

Tip Location Determination

A potential risk of advancing a tool in an obstructed (and possibly stiff) blood vessel is that the tool may exit the blood vessel and further manipulation will occur outside the blood vessel. In addition to potentially damaging tissue outside the vessel, this may cause damage to the vessel itself and/or bleeding.

Related to this risk is a desire to identify when an obstruction is passed and further tool manipulation may not be needed.

Potentially, a location of a tool tip (relative to blood vessel walls and/or obstruction) can be identified by injecting contrast material and imaging the spread of the contrast material using x-ray (or, e.g., ultrasound, if ultrasound contrast material and imaging are used). However, contrast material is somewhat toxic to patients, so avoidance thereof is beneficial. Also, contrast material injected into an obstruction, or a muscle might not spread enough to show an outline of a nearby blood vessel. In general, injection into a muscle or other tissue with no blood flow to carry away the contrast material may be less preferred as this may block parts of the image for a significant amount of time.

Figure 31:
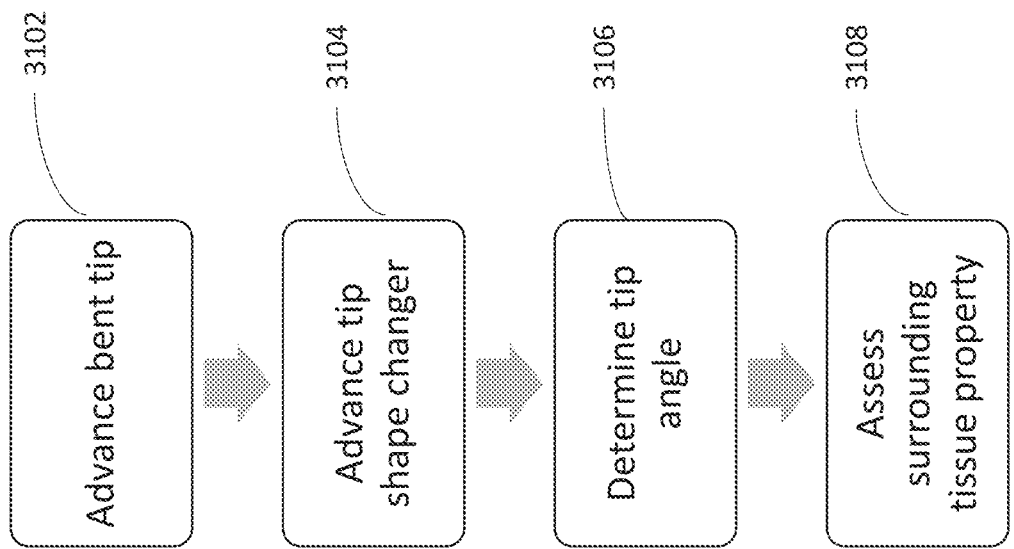
FIG. 31 is a flowchart of a method of tissue properties estimation, in accordance with an exemplary embodiment of the invention.

FIG. 31 is a flowchart of a method of tissue properties estimation, in accordance with an exemplary embodiment of the invention.

Figure 32:
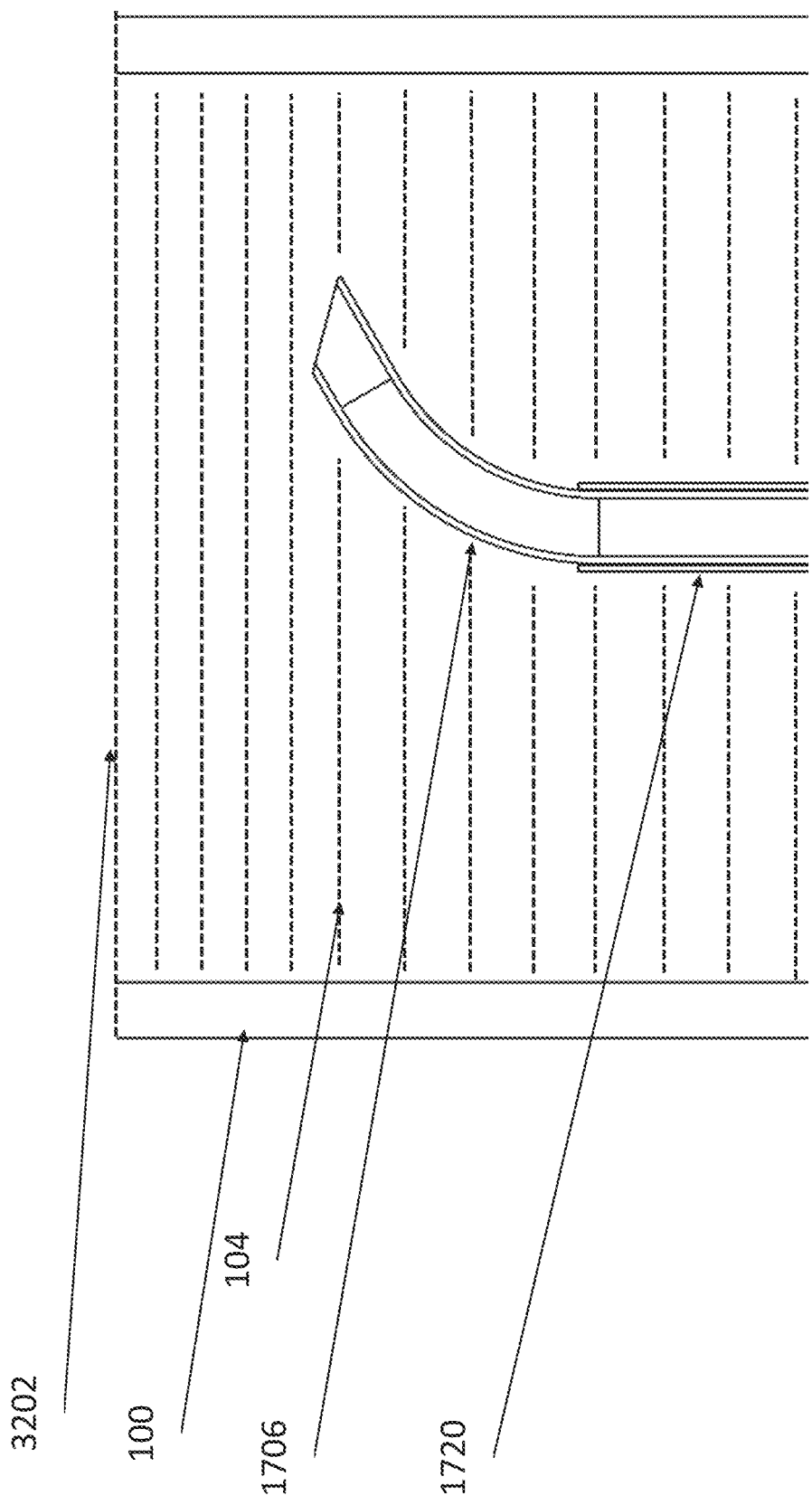
FIG. 32 shows a bent penetration tip and a sheath in an occlusion in a blood vessel, in accordance with some embodiments of the invention.

FIG. 32 shows a bent penetration/tool tip 1706 and a sheath 1720 in an occlusion 104 in a blood vessel with a wall 100, in accordance with some embodiments of the invention. The occlusion has a distal surface 3202 (which need not be flat or smooth as shown).

In the method of FIG. 31, properties of tissue surrounding tool tip 1706 are identified based on resistance of such tissue to deformation of tip 1706. This may distinguish, for example, between blood (distally to surface 3202) and an obstruction 104.

At 3102, bent tip 1706 in a bent configuration is advanced.

At 3104, a tip shape changer is advanced axially, which applies enough force to deform tip 1706 (e.g., from a bent configuration to a straight configuration, or vice versa, or between two non-straight configurations). In some embodiments of the invention, the tip shape changer comprises a surrounding sheath 1720. In some embodiments of the invention, the tip shape changer comprises an inner stylet.

At 3106, a determination is made of the geometry of tip 1706 (e.g., how bent it is). Such determination can be, for example, by ultrasound and/or x-ray. In some embodiments of the invention, tip 1706 itself is radio-opaque (e.g., or includes a marker for different imaging type, such as an ultrasound reflector). Optionally, the imager is aligned with tip 1706 to ensure that the bending (or straightening) is in a plane perpendicular to the imaging direction. Optionally, tip 1706 (or parts of the penetration tool near it) includes a radiopaque or other marker that indicates its rotational orientation. Optionally or additionally, tip 1706 includes a plurality of radiopaque or other markers (e.g., ultrasound reflectors) or a linear marker, or tip 1706 itself is radio-opaque which can be seen as a curve.

It is a particular feature of some embodiments of the invention that the blood vessel may not be visible in such imaging and/or that no contrast material is used. While in some embodiments of the invention tip 1706 is elastic, super-elastic or shape memory and naturally tries to return to a previous configuration (e.g., straight), in some embodiments of the invention, tip 1706 is deformed using a pull wire and/or tip 1706 includes a strain or bend sensor. The actual strain on and/or length of the pullwire and/or resistance to bending of tip 1706 and transmitted by such pull wire and/or a sensor value may indicate a degree of bending of tip 1706. Such a sensor may, for example, be stand-alone, be mounted on a pull wire and/or not shown and possibly as part of actuator 2830 and/or actuator 2832 (FIG. 28).

At 3108 the determined geometry is optionally compared to an expected geometry and gives an indication of properties of the surrounding tissue, for example, resistance to lateral deformation of tool tip 1706.

Figure 33:
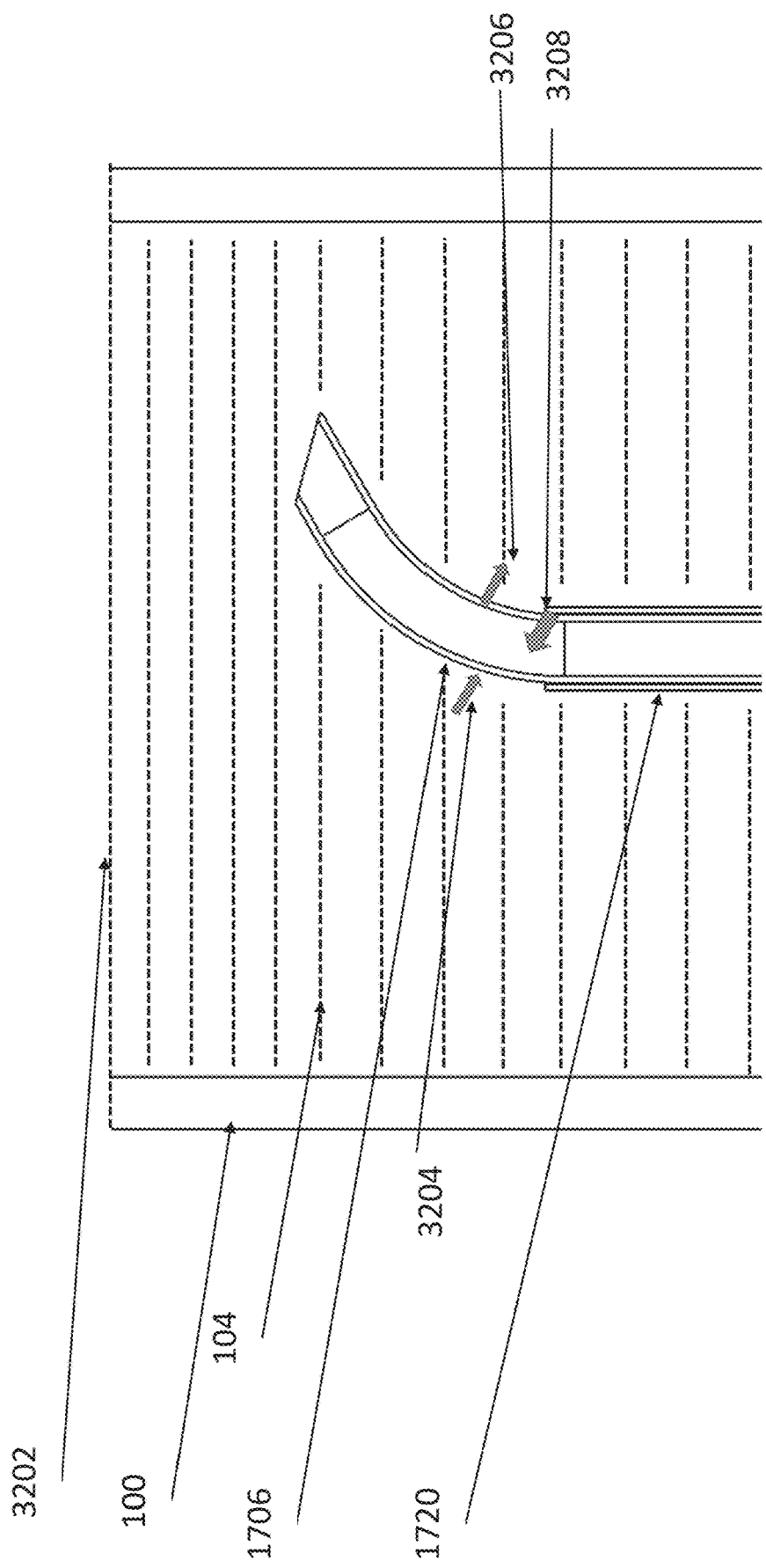
FIG. 33 shows the forces on an advancing curved penetration tip, in an occlusion, in accordance with some embodiments of the invention.

FIG. 33 shows the forces on an advancing curved penetration tip, in an occlusion, in accordance with some embodiments of the invention.

Arrow 3208 indicates a straightening force applied on tip 1706 when sheath 1720 is advanced. Arrow 3206 indicates the force applied by tip 1706 resiliently trying to maintain its bent configuration (e.g., due to pre-bending of the tip and/or due to active bending by a bending mechanism such as a pull-wire). Arrow 3204 indicates the resistance of surrounding obstruction 104 (if any) and/or other tissue, to shape changing of tip 1706. In general, tip 1706 will straighten if force 3208 is greater than the sum of forces 3204 and 3206. In some cases, force 3208 decrease as tip 1706 is straightened and forces 3204 and/or 3206 increase with the straightening, the degree of straightening of tip 1706 may indicate one or more properties of the surrounding tissue, such as elasticity or stiffness. For some tissue and needle sizes, the force on the needle, preventing straightening, can be between 0.1 and 100 Newton, for example between 5 and 50 Newton, for example between 10 and 20 Newton or small or larger or intermediate forces. In some cases, the applied force depends on the actual curvature of the needle, so the needle may deflect at least in part due to the sheath.

FIGS. 34A and FIG. 34B show a curved penetration tip in a starting position outside of and inside of an occlusion, respectively, according to some embodiments of the invention and FIG. 35A and FIG. 35B show a curved penetration tip after advance of a sheath along it outside of and inside of an occlusion, respectively, according to some embodiments of the invention. As can be seen, the degree of straightening of tip 1706 in FIG. 35A (where the tip is surrounded by blood or collapsed vessel walls) is greater than that of tip 1706 in FIG. 35B (where the tip is surrounding by a stiff obstruction 104. In some embodiments of the invention, tip 1706 is configured so it substantially straightens when surrounded by muscle, fat or interstitial material and does not straighten (significantly or to a straight configuration) when in a venous obstruction.

The conclusion when viewing FIG. 35A, is that tip 1706 penetrated passed the occlusion (or is otherwise outside the occlusion), while in FIG. 35B, further advancing is needed to pass the occlusion.

Figure 36B:
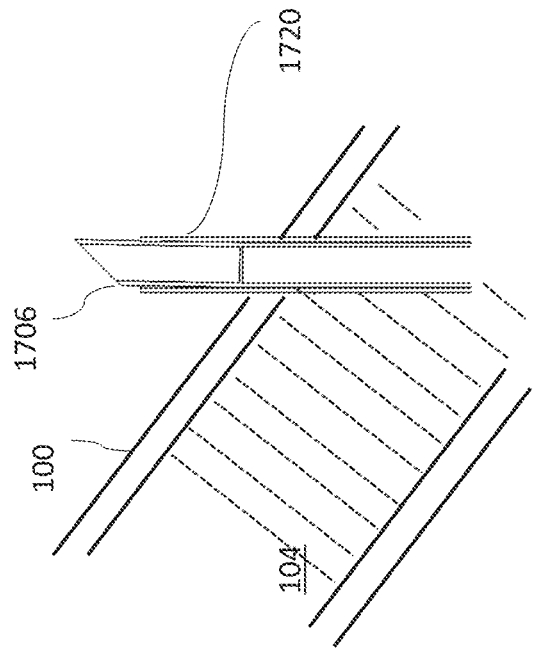
FIGS. 36A and 36B show a curved penetration tip extending out of a blood vessel before and after advance of a straightening sheath along it, in accordance with some embodiments of the invention.
Figure 36A:
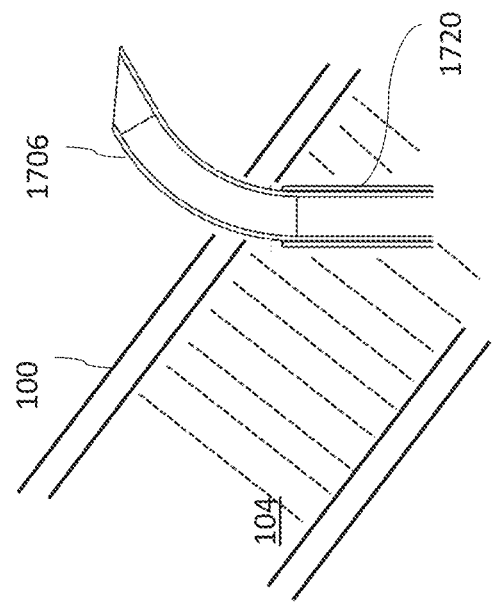

FIGS. 36A and 36B show a curved penetration tip extending out of a blood vessel before and after advance of a straightening sheath along it, in accordance with some embodiments of the invention. In some embodiments of the invention, the situations in FIGS. 35A and 36B are distinguished by imaging using contrast material to identify if tip 1706 is inside the blood vessel (in which case the lumen of the blood vessel will be visible) or outside (in which case unorganized pooling of contrast material may be expected). Optionally or additionally, the resistance to straightening in FIG. 36B is greater than that in FIG. 35A, as there may be more resistance to straightening outside the blood vessel.

Alternatively or additionally to using needle deformation to estimate surrounding tissue stiffness, balloon inflation and/or deflation may be used.

For example, the resistance to balloon inflation (e.g., measured based on time to inflate and/or using a pressure sensor, e.g., on the fluid path) can be used as an indication of surrounding tissue resistance. For example, resistance may be higher in an obstruction than outside of it. Optionally or additionally, balloon deflation may be used as an indication of forces acting on the balloon, which may, in turn, indicate an elasticity and/or resilience of surrounding tissue. For example, collapse inside an obstruction may be faster than in interstitial tissue. In some embodiments of the invention, balloon collapse is measured when a balloon which is not completely deflated is advanced over the tip and is thereby further collapsed and/or pressure therein increases, by surrounding tissue.

Alternatively, or additionally, resistance to injection of saline and/or contrast material and/or rate of dissipation of contrast material may be used to indicate the solidity and/or porosity of surrounding tissue and/or indicate a blood flow or fluid drainage. For example, within an obstruction, it is expected for injection to have resistance and for contrast material to pool and only slowly dilute. Outside an obstruction or in interstitial tissue, such resistance is expected to be lower and/or dilution (e.g., as indicated by density of absorption or reflection on image) faster.

General

It is expected that during the life of a patent maturing from this application many relevant blockage penetration tools and vein anchoring components will be developed; the scopes of the term penetration tip and of the term anchoring element are intended to include all such new technologies a priori.

As used herein with reference to quantity or value, the term "about" means "within ±10% of".

The terms "comprises", "comprising", "includes", "including", "has", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular forms "a", "an" and "the" include plural references unless the context clearly dictates otherwise. For example, the term "a compound" or "at least one compound" may include a plurality of compounds, including mixtures thereof.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. Apparatus for passing a blocked blood vessel, comprising:
   (a) an intravascular catheter body defining at least one lumen;
   (b) a radially expandable anchor at a distal end of said catheter; and
   (c) a penetration tool sized and shaped to be delivered by said at least one lumen to a point distal of said radially expandable anchor, said penetration tool including a tip and configured for being pushed through a blood vessel blockage;

wherein said penetration tool is bendable at a bend location at a distal end thereof such that said tip is steerable;

wherein said penetration tool is adapted for bending by pre-cutting thereof;

wherein said pre-cutting comprises a first defining cuts on a concave side of said penetration tool which resist further bending after reaching a pre-selected bending angle and a second defining cuts on an opposite side of said first defining cuts;

wherein each cut of said first defining cuts define:
i. a first edge comprising a wall;
ii. a second edge comprising lateral sections and a middle section between said lateral sections;
iii. a tab extending from said middle section of said second edge in a direction towards said wall of said first edge; said middle section extending more than said lateral sections;

wherein during said bending said tab of said second edge and said wall of said first edge meet, engaging and locking with each other, thereby providing said resistance to further bending while additionally providing stiffening of said penetration tool.

2. Apparatus according to claim 1, wherein said penetration tool tip comprises a sharpened tip.

3. Apparatus according to claim 1, wherein said tip is hollow.

4. Apparatus according to claim 1, wherein said penetration tool is stiff enough to be pushed through a solid such blood vessel blockage.

5. Apparatus according to claim 1, wherein said penetration tool is configured for rotation within said at least one lumen.

6. Apparatus according to claim 1, wherein said blood vessel blockage has a Young's modulus of at least 50 MPa.

7. Apparatus according to claim 1, wherein said blood vessel blockage has a content of at least 30% by volume fibrosis tissue and/or at least 30% by volume collagen.

8. Apparatus according to claim 1, wherein said penetration tool is bendable at an angle selectable between 0 and 60 degrees.

9. Apparatus according to claim 1, wherein said pre-cutting uses different patterns of cuts on a ventral side and on a dorsal side of said penetration tool, one of said patterns configured to resist said further bending and another of said patterns configured to assist said bending.

10. Apparatus according to claim 1, wherein said penetration tool comprises a pull-wire attached thereto at a distal side thereof.

11. Apparatus according to claim 1, wherein said penetration tool is pre-bent.

12. Apparatus according to claim 1, comprising a stylet configured to selectably change a shape of said penetration tool at said bend location when said stylet is within said bend location.

13. Apparatus according to claim 1, wherein said penetration tool is formed of a super-elastic material.

14. Apparatus according to claim 1, comprising an axially slidable sheath in said at least one lumen and outside said penetration tool and configured to shape said penetration tool.

15. Apparatus according to claim 1, comprising at least one radiopaque marker which indicates an expected bending direction of said penetration tool tip.

16. Apparatus according to claim 1, wherein said penetration tool further comprises a plurality of third defining cuts arranged in a general spiral direction located proximally to said first and said second defining cuts.

17. Apparatus according to claim 1, wherein said expandable anchor comprises a balloon;
wherein said balloon has a distance of less than 3 mm between (i) a most distal section of said balloon which has a diameter of less than 20% of a maximal diameter of said balloon and (ii) a more proximal section of said balloon which has a diameter of more than 80% of said maximal diameter; and
wherein said balloon has a distal concavity facing axially.

18. Apparatus according to claim 17, wherein said balloon comprises:
a flexible body, sized and shaped for insertion into the blood vessel, said body extending along an axial direction and said body defining a first axial location with the maximal diameter at a resting state of said body;
said body defining at least one circumferentially extending geometry at an axial location other than said first axial location, which geometry is configured to assist in folding of said body.

19. Apparatus according to claim 17, comprising a handle used to control inflation of said balloon.

20. Apparatus according to claim 19, wherein said handle comprises a first control for rotating and/or for bending said penetration tool and a second control for advancing and retracting said penetration tool.

21. Apparatus according to claim 19, wherein said handle comprises a control for bending said penetration tool.

* * * * *